United States Patent [19]
Vaziri et al.

[11] Patent Number: 5,291,479
[45] Date of Patent: Mar. 1, 1994

[54] MODULAR USER PROGRAMMABLE TELECOMMUNICATIONS SYSTEM WITH DISTRIBUTED PROCESSING

[75] Inventors: Faramarz Vaziri, Port Even; Brian Bolon, Duanesburg; Brent E. Bryson, Highland; John Emerick, Saugerties, all of N.Y.

[73] Assignee: Digital Technics, Inc., Ellicott City, Md.

[21] Appl. No.: 731,043

[22] Filed: Jul. 16, 1991

[51] Int. Cl.⁵ .............................................. H04J 3/02
[52] U.S. Cl. ................................ 370/58.2; 370/110.1; 370/85.11
[58] Field of Search ...................... 370/110.1, 85.1, 60, 370/60.1, 58.1, 94.1, 58.2, 58.3, 85.11; 379/269

[56] References Cited
U.S. PATENT DOCUMENTS

| | | | |
|---|---|---|---|
| 4,058,672 | 11/1977 | Crager et al. | 178/3 |
| 4,491,944 | 1/1985 | Caizergues et al. | 370/58 |
| 4,608,685 | 8/1986 | Jain et al. | 370/85 |
| 4,649,534 | 3/1987 | Manjarres | 370/60 |
| 4,720,854 | 1/1988 | Sand | 379/269 |
| 4,805,172 | 2/1989 | Barbe et al. | 370/68.1 |
| 4,903,258 | 2/1990 | Kuhlmann et al. | 370/58.2 |
| 4,962,497 | 10/1990 | Ferenc et al. | 370/60.1 |
| 4,975,695 | 12/1990 | Almond et al. | 340/825.790 |
| 5,001,706 | 3/1991 | Dighe et al. | 370/94.1 |
| 5,140,590 | 8/1992 | Gertsman et al. | 370/110.1 |

OTHER PUBLICATIONS

J. H. Green, *The Dow Jones-Irwin Handbook of Telecommunications*, pp. 65-68, 72, 73 and 290-306 (Illinois: Dow Jones-Irwin, 1986).

Primary Examiner—Douglas W. Olms
Assistant Examiner—Min Jung
Attorney, Agent, or Firm—Roylance, Abrams, Berdo & Goodman

[57] ABSTRACT

A telecommunications system is provided to connect a plurality of dissimilar types of subscriber telecommunications devices and to provide integrated telecommunications services. The system is provided with a digital communications link comprising a PCM bus for voice and data and an HDLC coded PCM highway for control signals to create a master slave environment, wherein a central processing board operates as a master processor for a plurality of peripheral processor boards. The peripheral boards are coupled to various subscriber telecommunications devices. The CPU board is provided with hierarchical program control that includes low level program code for driving CPU board components, and mid-level program code for effecting system functions and CPU board functions. The mid-level code can also be used to create data bases relating to system configuration as well as data bases for each port associated with the peripheral boards. The mid-level code is also provided with an interpreter program code for executing a novel high level code to program code that is recognized by the master CPU board. The high level, telecommunications language provides a system user with a programming language to create program modules for processing packets of data. The hierarchical program control levels operate to conceal dissimilarities between the subscriber telecommunications units to facilitate use of the high level programming language.

46 Claims, 22 Drawing Sheets

12
MODULAR USER PROGRAMMABLE TELECOMMUNICATIONS SYSTEM WITH DISTRIBUTED PROCESSING

BACKGROUND OF THE INVENTION:

1. Field of the Invention

The present invention relates to digital telecommunications systems, and particularly to time division multiplex switching systems for routing voice and data between a variety of telecommunications devices.

2. Description of the Related Art

The integration of computer technology and distributed data processing with telecommunications networks has brought about the evolution of switching technology from basic central offices to call processors, which are capable of handling voice and data communications between a variety of telecommunications devices, as well as over a variety of links, such as lines, trunks and satellite links. This technological evolution has created a demand for a telecommunications system which can provide central office telephone service as well as services associated with customer or local exchange switches such as private branch exchanges (PBXs). Further, a demand has been created for telecommunications networks which are capable of providing expanded services such as call forwarding and voice mail.

To meet these demands, telecommunications systems should ideally be configurable to expand with the size of a communication network. Further, the system should be operable to accommodate different channel characteristics and limitations in order to support services requiring, for example, different bandwidths per channel, and equipment employing different communications protocols. Also, it is desirable to provide users with some means to modify and control the system configuration to selectively increase or decrease the number of ports available, to configure the switch for use with selected telecommunications devices, and to provide selected services to subscribers through a switch without requiring substantial change to the system hardware and software components.

Telecommunications systems have been developed which provide distributed processing for voice and data transmitted by a variety of telecommunications devices. The systems, however, generally must employ compatible telecommunications devices in order to provide many of their telecommunications services. The systems are therefore not fully integrated telecommunications systems. An additional drawback associated with many existing telecommunications systems relates to the lack of modularity of the hardware and software components in the system, making changes in subscriber services and in the number of ports supported by the system uneconomical.

SUMMARY OF THE INVENTION

The telecommunications system of the present invention comprises at least one central processing unit (CPU) board for providing master control to a number of different peripheral boards to create a system which is fully integrated in terms of the services it can provide to end users. The peripheral boards include an analog board and a trunk board for processing voice signals, a digital board for processing digitized voice signals as well as data, a storage module board for providing the system with data storage and retrieval capabilities, and a digital signal processing board which provides the system with flexibility in terms of program control. The peripheral boards are configured to be substantially generic devices so as to allow the system to be fully integrated.

The system hardware is operated in conjunction with a software structure to essentially provide a universal interface between the system and practically any telecommunications device. The software structure generally comprises a hierarchy of program control wherein a first, low level of control is provided by device drivers for board components. A second, mid-level layer of program code is provided which comprises a variety of manager subroutines that can control the CPU board and its communication with the peripheral boards in order to execute various system functions and board functions. This mid-level program control is also used to create a database comprising data relating to each port within the system and data relating more generally to the configuration of the system hardware components. A novel, high level code is provided which allows a system user to create high level language program modules which are generic in application. The high level language program modules are translated by the mid-level code and executed so as to conceal from the programmer the lack of compatibility which can exist between telecommunications devices coupled to the system of the present invention.

BRIEF DESCRIPTION OF THE DRAWINGS

These and other features and advantages of the present invention will be more readily apprehended from the following detailed description when read in connection with the appended drawings, in which.

DETAILED DESCRIPTION OF THE PREFERRED EMBODIMENTS

Figure 1:
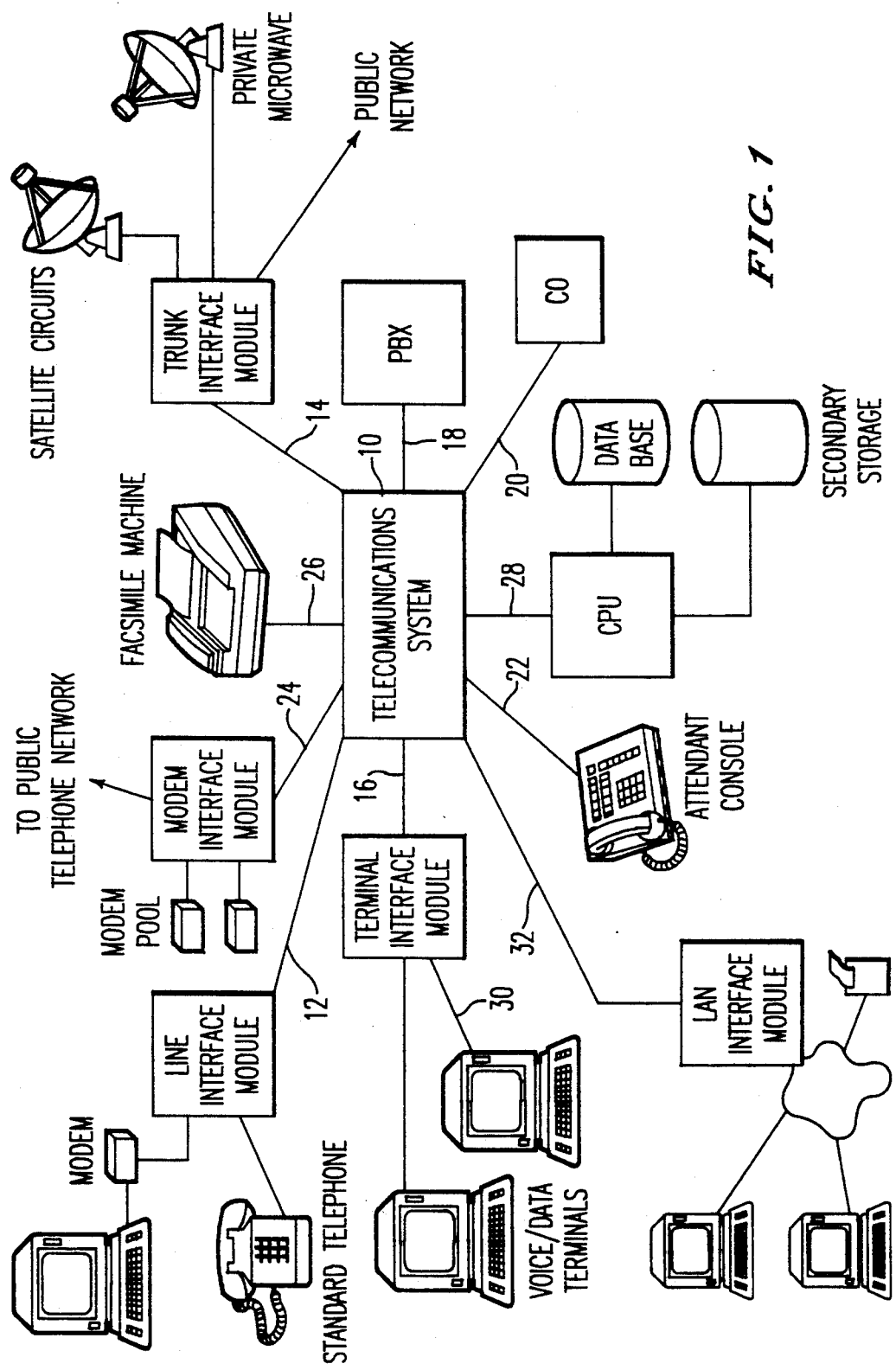
FIG. 1 is a schematic diagram of a telecommunications system constructed in accordance with the present invention which is employed in an exemplary telecommunications environment.

With reference to the drawings, wherein like reference characters represent like components throughout the various views, and with particular reference to FIG. 1, a telecommunications system is depicted which is coupled to various analog and digital telecommunications devices. The telecommunications system 10 of the present invention is generic in that it can operate as an interface, for example, to telephone lines 12, trunks 14, digital lines 16, private branch exchanges 18, and central offices 20, and it can support such telecommunications applications as switching, key telephone system operation 22, and modem and facsimile communications 24 and 26, respectively. In addition, the generic telecommunications system 10 can be coupled to various digital devices including computer databases 28, voice and data terminals 30, and digital communications networks 32. As will be discussed in further detail below, the generic telecommunication system 10 is composed of modular hardware and software components which can be configured to support any number of ports or digital voice channels, and to selectively connect and disconnect the aforementioned telecommunications devices through these ports in order to provide, for example, the following services: full feature key telephone systems; small, medium and large private branch exchanges (PBX); central office switches; message storage; forwarding and refiling of electronic mail, facsimile mail, voice mail and video mail; modem and fax arrays; telemarketing; data processing; and telebanking, among other services. The modular hardware and software components of the present invention provide for the interfacing of different telecommunications systems having different communications protocols by means of distributed processing control and an open architecture design.

The telecommunications system 10 of the present invention is described below in accordance with the following general outline:

I. Overview of System Operation
II. CPU Board Hardware
III. CPU Board Software
  A. Low Level Drivers
  B. Mid-Level Code
  C. High-Level Code
IV. Analog Board
V. Trunk Board
VI. Digital Board
VII. Storage Module Board
VIII. Quad DSP Board
IX. System Commands
X. System Operation
XI. Digital Telephone
XII. Switch Board

I. Overview of System Operation

Figure 2:
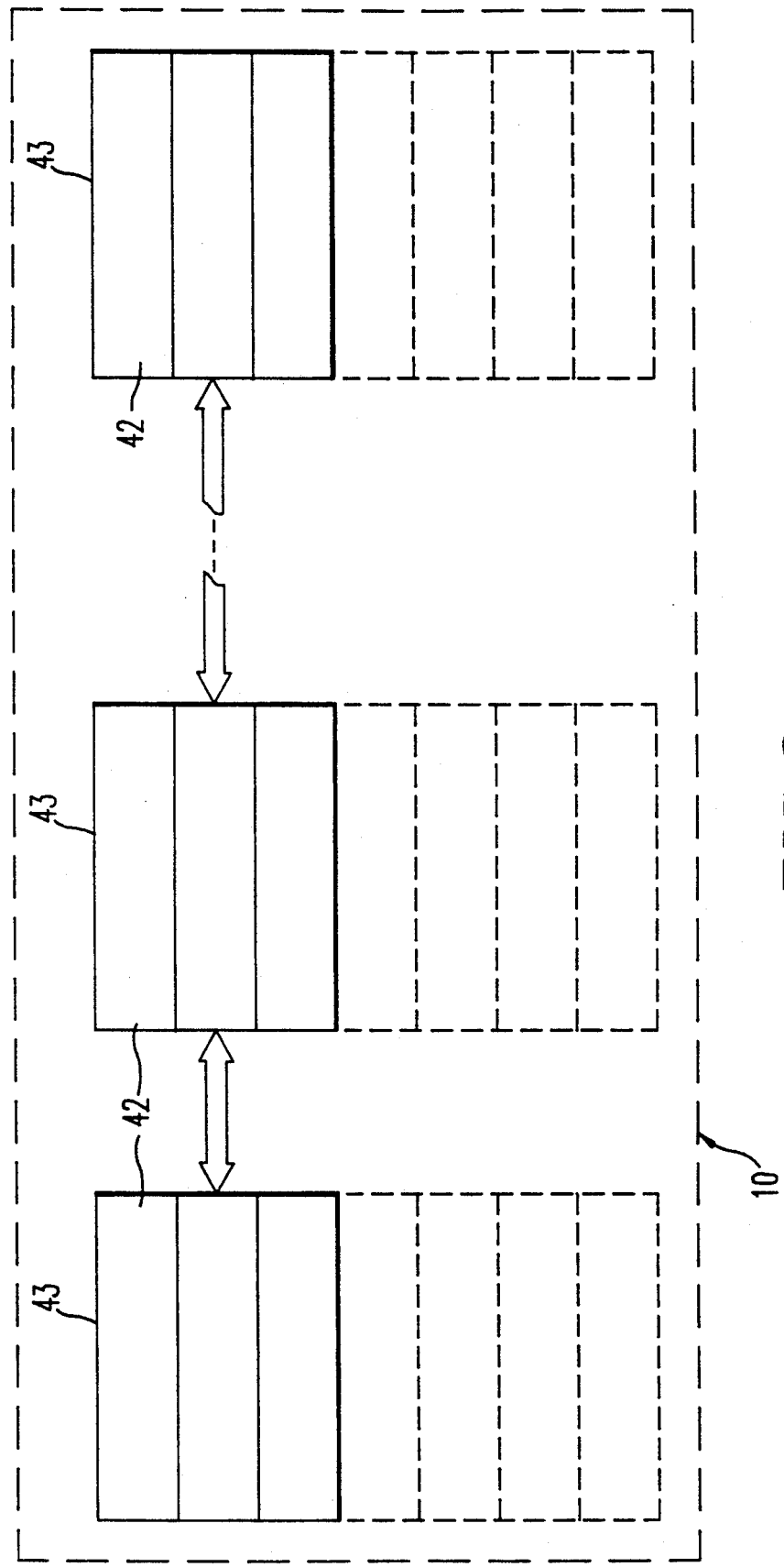
FIG. 2 depicts the arrangement of racks within cabinets in the telecommunications system of FIG. 1.

FIG. 2 illustrates the modularity of the hardware components in the telecommunications system 10. The telecommunications system 10 can be configured with a plurality of racks 42 or individual telecommunications units, each of which comprises at least one peripheral board (not shown). Several racks can be arranged in a cabinet 43. The modularity of the software and hardware components allows for the addition of telecommunications units 42 to the system and, therefore, an increase in the number of ports with relative ease. The manner in which the telecommunications units communicate with other units in the same or different cabinet to process data packets is described below in connection with FIG. 22.

Figure 3:
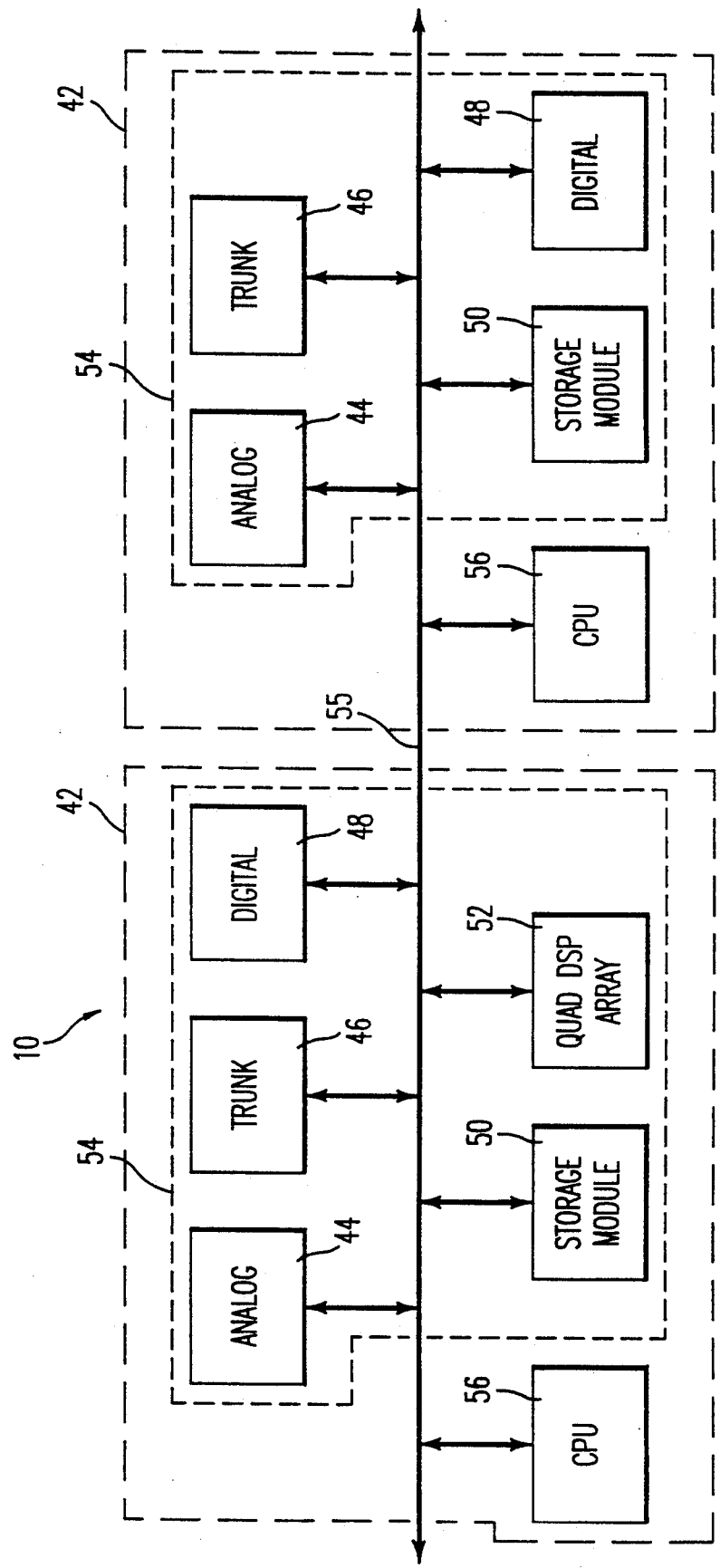
FIG. 3 is a schematic diagram of a CPU board and several peripheral boards which comprise a rack in the telecommunications system of FIG. 1.

With reference to FIG. 3, each telecommunications unit 42 is preferably configured as a generic telecommunications unit (GTU) which is capable of supporting all of the aforementioned services and systems. In other words, the telecommunications system 10 can be configured with only a single GTU 42. The GTU is provided with several electronic circuit boards, each of which is described below. The GTU 42 is provided with an eight-line analog board 44 for processing signals on analog telephone lines, a four-line trunk board 46 for connecting trunk lines to the GTU 42, and an eight-line digital board 48 for processing data transmitted to the GTU 42, for example, by a computer or data terminals. Further, the GTU 42 can be provided with a storage module board 50 for data storage and retrieval operations and a quad digital signal processing (DSP) array board 52 for providing telecommunications services such as voice mail. The aforementioned electronic circuit boards 45–52 shall hereinafter be collectively described as the peripheral boards 54. The peripheral boards 54 are interconnected by a backplane bus 55 and are controlled by a central processing unit (CPU) board 56. The CPU board 56 is provided with an internal digital signal processor (DSP) (described below in connection with FIG. 7), which performs similar functions as the quad DSP array board 52. The GTU 42 can be configured with different numbers and combinations of the aforementioned boards. For example, the GTU 42 can be configured with only a CPU board 56, an eight-line digital board 48, a four-line trunk board 46 and a storage module board 50. The provision of these various types of peripheral boards 54 in a GTU 42 allows the GTU to provide a variety of telecommunications services to many dissimilar end users in a fully integrated telecommunications system in accordance with the present invention.

With further reference to FIG. 3, the backplane bus 55 is an arrangement of hard-wired connections between the different CPU boards 56 and peripheral boards 54 of respective GTUs in the telecommunications system 10. The backplane bus 55 is designed to facilitate inter-board connections and, therefore, system expansion.

Figure 4A:
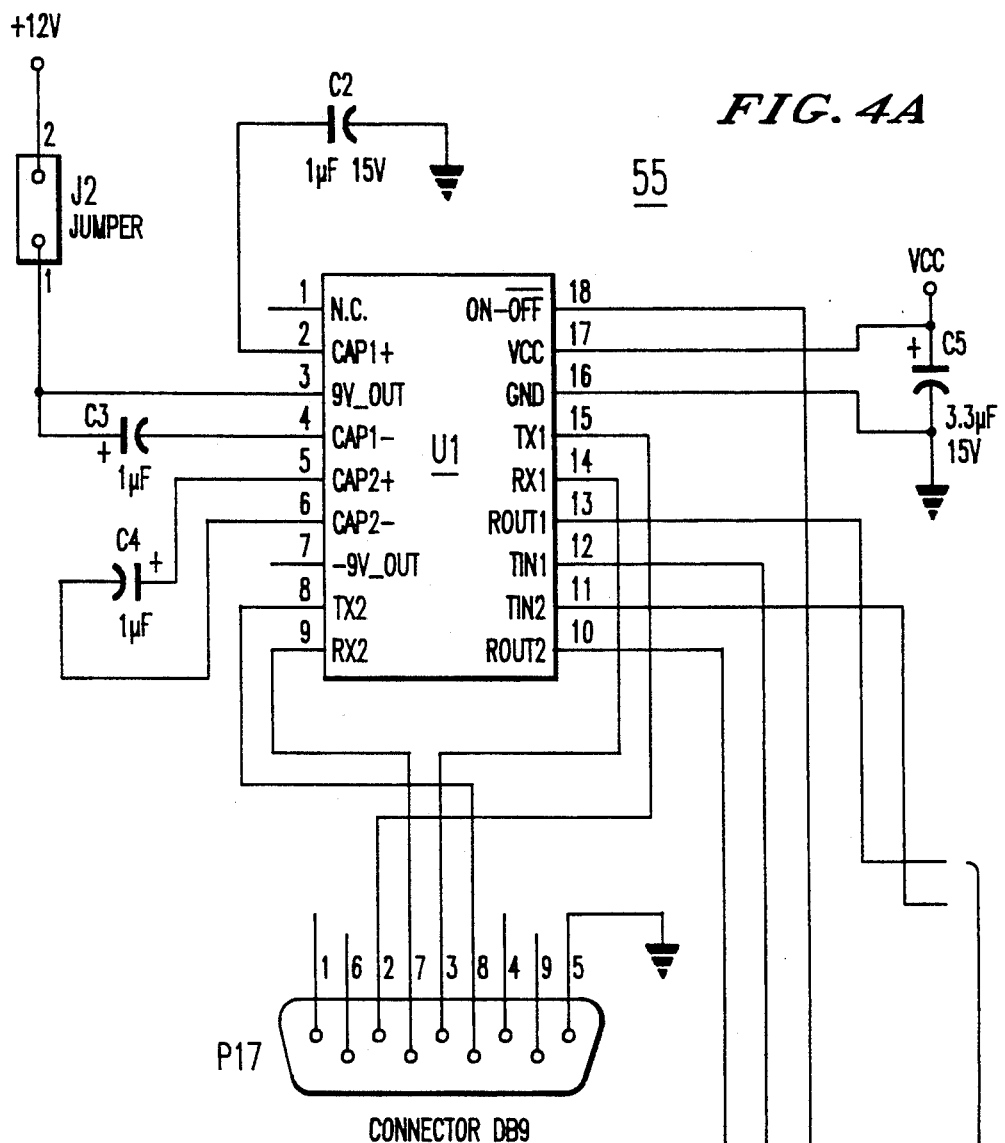
FIGS. 4A, 4B, and 4C is a schematic diagram of exemplary backplane connections which can be used with the CPU board of FIG. 3.
Figure 4B:
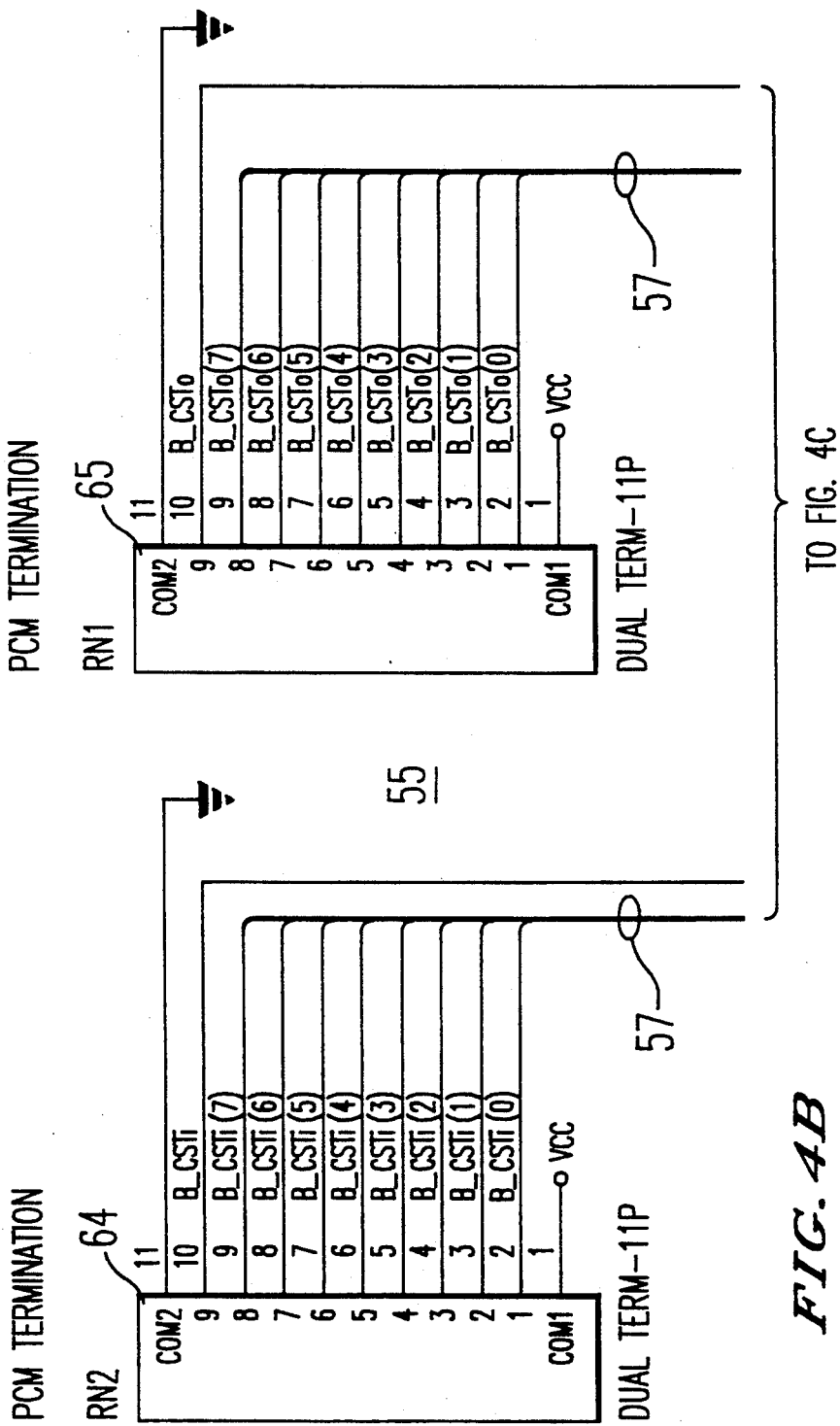
Figure 4C:
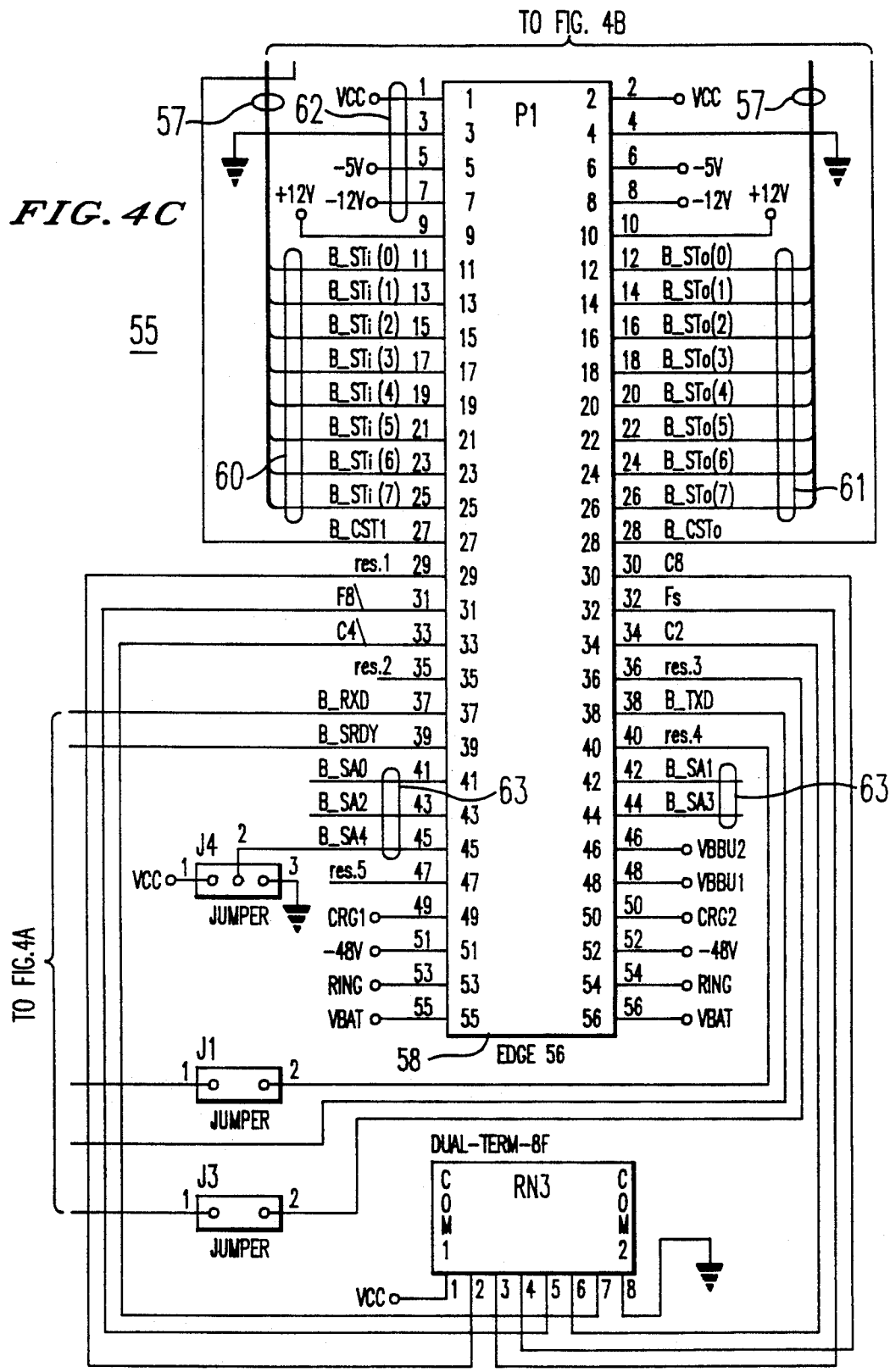

FIGS. 4A, 4B, and 4C depicts backplane connections which can be used with a single CPU board 56. The CPU board 56 is generally provided with a 56-pin edge connector 58 which is coupled to backplane lines that carry five types of signals. The first signal type includes those signals that are carried on a serial telecommunications bus 57. The serial telecommunications bus 57 comprises six bidirectional, pulse code modulated (PCM) highways. Each highway preferably has an aggregate data rate of 2.048 megabits per second that is divided into 32 time division multiplexed (TDM) channels having a capacity of 64 kilobits per second each. Each GTU is preferably configured with 6×32 or 192 ports such that each port is provided with PCM highway access without having to block any port activity. The bidirectional PCM highways are named with respect to a time slot interchange (TSI) switch which is provided on the CPU board 56 and discussed below in connection with FIG. 7. For example, the input and output lines of the edge connector 58 are denoted as B-STI [line M] 60 or B-STO [line N] 61 depending, respectively, on whether the lines are input lines to the PCM highway corresponding to a line M of the switch, or are output lines from the PCM highway corresponding to a line N of the switch. A seventh, dedicated bidirectional PCM highway 59 is provided for internal system communication which preferably uses the high-level data link control (HDLC) protocol developed by the International Standards Organization (ISO) to provide a master and slave arrangement between the CPU board 56 and the peripheral boards 54. The control lines for the PCM highways 57 comprises a 2.048 MHz clock signal line C2, a 4.096 MHz clock signal line C4  , 8KHz frame synchronization lines F0  and Fs, and HDLC control lines B_CST; and B_CST.

The second signal type comprises power supply lines 62. A typical power supply configuration, where battery backup is desired, can include an off-line supply to provide a nominal Vbat signal (i.e., −28 VDC to −60 VDC). The supply can float charge a set of batteries. It can also provide the input signal to a series of DC/DC converters. These DC/DC converters provide +5 VDC, −5 VDC, +12 VDC, and −12 VDC power supplies. Also, the Vbat signal is the power input signal for the ring generator which provides a 90 VRMS, 20 Hz output signal for analog phone ringing. In the event of a power failure, the off-line supply output goes to zero, and the battery output switches in to provide the Vbat signal. The remainder of the power supplies operate as normal since they use the Vbat signal as a power source. The system CPU board is provided with a power failure signal and can then implement power reduction features.

Figure 5:
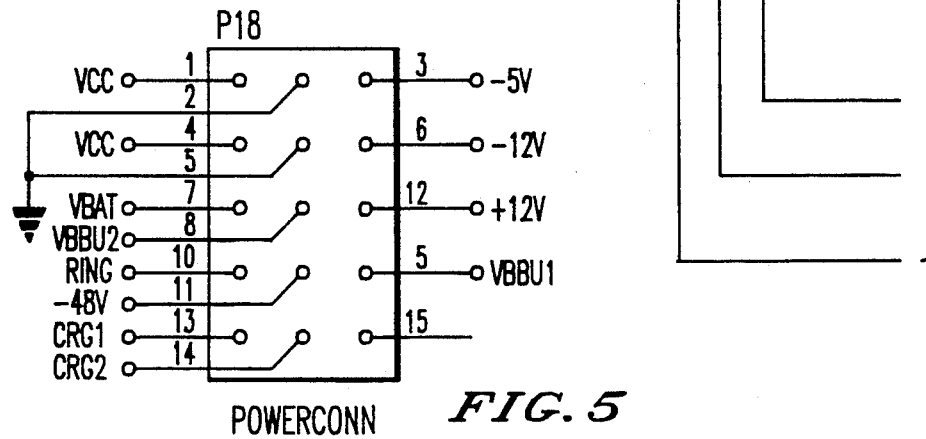
FIG. 5 is a schematic diagram of power connections used with the backplane of the present invention.

For a low cost system, all supplies can be configured to operate off-line, with the possible exception of the ring generator. A typical configuration, for example, can use a linear supply for providing Vbat signal. A quad output switch can be used to provide the 5 VDC, −5 VDC, +12 VDC, and −12 VDC power supplies. The ring generator can operate off-line or from the Vbat signal, depending on the system requirements. This type of configuration allows an order of magnitude decrease in power supply costs for a typical system. With reference to FIG. 5, a ring generator control line CRG2, a zero-crossing synchronization signal CRG1, and battery backup lines VBBU1 and VBBU2 are also provided.

The telecommunications system 10 of the present invention is characterized by low power consumption, and therefore has several advantages over existing digital telecommunications systems. For example, the system 10 has increased reliability due to lower operating temperatures, reduced power supply requirements, and low cost battery backup. The power consumption is reduced through extensive use of CMOS circuits, reduced component count (due to VLSI devices and circuit design techniques), and, most importantly, software control of the power critical components. For example, on the analog board 44, power control is maintained over 17 of the 20 integrated circuit devices, including CODECs, SLICs, and a microcontroller. This allows a power reduction of over 90% per line. This power reduction is implemented in two stages. The first stage is during normal operation when power is denied to non-authorized lines and reduced to inactive lines. The second stage is during emergency power down when the system CPU board can instruct individual boards or lines to enter a sleep mode, awakening only to periodically check for the re-authorization for full power operation. The other system boards implement similar power reduction features. The system can economically provide battery backup where it was not previously possible due to this level of software control. This allows continuous operation even under adverse subscriber conditions.

With further reference to FIGS. 4A, 4B, and 4C, a third signal type corresponds to fixed logic levels on five input lines to the edge connector 58 which are labeled B_SA0 through B_SA4 and are referred to collectively as slot address lines 63. The logic level combinations provide $2^5$ or 32 unique address signals for identifying CPU and peripheral boards in a rack 42. Each board, therefore, can read its corresponding slot address number from the five slot address lines 63 to establish a physical address which is incorporated into the virtual address of the board. The slot address for each peripheral board in a rack is generally provided to the corresponding CPU board during initialization or system start-up to effect interboard communications. The CPU board can confirm the presence of the peripheral boards by comparing their slot addresses with stored data relating to the configuration of the system.

A fourth signal type comprises TTL level serial link signals for external communication with the CPU board 56 through an RS-232 link for internal backup communication in the event of HDLC channel 59 malfunction, and for software program downloading when the CPU board microcomputer permits such downloading through a serial port. The serial lines comprise a serial transmit line B_Txd, a serial receive line B_Rxd, and a serial read line B_Srdy. An RS-232 level driver is provided on the backplane of each rack to convert 0 V and 5 V signals to, for example, −9 V and 9 V signals. These drivers can be controlled by CPU board software to allow several racks to share a common RS-232 link. Finally, a fifth signal type corresponds to the unused lines of the edge connector 58, i.e., the lines labeled RES1, RES2 and RES3, which may be reserved for future implementation.

With further reference to FIGS. 4A, 4B, and 4C, the edge connector lines carrying serial telecommunications bus signals 60 and 61 are connected to PCM termination circuits (i.e., resistor networks) 64 and 65, respectively. Resistor networks 64 and 65 on the backplane provide a substantially constant termination impedance for the PCM data highways (B_STix and B STox), the control highway (B_CSTi and B_CSTo), and the clocking signals (FO, Fs, C2, C4, C8) to reduce overshoot, ringing, pulse distortion, and electron magnetic interference. Also, tri-stated logic lines are prevented from drifting to undefined logic levels.

Figure 6:
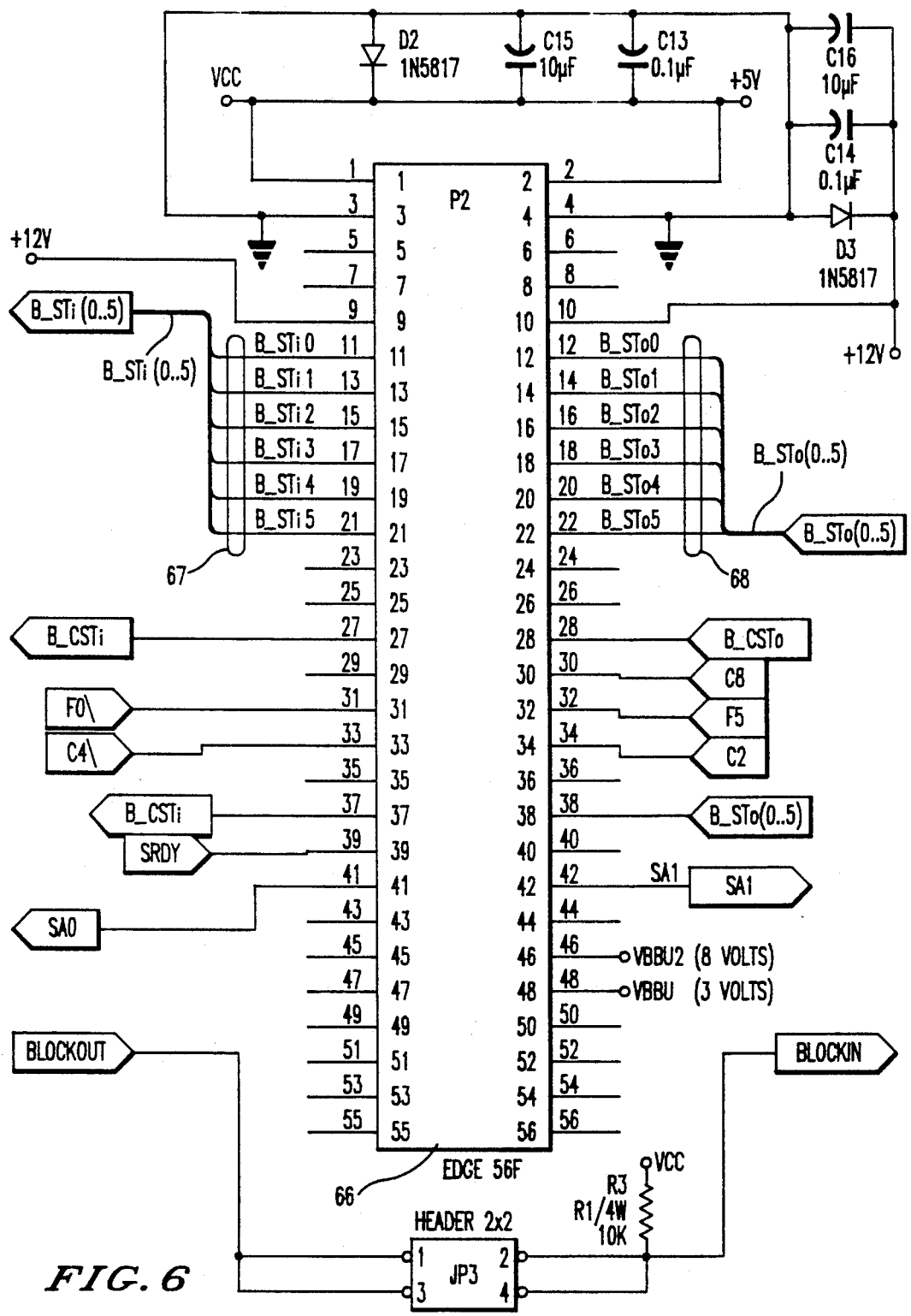
FIG. 6 is a schematic diagram of exemplary backplane connections which can be used with each of the peripheral boards of FIG. 3.

FIG. 6 depicts some of the backplane connections which can be used with the peripheral boards 54. The physical backplane connection generally comprises a 56 pin edge connector 66. As shown in the drawing, the edge connector comprises input pins 67 for the incoming serial telecommunications pins, output pins 68 for the outgoing serial telecommunications lines carrying signals to the other boards, as well as pins for slot address lines, PCM highway control lines and power lines.

The edge connectors 58 and 66 that are associated with the CPU board and the peripheral boards, respectively, are preferably placed on a backplane board (not shown) and spaced approximately one inch apart. Power decoupling capacitors are provided in between each edge connector on the backplane board. The pin assignments for each of the peripheral board edge connectors and the CPU board edge connectors are substantially identical. The five slot address pins on each edge connector associated with a peripheral or CPU board are connected incrementally in a binary format to provide each board with a unique board address.

In view of the foregoing, the integration of CPU or peripheral boards into the telecommunications system 10 is simplified with the use of generic backplane connections and inter-board communication using PCM highways. Further, the inter-board communication scheme avoids the use of CPU and peripheral boards which are processor specific. Simply by adhering to the command protocol used on the communication bus, any type of board, serving any function, controlled by any processor means, can be incorporated into the system. The software, firmware, and hardware for that board is transparent to the remainder of the system. This communication link, combined with use of high level platform independent, coding techniques for the CPU board microcomputer, allows the use of any type processor to perform the system CPU function if properly incorporated. The inter-board communication, as will be described in further detail below, is preferably command oriented, that is, the CPU board in each rack provides master control to a number of peripheral or slave boards. The backplane bus is configured as generic data and control lines interconnecting the boards as opposed to device specific address and data lines. Thus, the software control programs for these master and slave boards can be modified to upgrade the operation and performance capabilities of the CPU board and the peripheral boards without having to modify the backplane connections as well. The backplane of the present invention is therefore superior to many existing backplanes which are generally driven by a main central processing unit. These existing, processor driven backplanes generally interconnect peripheral boards, hard disks and memory using data lines and address lines. Thus, unlike the present invention, modification of one of these prior systems to, for example, add a peripheral device, generally requires substantial changes to the system hardware and program control.

As stated previously, the CPU board 56 and the peripheral board 54 in each rack 42 are provided with program code for establishing a master/slave environment, wherein the CPU board provides master control to the peripheral boards. Inbound commands (which are transmitted to the CPU board by the peripheral boards) and outbound commands (which are transmitted to the peripheral boards by the CPU board) are transmitted over the dedicated, HDLC protocol coded PCM highway 59. Outbound commands comprise, for example, commands instructing a peripheral board to send a dial tone to a telecommunications device coupled thereto and commands requesting a peripheral board to transmit status information. Inbound commands comprise, for example, commands indicating line status such as ring trip or a hookflash or detection of dialed digits, as well as commands requesting data to be routed over a PCM highway to a designated receiving terminal. Some inbound and outbound commands are described below in connection with Tables 2 through 5. The CPU board and peripheral boards each comprise HDLC interfaces or protocollers for receiving and transmitting command signals over the dedicated channel 59. The HDLC protocollers are similar in function to buffers for storing a packet which has been received or is about to be transmitted until the onboard microcontroller is ready to process the packet. The telecommunications system 10 of the present invention, however, is generally designed to process the packets in real-time making storage of many packets at each board unnecessary.

The CPU board is provided with several layers of program control which operate together with the system hardware to realize several advantages of the present invention. For example, several layers of software are used to encapsulate control data associated with each peripheral device, such that the various devices of the system appear to be substantially alike to a CPU board microcontroller, which is processing packets from these devices in accordance with a high level, call processing software program. Thus, the system provides its users with the advantages of device uniformity when the systems peripheral devices would otherwise be incompatible. The interaction of different levels of software associated with the CPU board 56 will be described in connection with FIG. 7, which is a schematic view of the CPU board software components, as well as some system hardware components for illustrative purposes. The system hardware components depicted in FIG. 7 include various peripheral boards 54, PCM highways 57 and 59, the RS-232 link 53, the CPU board HDLC protocoller 69, a time slot interchange (TSI) switch 70, an interface circuit to the RS-232 link 71, and a digital signal processor (DSP) 72.

Figure 7:
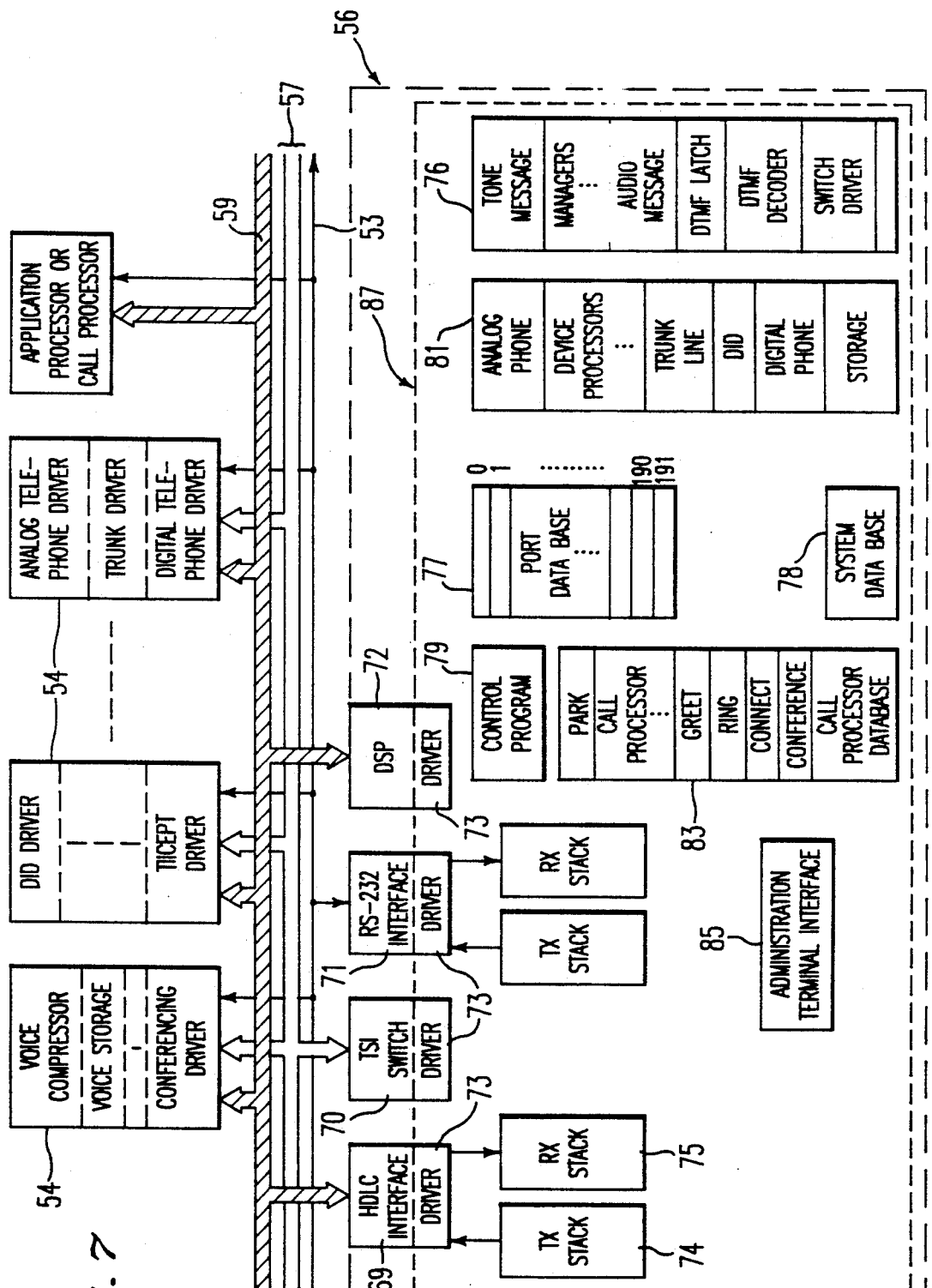
FIG. 7 is a schematic diagram of various hardware and software components associated with the CPU board of FIG. 3.

With reference to FIG. 7, the first and lowest level of CPU board software comprises low level drivers 73 for controlling the HDLC protocoller 69, the interface circuit 71 for the RS-232 link, the TSI switch 70 and the DSP 72. The switch transfers data from one port (i.e., a channel on a PCM highway) to another port. The DSP 72 can be used a variety of ways such as to generate telecommunication tones or to perform DTMF decoding and echo cancellation functions. The CPU board is provided with mid-level program coding for implementing a main software transmit stack 74 and a main software receive stack 75 on the CPU board to transmit and receive packets, respectively, to and from the peripheral boards through the HDLC protocoller 69 or from the CPU board microcomputer in accordance with a low level driver 73. When the microcomputer on the CPU board is ready to process a packet, the microcomputer takes a packet from the receive stack 75 and examines a command byte which is transmitted within the packet. Based on the command specified by the command byte, the microcomputer invokes at least one of several subroutines called managers 76. A manager is generally created to control the CPU board microcomputer in order to perform system functions such as processing audio and tone messages, operating the TSI switch, performing DTMF dialing and decoding functions, as well as CPU board and peripheral board functions such as TSI switch operation. Thus, when a packet is received from a peripheral board, the CPU board microcomputer examines the slot address byte transmitted within the packet to determine the originating peripheral board in order to invoke the proper manager for controlling CPU board operations in connection with the originating peripheral board. For example, if the originating board is an analog board, the CPU board microcomputer invokes the manager subroutine for the analog board, which could in turn control the microcomputer to transmit a packet to an analog board that instructs the microcomputer on the board to perform a read operation from a CODEC. Managers can be somewhat device specific, in that the manager subroutine controls the CPU board microcomputer to send properly formatted data (i.e., data which has been formatted in accordance with the data rate and communications protocol employed by the receiving peripheral board) to the destination port specified in the command packet. Managers can therefore be used to conceal from the system user dissimilarities in protocol for data and voice being transmitted by the various telecommunications devices coupled to the peripheral boards 54.

The mid-level code is also used to format memory space on the CPU board for each port which can be accessed and modified by the CPU board microcomputer. This memory space is collectively referred to as a port database 77. The Port database is accessible by the CPU board microcomputer when it is processing a packet in order to determine if, for example, the telecommunications service requested by the command byte in the packet is available to that particular port. The availability of telecommunications services can be determined by examining the subscriber information located in the port database for that particular port. A system database 78 is created using the mid-level code in order to store data such as a system configuration data file, which contains data relating to, for example, the number and types of peripheral boards coupled to the CPU board and their operational status. Further, the mid-level code is used to create a global command buffer (GCB) in the CPU board memory which is used by the manager subroutines when the CPU board microcomputer invokes a high level language program to process packets. The manager subroutines control the CPU board microcomputer to analyze the command byte of a receive packet to determine if the packet requires processing by the microcomputer in accordance with a high level language program module.

As described in further detail below, a novel aspect of the present invention is a high level TELECOM language which can be used, for example, by a system administrator to create subroutines for processing packets of data. The high level language subroutines are written to accommodate a hardware configuration which is uniquely adapted to serve the needs of the system's subscribers. The mid-level code comprises an interpreter program module which is used to translate the high level coded programs into a computer language that is understood by the CPU board microcomputer. The interpreter program module is generally stored in a control program memory space 79 on the CPU board.

The high level language is generally used by a system user to create software programs referred to as device processors 81 for controlling the CPU board microcomputer. For example, the CPU board accesses individual manager subroutines and alters specific system data in the system database 78 under control of a device processor in order to process packets received from or transmitted to a particular device such as an analog or digital phone, a trunk line, or a direct inward dialing circuit. While these programs are specific to a particular type of telecommunications device, the user is not required to have knowledge of certain characteristics of the system hardware (such as the data rates and communications protocols employed by various system components), as the manager subroutines conceal these particular characteristics from the user. Further, the high level language allows the user to write a single program module referred to as a call processor 83 which can be invoked by a device processor subroutine in order to perform basic system functions such as conferencing. The call processor 83 is written as a generic program which can invoke specific managers and device processors when controlling the CPU board microcomputer during its execution of a basic system function. Examples of a call processor subroutine and two device processor subroutines are provided at appendices A through C.

With further reference to FIG. 7, an administration terminal 85 can be coupled to the CPU board 56 to utilize the multitasking capabilities of the telecommunications system. A data communications link is provided from the system CPU(s) to one or more administration terminals. This link can be through the RS-232 interface, a terminal adapter, or some other networking means. The administration terminal provides services to the system user which include billing information, traffic analysis, least cost routing input and output, configuration data control, activity monitoring, device or call processor modification, and database access, among others. This administration interface can range from a simple terminal to a computer running under a multitasking operating system within a parallel network, (i.e. DOS, UNIX, X-WINDOWS, WINDOWS under DOS, OS/2, etc). Typically this environment would be MS WINDOWS running under DOS. This provides a graphical, multitasking environment for the user which is well suited to the multitasking capabilities of the system. The terminal can contain separate windows for each of the assigned functions listed above, which can operate simultaneously and be viewed as needed by the user. This provides the user with the ability to easily access system features and make system modifications that have previously not been possible. The administration terminal 85 can also be programmed to provide an administrative user with the capability to alter the port database 77 and the system database 78 and to create various device processors and a call processor to accommodate the addition or removal of peripheral boards, and modifications to services provided to the end users of the system with relative ease.

II. CPU Board Hardware

The manner in which the CPU board 56 (FIG. 3) controls the peripheral boards 54 in a GTU 42 will now be described in connection with FIG. 8. The CPU board 56 processes packets of data received from the peripheral boards 54 via the PCM highway 59 to provide such telecommunications services as switching, telemarketing, and message storage and forwarding. To process these data packets, the CPU board 56 is preferably provided with a general purpose microcomputer 80 such as a V40 microprocessor, a PC-compatible processor with direct memory access which is manufactured by NEC Incorporated of Japan. The microcomputer 80 generally operates in accordance with three levels of program code. The microcomputer 80 is provided with read-only memory (ROM) 82 for storing firmware. The firmware is a first level of program code which is useful to control peripheral boards 54 such as the digital, trunk and analog boards 48, 46 and 44, respectively, and for communication between these boards. A second level of program code is provided for a digital signal processing (DSP) circuit 72 which is coupled to the microcomputer 80. The DSP software generally resides in the ROM 82 and is downloaded upon system start-up. The DSP software can be downloaded again for reconfiguration purposes. The DSP software provides the GTU 42 with basic telecommunications functions such as tone generation, DTMF decoding, and audio conferencing. A scratch pad memory for the DSP code can be provided using static random access memory (SRAM) 86.

The main software of the CPU board 56 is provided in eraseable programmable ROM (EPROM) 88 on the CPU board. The main software is useful, for example, to initialize the CPU board 56, to provide telephone switching services between the peripheral boards 54 (and therefore between terminal equipment such as telephones and data terminals), to allow communication between the boards 54 and 56, and to carry out various housekeeping functions. The main software works in connection with configuration data, which is provided in electrically eraseable/programmable ROM (EEPROM) 90, and data stored in a portion of the program memory in the EPROM 88 to perform the aforementioned basic telecommunications functions. The configuration data generally comprises data relating each slot (i.e., the presence of different types of peripheral boards), and to each port such as the type of telecommunications equipment that is coupled to the port, the listed directory number (LDN) associated with the port, system limitations placed on the port (i.e., limits on the port's capability to access a PCM channel), and subscriber limitations or class of service (i.e., access to long distance telephone and call waiting services).

The microcomputer 80 is coupled to a time slot interchange (TSI) switch 70 and is provided with software for operating the switch 98 and the HDLC channel, i.e., the dedicated PCM highway, in order to receive and store packets from the peripheral boards 54, and to return packets containing control data to the dedicated HDLC channel during appropriate clock cycles. The main framing clocks of the TSI switch 70 and the HDLC interface 69 preferably operate at 4.096 MHz and have a framing synchronization rate of 8 kHz.

Figure 8:
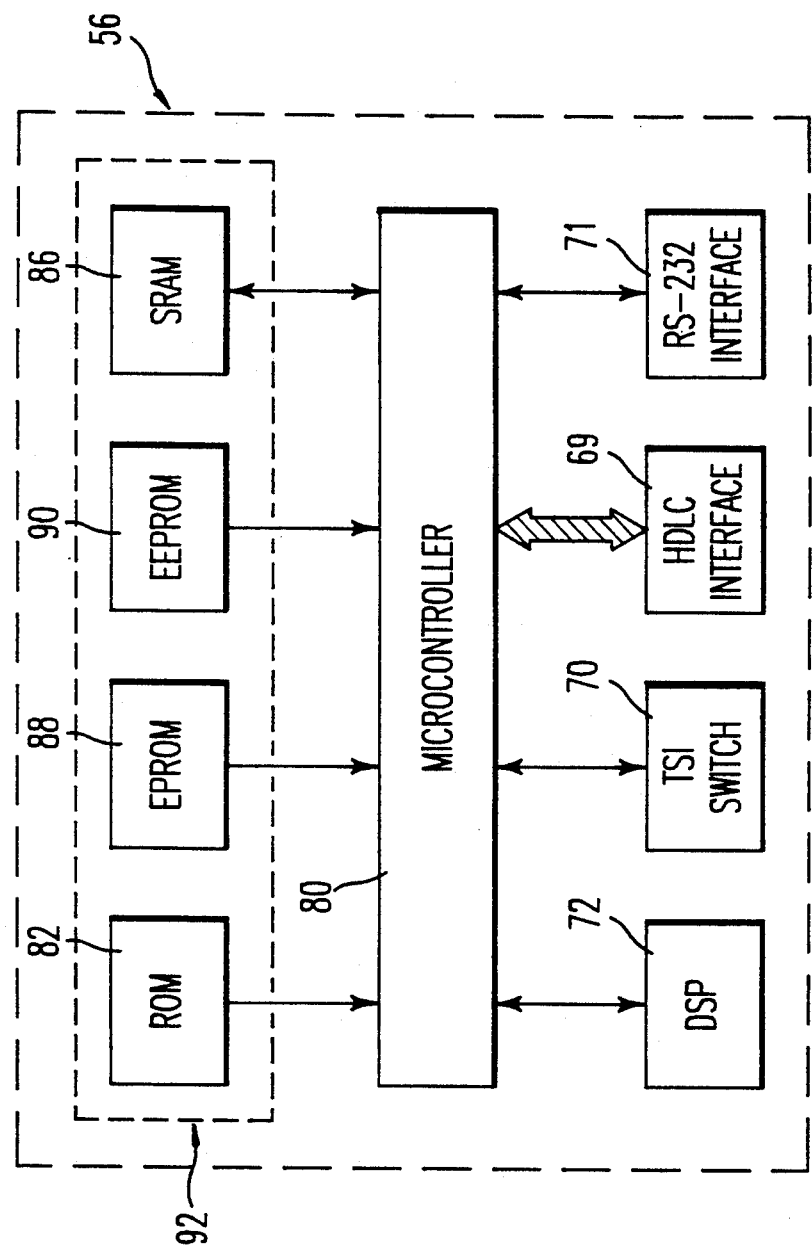
FIG. 8 is a block diagram of the CPU board constructed in accordance with the present invention.

With further reference to FIG. 8, the memory associated with the microcomputer 80 is preferably configured using a generic memory module (GEMM) 92 which is a configurable memory and physical space that can be programmed to accept a variety of memory types, that is, ROM, SRAM and pseudo static RAM, depending on system requirements. The microcomputer 80 is also coupled to a high-level data link control (HDLC) interface circuit 69 and to an RS232 standard interface circuit 71 for connection with the other peripheral boards in the GTU 42 via the serial telecommunications bus 57 and the RS-232 link 53 described in connection with FIG. 4.

III. CPU Board Software

The CPU board software is written in accordance with a multi-layer architecture which preferably comprises three software layers, including low level drivers written in the Turbo C and Turbo-Assembler computer programming languages, mid-level data handling code written in the Turbo C and the Turbo C++ computer programming languages, and high level code written in a novel computer programming language which is one aspect of the present invention. The CPU board software is generally designed to facilitate the use of the microcomputers provided on each of the peripheral boards 54 and on other CPU boards in the telecommunications system 10 to create a system which has distributed processing control and is capable of multitasking operation.

A. Low Level Drivers

The first layer comprises low level drivers which are software modules for handling board-to-board communications, on-board hardware communications and timing. The CPU software low level drivers comprise the hardware specific portion of the CPU board software. The low level drivers interface individual hardware devices by performing a sequence of write and read operations to and from device registers.

The software structure for interfacing the high level code and the low level drivers comprises two function calls including a transmit call, i.e., tx[command packet], and a receive call, i.e., rx[command packet]. A command packet generally comprises a slot address byte, a port address byte, a command byte and operand bytes, and is described in further detail below in connection with FIG. 18. These function calls are preferably the same software functions used by the CPU board 56 to send commands to, or to receive responses from, the peripheral boards.

The microcomputer 80 under the control of high level program code generates an outbound command using the transmit function. The outbound command is processed by low level code drivers to determine if the outbound command is for a CPU board device or for a peripheral board. If the command is for a CPU board device, the low level code program for that device controls the operation of the device to execute the command and to place a response into the receive stack 75 (FIG. 7) of the CPU board 56. If the command packet is for a peripheral board, the microcomputer 80 places the packet into the transmit stack 74 for transmission by the CPU board HDLC protocoller 69. Responses from the peripheral boards, as well as on-board components, are placed in the receive stack 75. Responses are accessible to high level coded program modules by using the receive call function to read them from the receive stack 75.

The low level drivers contain interrupt service routines (ISRs) which are preferably written in Turbo C and modified in Turbo Assembler for fast execution. Interrupt service routines can be useful, for example, in prioritizing the multitude of tasks which can be directed to a single board. Some low level drivers operate independently of the mid-level and high level codes, since the drivers are written to perform a pre-defined task requiring no other interaction with the CPU board software. Other low level drivers are written to perform tasks for the higher levels, because the tasks require invoking program code to which the high level programs do not have access. An example of a low level driver is a port timer driver which uses a one second hardware interrupt generated by a real time clock chip (not shown). Other ISRs use a 10 millisecond hardware interrupt provided by the internal timer device located on the microcomputer 80. Low level drivers can be created to control, for example, the CPU board TSI switch 70, the status LEDs connected to output lines of the CPU board and a real time clock circuit (not shown) which provides system timing control. Low level drivers can also be created to control the resetting and program downloading operations of the DSP 72, as well as the timing and switching of tones generated by the DSP. Further, low level drivers can be created for effecting HDLC interrupt service routines and for providing telecommunications services such as conferencing.

The microcomputer 80 preferably comprises a timer counter (not shown), the output of which is connected to the microcomputer's interrupt line. The counter is operated with the real time clock circuit and a 10 millisecond interrupt service routine (ISR), which is stored in the memory of the microcomputer, to trigger the interrupt line approximately every 10 milliseconds.

The microcomputer 80 is operated in accordance with a low level driver created for tone control to provide for the timing and switching of tones, which are generated by the DSP 72, onto the output channels of the DSP 72. The microcomputer 80 under the control of a high level software routine can request a tone pattern by transmitting a Tone On (STN) command to the DSP 72. The STN command packet is generally used to control the DSP 72 to provide a tone pattern onto one of the output channels of a PCM highway 57. For example, a tone pattern can be generated by switching a tone to a port, then providing an interval of silence to the port, and then switching another tone to the port. The microcomputer 80 can control the DSP 72 to repeat this tone switching process a selected number of times. The number of tone repetitions, the timing of the tones and the duration of intervals of silence between the tones can be specified in the command packet.

The microcomputer 80 is preferably provided with a Plurality of tone databases for generating a variety of tones using the DSP 72. For example, three of the DSP channels can be configured to provide dial tone, out of service tone or ring back, respectively. The microcomputer selects one of these tone databases and initializes it with the above-described parameters in the command packet. Thus, when the tone ISR is invoked by the microcomputer 80 during the 10 millisecond ISR, the tone ISR operates the microcomputer 80 to count the number of times that the tone ISP is entered (i.e., once every 10 milliseconds) and compares the count number to values stored in the tone databases. The results of the comparisons determine when the microcomputer 80 switches to a new tone or to silence during a selected sequence of tone patterns, or stops a sequence. A tone pattern is terminated when the high level driver uses the receive call function to send a Tone Off (STF) command to the low level driver in order to switch the port from the DSP channel providing the tone to another channel. The STN and the Turn On Silence (STS) commands terminate tone generation and provide silence, respectively, on the PCM highway and channel designated in the command packet of the call function.

A low level driver similar to the tone control low level driver is used to transmit a DTMF tone over a trunk line. A DTMF tone is requested by the microcomputer 80 by sending a DTMF Tone (SDT) command to a DTMF FIFO associated with the microcomputer 80. The SDT command operates the DSP 72 to generate a DTMF tone on the PCM highway and channel specified in the SDT command packet for the key pad number and output port also designated in the command packet. A counter routine in the 10 millisecond ISR calls the DTMF ISR every tenth time, or every 100 milliseconds. When the DTMF ISR is invoked by the microcomputer 80, the microcomputer reads the next command from the DTMF FIFO to get the keypad number from the command, and to transmit the keypad number to the DSP 72. The microcomputer 80 then switches the DSP's DTMF output channel to the specified port. The DTMF generator in the DSP 72 generates the requested DTMF tone and transmits the tone on its DTMF output channel. The next time the DTMF ISR is entered, 100 milliseconds later, the microcomputer 80 switches the port to silence. The next time the DTMF ISR is entered, after another 100 milliseconds, the microcomputer 80 checks the DTMF FIFO for the next command to repeat the process.

A low level driver is also provided in the memory of the microcomputer 80 for implementing conferencing. The microcomputer memory comprises a conference database for storing data to determine connections for as many as eight ports or 64 kilobits per second voice channels. The DSP 72 is preferably provided with four input channels and four output channels for conferencing. In accordance with the present invention, a CPU board 50 is preferably operable to permit each of the first three users of the conferencing function to talk to all of eight users and to listen to the other two talking users. The other five users can generally only listen to the first three talking users. Ports having the highest voice signal energy levels are maintained in the first three of eight positions in the conference database. Data relating to a particular port and the voice signal energy level are stored at one of eight assigned positions in the conference database along with the PCM highway and time slot corresponding to the port. When a new port is added to the conference database, the microcomputer 80 assigns the port to an available position in the conference database.

The output of ports in the first three positions of the conference database are switched respectively by the microcomputer 80 to the first three input channels of the DSP 72. The output of ports in the remaining five positions of the conference database are alternately switched to the fourth DSP input channel as described below. The DSP is operable to add the ports in the second and third positions of the conference database and switch the signal on the first DSP output channel. Further, the DSP adds the ports in the first and third positions, as well as the first and second positions of the conference database and switches the signals to the second and third output channels of the DSP, respectively. The DSP adds the ports in the first three positions of the conference database and switches the combined signal to the fourth output channel of the DSP.

During the conference ISR, which is invoked by the microcomputer 80 with the occurrence of every other 10 millisecond ISR, the DSP 72 supplies the microcomputer 80 with the energy value of the port switched to the fourth DSP input channel. The conference ISR alternately connects the ports assigned to the eight conference database positions with the fourth DSP input channel. After eight conference ISRs, the microcomputer 80 will have been given the voice energy for the ports assigned to each position. If a port that is assigned to one of the fourth through eighth positions has a higher energy than a port that is assigned to a first, second or third database position, the microcomputer 80 switches that port's position assignment with the port assigned to a first, second or third position that has the least energy. The port connections are then switched by the DSP so that they correspond to their new conference database positions.

If a conference has less than eight parties, the scheme is the same, except that the energy is only checked for the positions occupied. If there are three parties or less, no energy comparisons are performed. Since a conference is provided every other 10 millisecond ISR, the microcomputer is operable to support two conferences using alternate 10 millisecond ISRs. There are three command packets which occur in the high level code and which call a low level code to commence conferencing. The Add Port (SCA) command adds a port from a specified PCM highway channel to a specified PCM highway channel. The operand of the SCA command packet also comprises at least one bit to specify which of the two conferences is having a port added. A Drop Port (SCD) command and a Drop All Ports (SCX) command is provided to drop a port from the first or second conference and to drop all ports from a specified conference, respectively.

An HDLC interrupt service routine (ISR) or HDLC low level driver is provided to control communication between the CPU board 50 and the peripheral boards 54. The microcomputer invokes the HDLC ISR upon execution of every 10 millisecond ISR. The HDLC interface 69 under the control of the HDLC ISR checks the status register of the HDLC interface 69. If an error is detected, the HDLC interface 69 is reset. If the HDLC interface has a received packet, the HDLC interface 69 inputs the packet from the HDLC receiver buffer and places it in the receive stack 75 of the microcomputer 80, if the packet has no errors. If the HDLC interface 69 detects an error on the received packet, the HDLC interface discards the packet, and a negative acknowledgement (NAK) command is transmitted to the peripheral board that sent the erroneous packet. If no packet is received at the HDLC interface 69 and the microcomputer 80 is waiting for a response, a timeout command is placed in the receive FIFO 75 in accordance with the HDLC ISR. If the last command transmitted by the HDLC interface to a peripheral board 54 was a Slave Activity Inquiry (SAI) command, the HDLC interface under control of the HDLC ISR places the next command packet from the transmit stack 74 to the HDLC transmit buffer. Otherwise, the HDLC interface generally continuously checks the status of each peripheral board by transmitting an SAI command to the peripheral board 54 which is the next on a circular list of boards in the configuration file to receive the next command from the microcomputer 80.

A low level driver is provided to operate the time space interchange switch 70. The microcomputer 80 can control the switch to connect any input port (i.e., a channel on one of the PCM highways 57) to any output port using the Switch Connect (SCN) command. The switch can also be operated, upon receipt of a Switch Read (SRD) command from the microcomputer 80, to read digital data from a memory register associated with the switch for storing received PCM highway channel data and to place the channel data into the receive stack 75. The switch can also write data to a specified output port from a channel data register in accordance with a Switch Write (SWR) command. The microcomputer can provide the switch with a Switch Reset output channel (SRS) command to provide a high impedance state to a specified channel. Further, Switch Silence (STS) and Switch Reset and Initialize (SIN) commands can be sent to the switch 70 to transmit silence on a specified port and to reset and initialize the switch, respectively. The 32 channels of the dedicated PCM highway 59 can be independently written to by the switch. The dedicated PCM highway 59, therefore, can be useful to provide frame synchronization to the DSP 72 by writing a "1" to the first bit in the first channel and a "0" to all other bits in that channel, as well as in the remaining 31 channels.

A low level driver is provided to control the real time clock (not shown) associated with the microcomputer 80 and, therefore, to provide system time. The real time clock is initialized to create a one second hardware interrupt to the microcomputer 80 which can be used for controlling software port timers, which are located in the microcomputer's memory and are each associated with a corresponding one of the 192 available ports. As stated previously, 192 ports is an exemplary number, as the system 10 is capable of supporting any number of ports.

The port timers are set by the microcomputer 80 by sending a Port Timer Initialize (PTI) command packet to the port timer corresponding to the port address specified in the command packet. The timer is set to a timeout value specified in the PTI command packet. During each one second interrupt, the port timers having values greater than zero are decremented by one. When a port timer's value transitions from 0 to 1, data associated with the port is placed in the receive stack 75. The port timer can be shut off at any time prior to Time Out upon receipt of a PTI command having a timeout value of zero. Other command packets, which can be sent to control the real time clock chip by the microcomputer in accordance with high level software, include a Real Time Clock Set (RTS) command for setting the real time clock date and time, the Real Time Clock Read (RTR) command for reading the real time clock date and time and for placing the data in the receive stack 75, as well as the Real Time Clock Initialize (RTI) and Real Time Clock Adjust (RTA) commands for initializing and adjusting the real time on the chip to the nearest whole minute, respectively.

The software for the DSP 72 is stored in ROM on the CPU board 50. During initialization, the DSP is reset, and the DSP software is downloaded from the ROM. The reset is done by strobing a latched output port of the microcomputer 80 which is connected to the DSPs reset circuitry. The CPU board low level software controls the microcomputer 80 to read the size of the DSP program from the first two bytes in the ROM. The microcomputer then reads the program from the ROM and sends it to a DSP host port three bytes at a time. The high level code can reset and download the DSP program at any time by sending a DSP Reset and Download (DRS) command packet to the DSP.

Three status LEDs are connected to three latching output lines of the microcomputer 80. When an LED command packet is sent by the microcomputer under control of high level software, a low level software driver for LEDs controls the microcomputer to apply a signal to the appropriate line to control the LED. Other board status commands include the NAK Transmitted (NTX) command and the NAK Received (NRX) command which are generated by the high level software to determine, from the low level drivers, the number of NAK command packets which have been transmitted to and from the boards.

B. Mid-Level Code

The second layer of the CPU board software, that is, the mid-level code, functions as a mediator between the high level language of the present invention and the low level drivers. The mid-level code contains data, subroutines, software managers and an interpreter program module, each of which is described below.

The data contained in the mid-level code comprises for each port programmable subscriber data such as feature programming, fixed subscriber data such as the listed directory number (LDN) assigned to that port and state data (i.e., line conditions such as hold or on-hook) which can be altered by the microcomputer 80 for its own use, as well as other data relating to system status and configuration. Turbo C++ is preferably used to encapsulate the data corresponding to each port in the telecommunications system 10. Accordingly, each port has allocated CPU board memory space during run-time for storing its object data code containing the above-described critical system data. The data associated with the object data code preferably can only be altered by the port's own object port code, which is a small subroutine within the object data code.

The mid-level code also contains subroutines which are preferably written in Turbo C and which are invoked by the high-level language as needed. These routines have specific pre-determined functions that may involve computational analysis or large scale data handling. For example, a macro subroutine can be written to place packets into dynamically allocated first-in-first-out (FIFO) storage associated with the microcomputer 80 on the CPU board 56 when called. The particular packet placed there depends on the macro being requested and the port requesting it. The packets placed in the FIFO are generally the same as might be expected. For example, someone might dial a number, and the system may be configured to forward the call. One way to accomplish this task is to macro the new digits into a FIFO on the CPU board. These digits would appear as if they came directly from the telephone. The existing digits would be erased and the macro would place the new digits in part of the high-level code, i.e., such as the call processor described below, which collects digits. The main software program would then resume control to dial the new digits.

Macros are tools to assist the user in programming with the high level language. Macros allow much more mobility throughout various situations. There are preferably twenty macro FIFOs allocated in the memory of the CPU board. The number of FIFOs and their size is easily variable. When a port has a macro packet, a FIFO is assigned to that port at that time. When the FIFO becomes empty, it is unassigned from that port and is free to be used with another port. Macro FIFOs have priority over the main FIFO of the CPU board. The main control program, therefore, controls the microcontroller to read from macro FIFOs first, then when it is empty, to read from the main FIFO.

The managers in the mid-level code are larger subroutines for controlling a specific CPU or peripheral board function or system function. For example, the various communications protocols utilized by analog and digital telecommunications equipment coupled to the peripheral boards 54 of the system 10 are generally dealt with by managers written for each of these peripheral boards such that the different protocols are concealed from the high level language program modules used with the present invention. Each manager essentially is written to know what type of data is to be sent to the CPU or peripheral board or system function, as well as how and when the data should be sent to successfully operate the board or complete the system function. The CPU board software is written to analyze a data packet which has been received from a peripheral board or another CPU board to determine the proper software manager for processing the packet. The selected manager can then, in turn, alter system data and discard the packet, simply discard the packet, simply discard the packet, alter data and then send the packet to high level software code for processing, or pass unaltered data to a high level coded program module. Thus, the managers can provide a uniform interface with the high level code while accommodating the specific characteristics of its board or system function. Managers can also be called by high level language modules as described below.

Another important aspect of the mid-level code is the interpreter code, a program which runs data code which is translated from high level coded modules. The data code can be used by the main CPU software, i.e., the low level drivers, and the data, subroutines, and managers of the mid-level code. The interpreter, when implemented in conjunction with the novel, high level language of the present invention, allows a user of the telecommunications system 10 to write processor code to configure and use the telecommunications system 10 substantially as desired by the user. The interpreter is described below in connection with FIG. 9. A commercially available, PC compatible translator program can be used to translate the alphanumeric syntax of the TELECOM language programs to the data code which is run by the interpreter. The data code files can be downloaded into the CPU board memory following translation. The INCLUDE files (described below) can also be used by the translator software before data code is downloaded.

C. High Level Code

The third level of CPU board software is the novel high level code of the present invention. The high level language comprises three general commands, three operative commands, and two types of files which will hereinafter be referred to as processors. As stated previously, the CPU board comprises an interpreter program module in the control program memory 79 for translating high level coded program lines to commands that are understood by the microcomputer 80.

The first type of processor is referred to as a call processor. Only one call processor preferably exists in the telecommunications system 10. The other type of processor is referred to as a device processor. The system 10 can have as many device processors as the interpreter is written to translate. The call processor is the highest level of software in the system 10. Both the call processor and device processors can access individual managers and alter specific data. The call processor, however, can also call program modules in a device processor. Device processor can call program modules in other device processors, but to a more limited extent. The device processors are written to handle specific telecommunications peripheral devices (i.e., analog phones, digital phones and trunk lines) The call processor is written as a common module for all devices such that calls from various periperal devices, including analog and digital telephones, ISDN telephones, terminals and automated operators, can be processed substantially identically by the CPU board. The CPU board in accordance with its software and, in particular, the call processor, can execute for each of these peripheral devices such system functions as ringing, call connecting, placing calls on hold, call conferencing and so on. The call processor calls a module in a device processor because different devices must be handled with different actions. For example, collecting digits on an analog phone is different from collecting digits in a digital phone, which is still different from collecting digits on a trunk line. The device processors in conjunction with the managers conceal these operational differences from the call processor. Ideally, this allows for simpler addition of different devices to the system and buffers the specific characteristics of each device from the call processor.

As stated previously, the high level language generally comprises three operative commands: an "X" command, a "Q" command and a "C" command. The software programs in Addendices A, B and C are examples of programs written in the high level language. The "X" or TRANSMIT command initiates a manager to take an action, usually involving sending a data packet to a peripheral board and adjusting its own data. Included in the "X" command is access to each port's object database. This is possible because the array of object databases is provided with its own manager. Each type of physical board (except the main CPU) preferably has its own manager. There are many managers for system functions which the "X" command may access as well.

Another command is the "Q" or QUESTION command which is the decision-making command within the high level code. It tests a particular byte in a Global Command Buffer (not shown) associated with the microcomputer 80 and, depending on its contents, jumps to a new location in the high level language. This command does not alter the contents of the Global Command Buffer, so several consecutive "Q" commands may be run on the same data.

The third operative command and perhaps the most complicated is the "C" or COMMAND command. This command allows a processor written in the high level code to jump unconditionally to a new location, to call a module in a device processor from the call processor, to call a pre-defined subroutine written in Turbo C, to specify a wait statement, or to return from a called module to the calling processor.

The three general commands of the high level language are the INCLUDE statement, the DEFINE statement and the ENTRY command. The INCLUDE statement is generally included at the top of a processor file or program module. When the microcomputer 80 is operating in accordance with the mid-level interpreter program, the INCLUDE statement provides the microcomputer with the name of a definition file to use in the translation of the high level language processor file to a file that is usable by the main CPU software. The definition file specified in the processor code is then scanned for data conversion information by the microcomputer 80. The DEFINE statement provides the microcomputer 80, when it is running the interpreter program, with information relating to the line number in the code to which the microcomputer should jump following a reset condition and the line number that is the beginning of the file. The ENTRY command provides the microcomputer 80 with information relating to where specific program modules start and end.

The manner in which the microcomputer 80 executes the mid-level interpreter program module to translate user-created programs will be described with reference to FIG. 9. In accordance with the present invention, a user can create a call processor and various device processors, which are files of program code, using the novel high level language. At least one of the GTUs in the telecommunications system 10 is preferably coupled to a user terminal (not shown) comprising a key pad or is provided with a software download program to allow a user to enter and transmit digital data (i.e., program code) to the CPU board associated with the GTU. The user terminal can be provided with a CRT display for displaying CPU board output commands, queries or instructions.

The user program code generally provides the microcomputer 80 with data relating to the name of the source file of program code to be translated, the output files and any debugging output files, as shown in block 100. As indicated in block 102, the microcomputer 80 opens these files along with any definition files that are specified in the program code using the INCLUDE statement.

Figure 9:
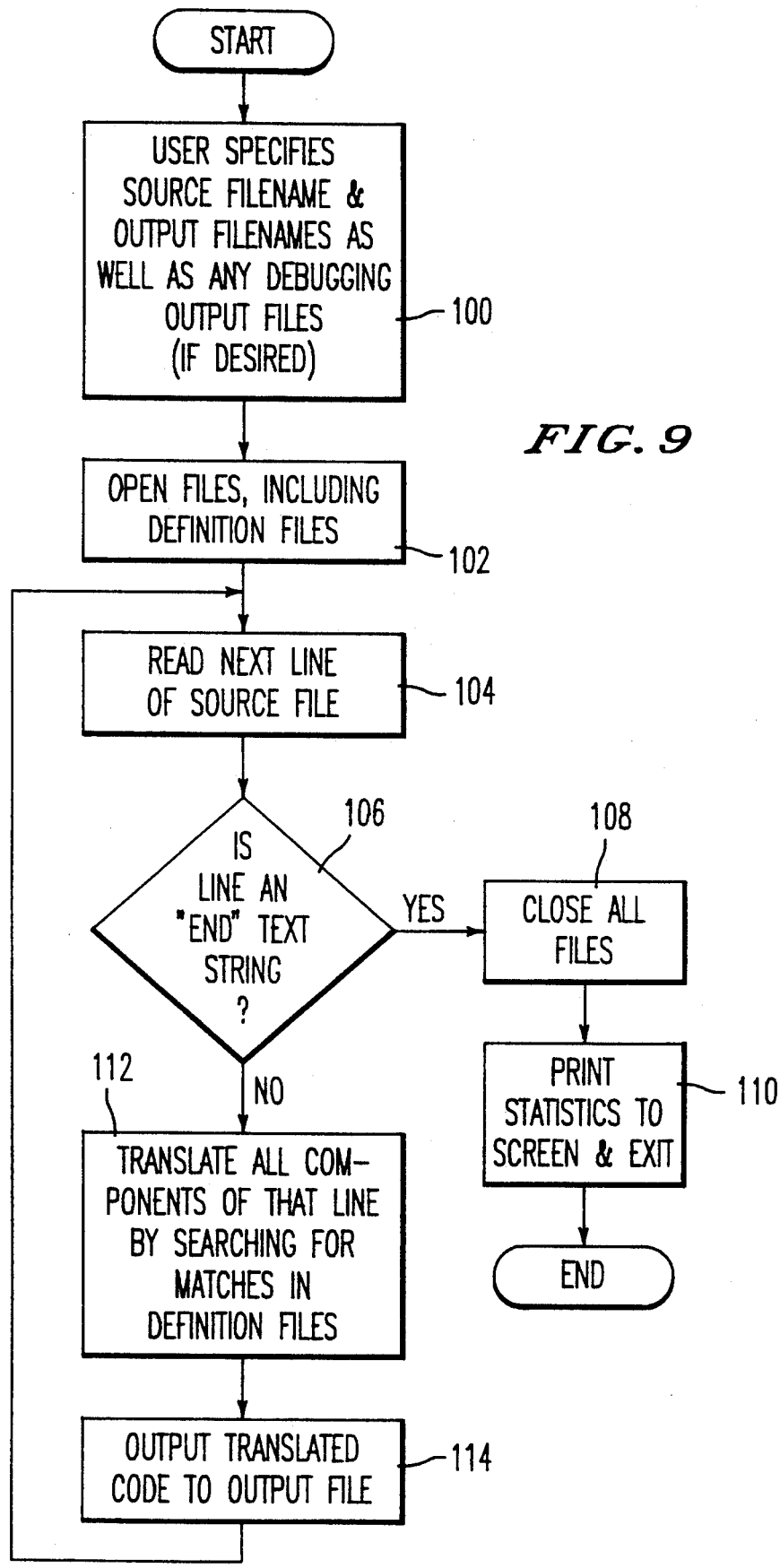
FIG. 9 is a flow chart depicting the sequence of operations for translating the novel high level language of the present invention to program code for controlling the CPU board.

With further reference to FIG. 9, the microcomputer 80 begins to read the source file line-by-line, as indicated by block 104. If the line comprises an END statement, the microcomputer 80 commences closing the opened files, as shown by the affirmative branch of decision block 106 and block 108, respectively. As indicated in block 110, the microcomputer 80 can be programmed to provide statistics relating to the extent to which the source file is successfully translated into code that is usable by the main CPU software. If the query of decision block 106 is negative, the microcomputer 80 translates all components in the line by searching the definition files for coded characters which correspond to the line components, as shown in block 112. The microcomputer 80 stores the translated code in the designated output file prior to reading the next line of the code in the source file, as indicated by blocks 114 and 104, respectively. The microcomputer 80 continues to read and translate the source file code line-by-line until it reaches a line comprising an END statement.

The interpreter program generally produces several data files. For example, a first file is generated by the microcomputer 80 which contains the source code after it has been converted into bytes as specified by the definition files called for by the INCLUDE statements. A second file or jump file is generated by the microcomputer, in accordance with the interpreter code, which contains a look-up table for module-to-line number conversions. This table allows the microcomputer to access program modules invoked by the source code quickly and accurately.

Reference is now made to Appendices A, B and C which contain high level language processor files for a call processor, an analog device processor and a trunk device processor, respectively. Each processor file contains, at the beginning of the file, two INCLUDE statements which specify the names of a COMMAND definition file and a PARAMETER definition file. The COMMAND and PARAMETER definition files are provided at Appendices D and E, respectively.

The COMMAND definition file contains data conversion information for translating high level coded inbound and outbound commands for each of several managers including a DBASE manager, a Timer-Counter manager, a Tone-Generator manager, a Storage manager, a Text-Message manager, a DTMF-Decoder manager, a Tone-Decoder manager, a DTMF-Dialer manager, a Switch manager, a Conference manager, an Analong-Basic-Services manager, a Trunk-Basic Services manager, as well as miscellaneous commands relating to error conditions. The PARAMETER definition file contains data conversion information regarding various data values which are, as with the manager commands, frequently coded into a high level program and therefore executed by the microcomputer 80 of the CPU board. For example, the PARAMETER file defines information bits and bytes which provide particular system status information such as the collecting bit (a bit which indicates that a port is seeking input data from a terminal) and a type byte (a byte which signifies what type of peripheral is associated with a packet containing the byte). The PARAMETERS file also defines arrays such as a dialed-number array, which is data relating to a dialed or forwarded telephone number.

The syntax of high level commands will be described with further reference to the high level language processor files in Appendices A through C. As previously stated, there are three command types. Program lines that begin with "C," which stands for "COMMAND", serve a variety of functions that are described below. The "C" command generally involves jumping to another location, waiting for reception of a packet, or executing a subroutine of Turbo C++ code. Program lines with the "X" or "transmit" command are used to access managers in accordance with the command and parameters specified in the brackets. Program lines with the "Q" or "question" command are used to test and compare data in the Global Command Buffer and to jump to a new location in the processor based on the comparison.

The C Command generally has the form: C[ACTION=LOCATION, METHOD, PORT IN CONTROL]. The ACTION field is generally one of three types, i.e., W, J or S. The or "WAIT" command instructs the interpreter to stop processing the specified port, and to wait until a packet is received for this port. Re-execution of processing the port occurs when a manager receives a packet and sets up the Global Command Buffer to start interpretation. Interpretation will resume at this location. No entries for PORT IN CONTROL or METHOD are valid here. The J or "JUMP" command instructs the interpreter to move the program pointer to the new location and resume interpretation. The S or "SUBROUTINE" command instructs the interpreter to execute a specifically written subroutine at this time and to resume at the next line when completed. These subroutines are needed to perform tasks in which it is not feasible to try to program in the high level or TELECOM language of the present intention. These tasks can include, for example, heavy data manipulation or complex decision making.

The LOCATION field depends on the ACTION preceding it. In the W action, the LOCATION field comprises an alphanumeric value representing a location within the same processor. This may also be LAST or NEXT. These are one-line move statements which specify, respectively, the last or next location. Another value is CONTINUE, which can be used in the LOCATION field and is generally only valid in device processors. This command returns to the other device processor the call processor that called it. The W action may to be used to jump to another processor. No PORT IN CONTROL or METHOD entries are valid here. The J action has two formats. The first format involves a direct unconditional jump to a new location in the present processor. (This is the same as in the W action.) The CONTINUE location may be specified as well to return control of the microcomputer 80 from one processor to the other device processor or the call processor which called it. No PORT IN CONTROL or METHOD is valid here. The second format involves a jump to another processor. This is only a jump to another processor. Here, PORT IN CONTROL and METHOD entries are necessary. PORT IN CONTROL is the port for which the module location or location is executed. When done, (i.e., when a CONTINUE is reached) program control will return to the next line with the original port being in control. METHOD is needed to tell the interpreter what special control conditions are going to occur to perform this jump. There are three conditions. With the SUBROUTINE action, for example, the LOCATION parameter is the subroutine name. The METHOD and the PORT IN CONTROL are parameters which get passed to the subroutine. Subroutines can leave parameters in the Global Command Buffer for use by the novel high level TELECOM language.

The X command generally has the form X[MANAGER, COMMAND data1, data2, data3, ...] The Manager field is simply the manager which will be called with the command and data. This is preferably the only way by which a manager can be called from the TELECOM language. The COMMAND field is the specific command in the manager which is to be invoked. The command names are usually acronyms. Each manager has its own commands and some share the same commands. A description of the command acronyms is provided at Appendix D. The number of data entries following depends on what that commands needs. The DATA field is the parameters to be provided to the manager. These can consist of hard coded numbers or parameters as described in Appendix E. Some parameters are simply provided to the manager as their numeric equivalent, while others tell the interpreter to put special data in a specified port in the GLOBAL COMMAND BUFFER. An example of this special data is the parameter PORT. PORT instructs the interpreter to put the number of the port presently being processed in a specified location and not the numeric equivalent of the parameter PORT.

The Q command generally has the form Q[WHICH PARAMETER/VALUE?=LOCATION?, ... ]. The WHICH PARAMETER is the position in the Global Command Buffer (GCB) to be tested. C or P0 represents the first byte in the buffer. P1 is the second and so on up to P13 or whatever the maximum parameter is defined to be. The VALUE field is the parameter that is used to compare to the contents of the GCB in the specified location. All numeric values, some Parameters and all commands are valid in this field. ELSE can be used in the value field to indicate that if no other value matches, then count the parameter specified in the LOCATION field. When a match occurs or ELSE is chosen, the corresponding LOCATION is the jump location in the present processor to which program control is moved. The LOCATION field is the place in the present processor to jump to when the corresponding value? is true. There can be as many as five "value?=location?" combinations per Q command. If not enough selections can fit in one Q command, ELSE is set to equal NEXT, and another Q command is used to test the same location in the GCB.

V. Analog Board

Each analog board 44 (FIG. 3) associated with the telecommunications system 10 comprises circuitry for processing a plurality of voice channels. For example, the analog board can perform any of the following line functions for each telephone line coupled to the board: on/off hook detection, hookflash detection, ring relay activation and deactivation, ring trip detection, digit collection, ground key detection, line power up and power down and PCM timeslot selection.

Figure 10:
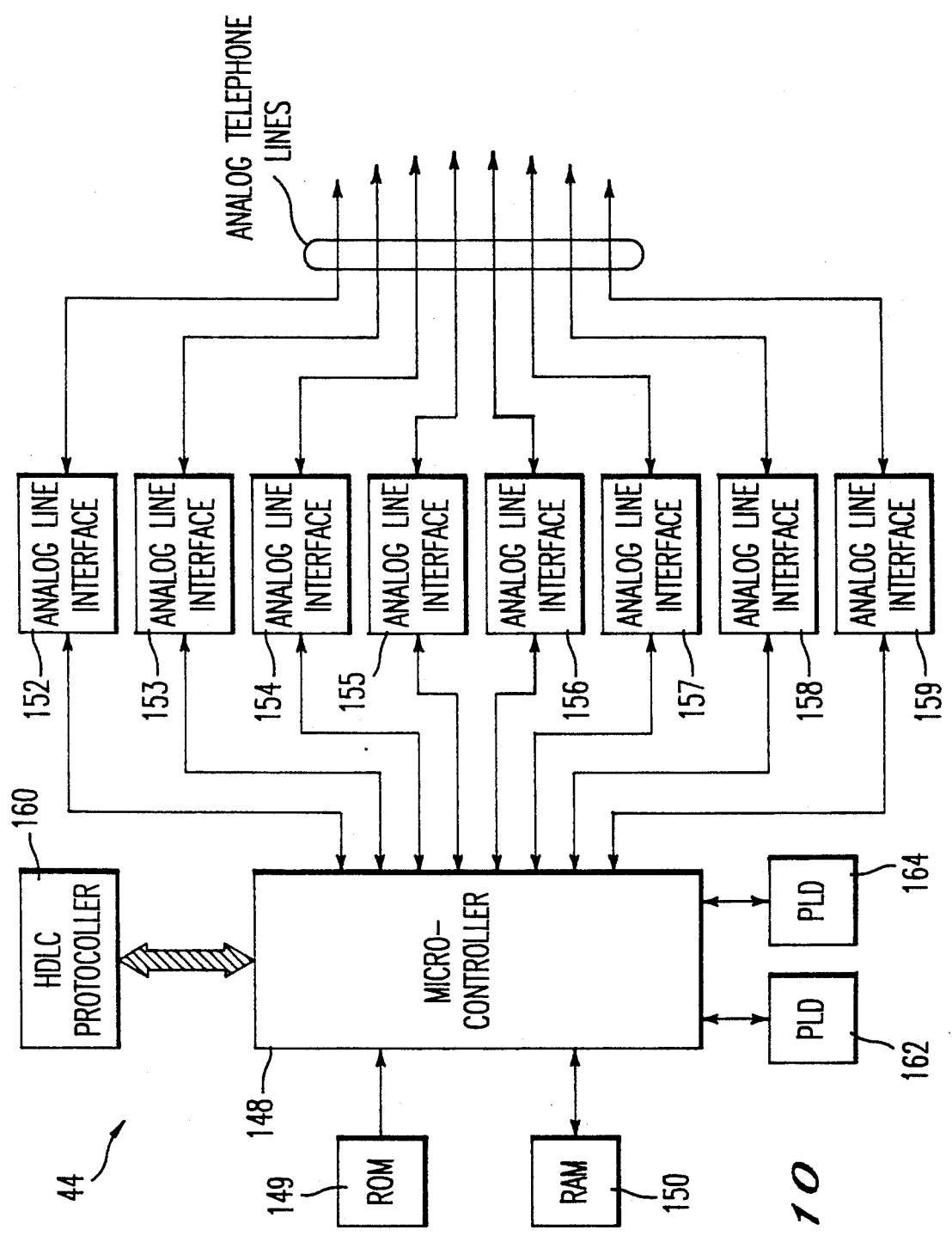
FIG. 10 is a block diagram of an analog board constructed in accordance with the present invention.

With reference to FIG. 10, the analog board 44 comprises an on-board processor 148 which is preferably an Intel 80C52 microcontroller. The microcontroller 148 is provided with an 8 kilobyte read-only memory (ROM) 149, which is masked with microcontroller firmware for controlling basic microcontroller functions, and a random access memory (RAM) 150 comprising 256 bytes of data memory. The microcontroller 148 is coupled to several peripheral devices including eight analog line interfaces 152 through 159, an HDLC protocoller 160, and two programmable logic devices (PLDs) 162 and 164. The basic functions of the analog board are PCM channel selection, slot address reading, initialization, HDLC communication, maintenance and error detection. These board functions and the aforementioned line functions are implemented by analog board firmware which is stored in the RAM 150 of the microcontroller 148. The analog board firmware is written in modular fashion, that is, the program is divided into many smaller segments rather than being provided as a single monolithic program. The program modules are defined according to specific functional tasks and hardware requirements. This programming technique provides several benefits. The modules are less complex and are therefore easier to write, test, and debug. Program development is divided into well-defined and isolated modules to allow for the distribution of coding work. Finally, certain program modules can be used with other boards in the telecommunications system 10, which increases development speed and reliability since these common modules have already been debugged. The programming method also takes advantage of the capabilities of the Intel 80C51 microcontroller by using extensive bit manipulation, direct port access, and an interrupt-driven program for real-time response.

The analog board 44 firmware program is preferably divided into four main sections, including the initialization routines, the device drivers, the main foreground program, and the interrupt driven background routines. The majority of the actual processing takes place within the various background routines so as to provide deterministic, real-time operation.

The initialization routines are executed after the microcontroller 148 is reset, such as during a hardware reset (i.e., analog board power-up or watchdog timer reset) or during a software reset called from within the firmware program. The initialization routines comprise routines for setting up the microcontroller for operation. The microcontroller 148 set-up routine involves calling other initialization routines, setting up the interrupt structure, which is described below, and loading the internal registers with start-up values contained in the system memory 92 (FIG. 8). The initialization routines further comprise routines for initializing microcontroller 148 data register values, reading the analog board's physical address for system communications purposes, initializing the peripheral devices controlled by the microcontroller, loading a Ready To Start (RTS) response to a query from a CPU board, and waiting for a system command from a CPU board. As previously discussed, the analog board can be configured to receive commands from the CPU board 44 in the same generic telecommunications unit GTU) as the CPU board, and from a CPU board in a different GTU, for example, in the same or other cabinet.

Figure 11:
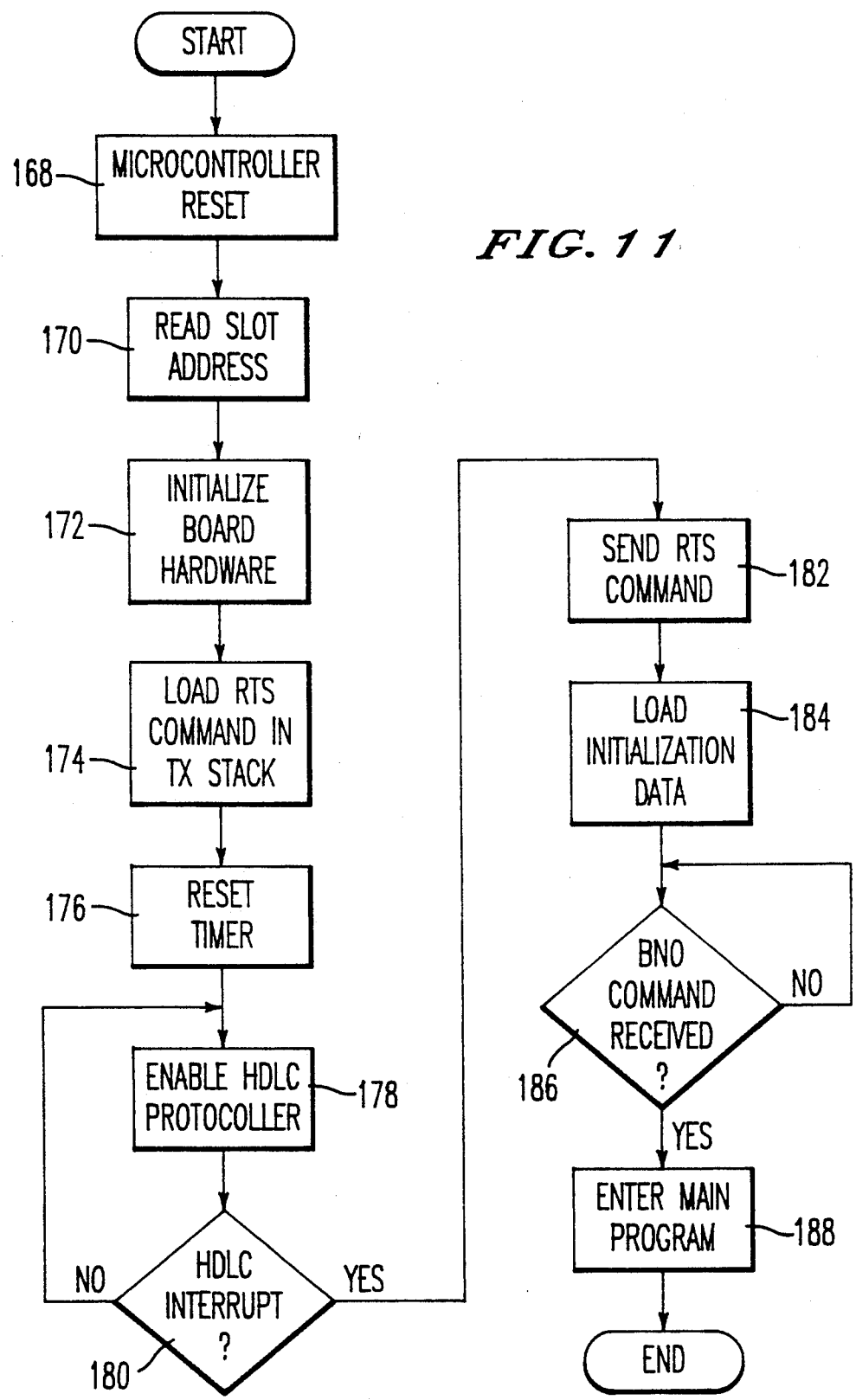
FIG. 11 is a flow chart depicting the sequence of operations for initializing a peripheral board.

With reference to FIG. 11, initialization begins with a microcontroller reset as shown in block 168. Following a microcontroller reset, the microcontroller 148 is programmed to determine the type of board that it controls by reading from predetermined registers, and to read the address of the board on which it is mounted, as indicated by block 170. The board address is read by multiplexing a single I/O pin through a logic device to the five signal lines B_SA0 through B_SA4 provided on the backplane.

With reference to block 172, the microcontroller 148 initializes components associated with the peripheral devices, including various microcontroller data registers, the analog line interfaces 152 through 159, the HDLC protocoller 160 and the programmable logic devices (PLDs) 162 and 164. Each analog line interface comprises an audio coder/decoder (CODEC), a subscriber line interface circuit (SLIC), and passive devices required for line ringing, protection, and battery feed. The microcontroller 148 accesses the CODEC directly through a serial link that is implemented in software. The SLIC is accessed by the microcontroller 148 through extended I/O ports on the CODEC. The microcontroller 148 initializes the CODEC's PCM timeslot, the receive and transmit volume, companding method, and hybrid balance registers. On the SLIC, the line state is controlled, and the hookswitch status is monitored. The SLICs are initialized for standby operation and loop detection. The HDLC protocoller 160 is initialized to run at 192 kilobits/second. The internal timing, and the receive address recognition functions of the HDLC protocoller are enabled. The receive address is the slot address that is determined by the microcontroller. The two programmable logic devices 162 and 164 are used for signal buffering, multiplexing, and PCM highway access. The microcontroller 148 uses one of the PLD's 162 to read the backplane for the slot address described above. The other PLD 164 is used to select the appropriate PCM voice highway and to provide a tri-state condition on all timeslots not being used.

The microcontroller 148 selects and enables the appropriate highway through three I/O pins on the PLD 164.

Figure 16:
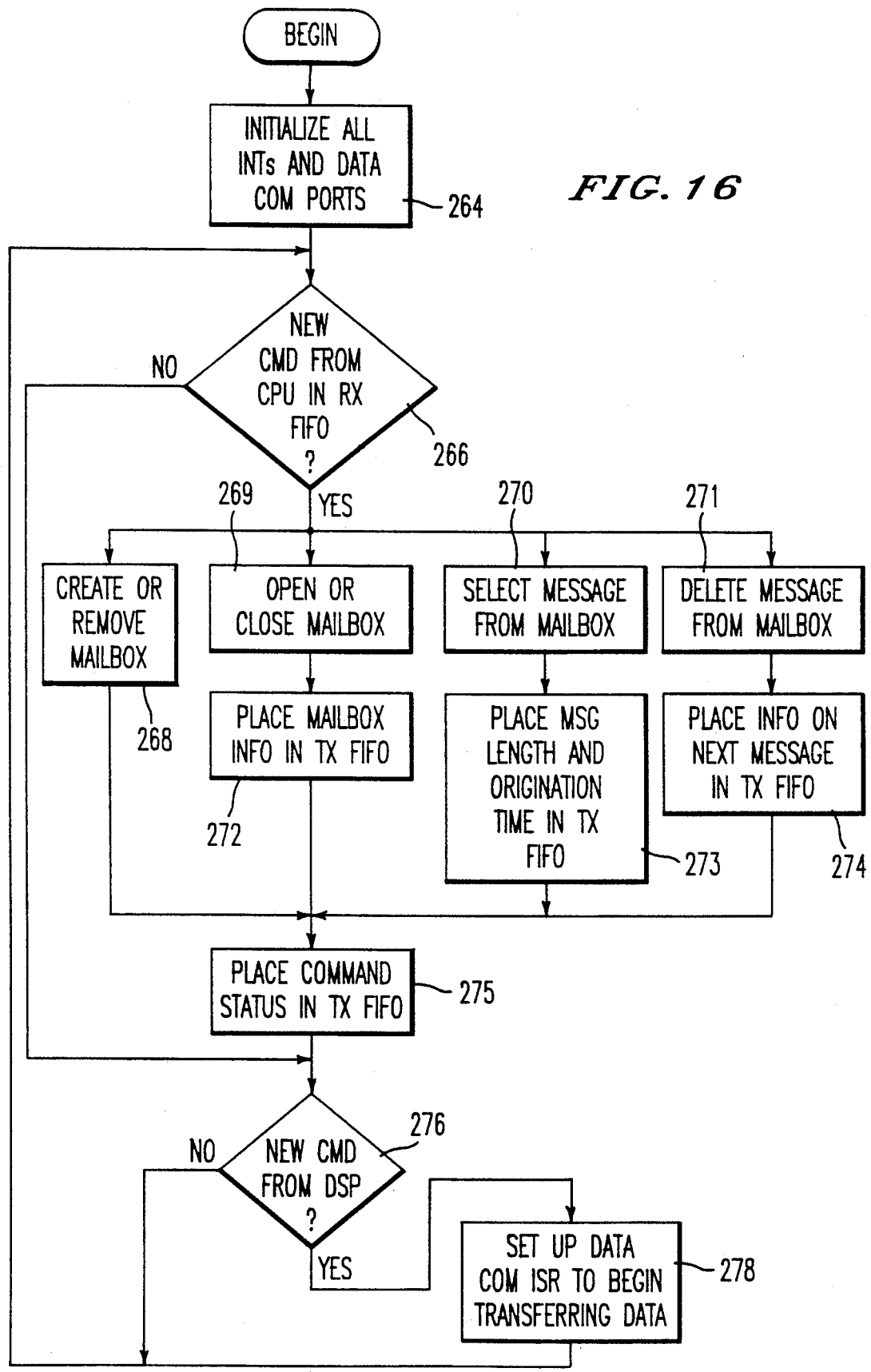
FIG. 16 is a flow chart depicting a sequence of operations for controlling the storage module board of FIG. 15.

Following initialization of the peripheral devices, the microcontroller 148 loads a ready to start (RTS) command in digital memory (i.e., an internal transmit stack) in preparation for its transmission, as indicated by block 174 of FIG. 16. Further, a watchdog timer coupled to the microcontroller 148 is reset, and the HDLC protocoller 160 is enabled, as shown in blocks 176 and 178, respectively. Following enablement for reception, the HDLC protocoller 160 acts as a slave to the CPU board 56 in a master/slave communications environment. As will be described in further detail below, reception of a valid packet causes the HDLC protocoller 160 to generate an interrupt which the microcontroller 148 then services.

With reference to the decision block 180, the microcontroller 148 does not engage in further processing until an HDLC interrupt request signal is received from the HDLC protocoller 160, as shown by the negative branch of the decision block 180. The valid interrupt conditions for generation of HDLC interrupt requests are the presence of a receive end of a transmitted packet which occurs when a full packet with the correct slot address has been received by the HDLC protocoller 160, and the presence of a transmit end of a packet which occurs when a packet transmission to the system CPU board 56 is complete. If one of these two conditions does not exist, an interrupt error condition is generated and the HDLC protocoller 160 is re-initialized.

Figure 12:
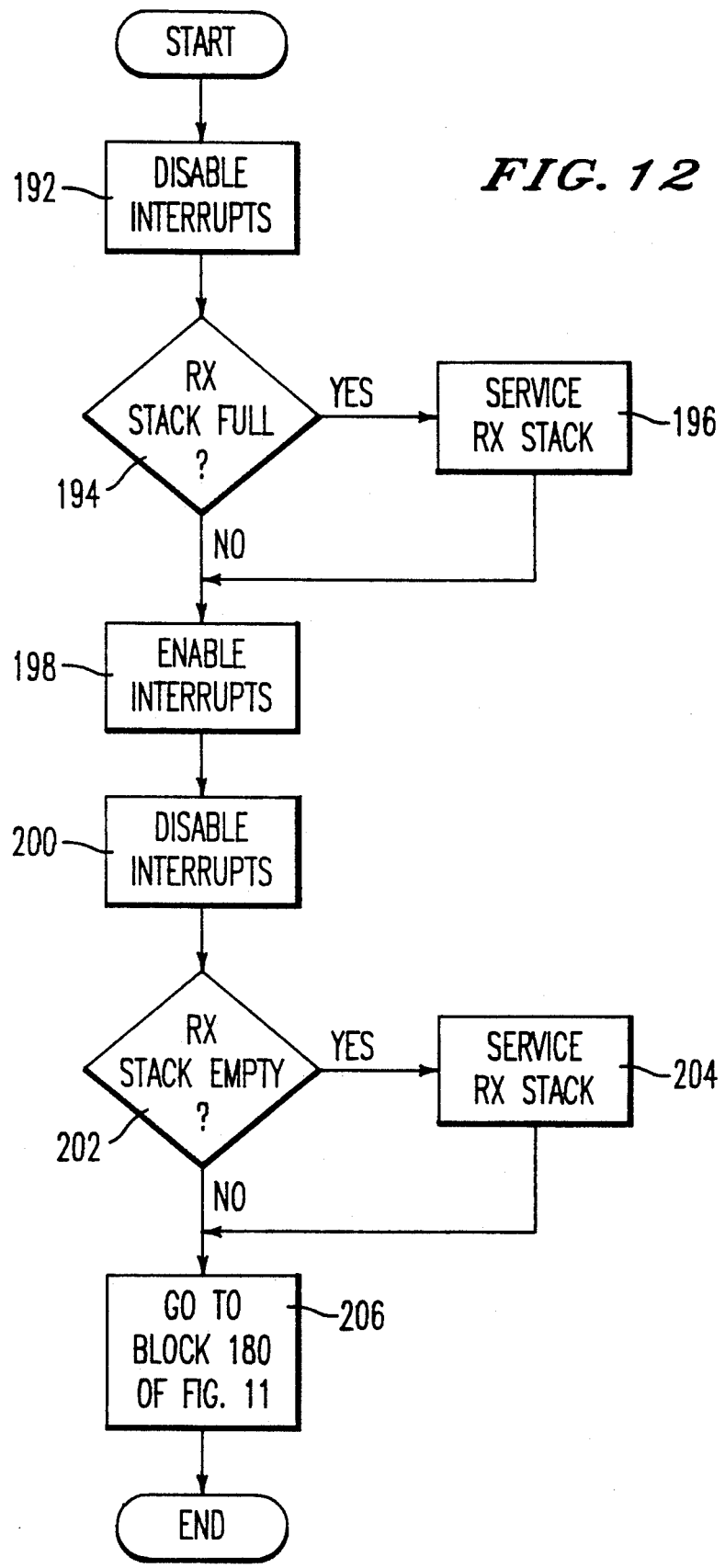
FIG. 12 is a flow chart depicting a sequence of peripheral board microcontroller operations for processing a packet.

Upon receipt of an HDLC interrupt request signal, the microcontroller 148 transmits the RTS command stored in the internal transmit stack to the CPU board microcomputer 80, as shown in block 182 of FIG. 12. The microcontroller 148 subsequently receives initialization data, which is stored in the ROM of the CPU board microcomputer 80, and loads the data into appropriate data registers, as indicated in block 184. The initialization can include, for example, the make and break time for pulse dialing, the minimum hang-up time, the addresses of authorized lines, as well as the designation of time slots on the PCM highways 57 that are to be used for analog board data transfers. The microcontroller 148 does not engage in further processing until a Begin Normal Operation (BNO) command is received from the CPU board microcomputer 80, as shown by the negative branch of the decision block 186. The main control program for the analog board is executed following receipt of a BNO command from the CPU board microcomputer, as indicated by the affirmative branch of block 186 and block 188.

The main control program generally comprises a foreground program which invokes the initialization routines described above, as well as device driver program modules and interrupt driven background routines which are used on an ad hoc basis. The foreground, background and device driver software modules will described in connection with FIG. 12.

Figure 18:
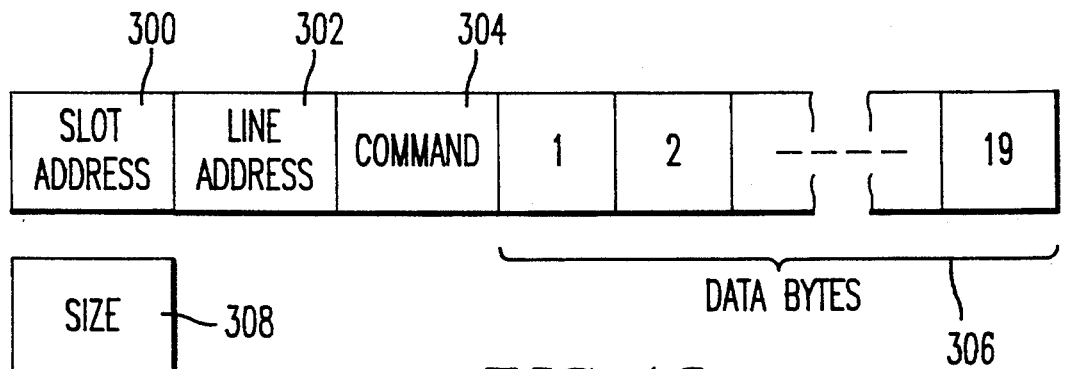
FIG. 18 illustrates the format of a control packet.

The foreground program of the analog board 44 is the main control program for controlling the microcontroller 148 upon reset and calling the various initialization routines. As stated previously in connection with FIG. 11, the microcontroller 148 transmits a Ready to Start (RTS) signal to the system CPU board 56 as an indication of the analog board's presence and status, and accepts any initialization instructions from the system CPU board. Once a Begin Normal Operation command is received from the CPU board 56, the foreground program enters a loop where it waits until an interrupt is entered (block 180 of FIG. 11). When an interrupt is initiated by the HDLC protocoller 160, the microcontroller 148 disables its designated interrupt input, as indicated by block 192 of FIG. 12, and determines whether or not any packet activity has occurred in the HDLC protocoller receive stack or FIFO by checking for an interrupt in the microcontroller program that is generated by the HDLC protocoller, as indicated by block 194. If any of these flags are valid, the microcontroller 148 branches to an appropriate service routine which invokes device drivers and background routines, as indicated by block 196, to service the command specified in the command byte 304 of the received packet (FIG. 18). If there are no packets in the internal receive stack, or the service routine is complete, the microcontroller 148 enables its interrupt input to receive future HDLC interrupt requests from the other boards, as shown in block 198.

Upon completion of an HDLC interrupt, the microcontroller 148 under control of the main program continues to look for the presence of any packet activity in the HDLC receive stack by disabling its interrupt input, as indicated in block 200, and by determining if there are any current packets in the receive FIFO, as indicated by block 202. As shown in block 204, if packets are stored in the receive FIFO of the HDLC protocoller 160, the microcontroller 148 calls the receive command service routine, which programs the microcontroller to unload the bottom of the receive stack, read the command byte, and branch accordingly within the routine to service the command. If the command is successfully serviced, the receive stack pointer is adjusted and the appropriate flags are set or reset. If the command cannot be serviced (i.e., if a transmission is required and the transmit stack is currently full) the receive packet is left in place and is serviced after the next interrupt. When the receive command routine is complete, the main program returns to a sleep mode, as shown in block 206, during which the microcontroller 148 waits for another HDLC interrupt (block 180 of FIG. 11).

The device drivers of the main control program are reusable blocks of code that allow communication with the peripheral devices on the analog board 44, that is, with the HDLC protocoller 160 and the CODECs (not shown) of the analog line interfaces 152 through 159. These drivers are called repeatedly by other sections of code, thus minimizing codespace and maximizing reliability.

The CODEC register read and write drivers are serial links that are created in software through the standard microcontroller I/O ports. These routines allow a CODEC register address and line to be selected and data to be read from or written to the register by switching microcontroller I/O lines to produce a three-wire synchronous serial link consisting of the data signal, the clocking signal and the chip select signal. The CODEC read driver is called 1600 times per second by an analog line scanning routine in the main program when the full board is authorized. The CODEC read driver operates the microcontroller to read each line's status 200 times per second and to report the status to the scanning routine. The CODEC write routine is called when the program needs to control the SLIC or CODEC (i.e., for ringing, volume control, and so on).

The HDLC protocoller device drivers allow the microcontroller 148 to access the HDLC protocoller microprocessor memory port through the microcontroller I/O by simulating a memory access in software. These read and write routines are called by the HDLC interrupt driven background routine to read the HDLC interrupt and FIFO status and the receive FIFO, and to load the transmit FIFO.

The interrupt driven background routines constitute the majority of the code space and execution time of the program. These routines respond to interrupts from two sources, service them, and then report the program status to the foreground program before returning program control. With this technique, real time control can be maintained, and the foreground program provides service only when required without the overhead of continuous polling. The two main interrupt sources are a 5 millisecond internal hardware timer and an external interrupt request from the HDLC protocoller 160.

The 5 millisecond timer is serviced by a timer reset routine that checks for any overflow and compensates for it during the timer reload. This routine then initiates a call to the aforementioned analog input line scanning routine, which reads each current line status and services the line according to the current operation for that line. These service functions include ringing, ring trip, active line, standby operation, unauthorized line, pulse dialing in progress, hookflash in progress, inter-digit timing in progress, digit counting, and on-hook and off-hook transitions.

The current line status is determined when the microcontroller 148 reads from that line's CODEC. The current activity is determined by checking the operation code for the line. The microcontroller 148 branches to the appropriate section of the code and checks the line status for any change. The final scanning branch is then performed by the microcontroller 148, and the appropriate action is taken, if any, for the line. Typical actions include loading a command onto the internal transmit stack to report a ring trip, on-hook, off-hook, digit dialed, hookflash, and so on, to the system CPU, and switching the ringing delay as required. The scan is performed every 5 milliseconds for each line, which allows for sufficient resolution for checking pulse dialing, ring trip, and other timed operations. The program supports sixteen ringing patterns, a variable make/break ratio for pulse dialing, a variable inter-digit timer period, and a variable hookflash time. All of these variables can be set and reset by the microcontroller 80 on the CPU board 56 according to an individual user's needs.

The HDLC interrupt request is performed through external interrupt of the microcontroller 148. An HDLC service program reads the HDLC protocoller 160 interrupt status register and branches accordingly. The valid interrupt conditions are a receive end of packet which occurs when a full packet with the correct slot address has been received by the HDLC protocoller 160, and a transmit end of packet which occurs when a packet transmission to the CPU board 56 has been completed. If one of these two conditions does not exist, an interrupt error condition is generated and the HDLC protocoller 160 is re-initialized.

When a transmit end of a packet occurs, the routine branches to turn off the HDLC transmitter. This must be done as soon as possible since the transmit channel is common among all slave boards. Once the transmitter is disabled, the routine returns to check for a receive end of a packet. If this condition is valid, the packet is serviced by the microcontroller 148.

For a receive end of packet, the HDLC service routine operates the HDLC protocoller microprocessor to begin unloading the receive FIFO of the HDLC protocoller 160. The HDLC protocoller microprocessor verifies the status of each byte as it is unloaded. Each valid packet is checked for the correct slot address. If it is an ALLCALL address, i.e., a message directed to all of the peripheral boards, the service routine controls the microprocessor to branch to a special section of code that services the message but does not respond. The second byte contains the line number and the command references and is stored on the internal receive stack. The third byte contains the command which is checked for two special conditions: the Slave Activity Inquiry (SAI) command, and the Negative Acknowledgement (NAK) command. The SAI command permits the analog board to access the transmit channel, and the NAK command requests retransmission of the last packet sent. If one of these is received, the message is not stored on the receive stack, and the program branches to a transmit routine. For a NAK command, the transmission is a repeat of the last command sent to the system CPU board 56. For a SAI command, the transmission is the next available outgoing command, if any.

If the message is non-special case, it is fully unloaded and stored on the receive stack by the microcontroller 148 for interpretation by the foreground program. The receive stack has the capacity to hold three HDLC messages. If the receive stack is full when a new message is received, the microcontroller generates a NAK command and discards the received packet. Once the packet has been stored, the program enters the transmit routine.

The HDLC transmit routine controls the microcontroller to check the internal transmit command stack and to form a command to load onto the transmit FIFO of the HDLC protocoller 160. Since data space is at a premium in the microcontroller 148, these commands are not stacked in the final format. Rather, the transmit stack contains a one or two byte code that is interpreted by the transmit routine, and the appropriate command is then formed. For example, for a CODEC register read function, the transmit code is unstacked and interpreted, the specific CODEC register is then read at this time. The slot address, line address, command value, register address and register value are then formed by the HDLC transmit routine during the interrupt service period and loaded into the HDLC protocoller. The HDLC transmitter is then enabled. The HDLC service routine is complete, and program control returns to the foreground program.

By the use of two additional interrupt service routines, zero-crossing switching is provided for the ringing relays on the analog board. This technique allows separate switching control for ringing-on, ringing-off, and ringtrip and greatly increases the lifespan of the relays, as well as reduces the EMI produced by ring signal switching. A zero-crossing synchronization signal is produced by a ring generator module (not shown) every 25 milliseconds, which is connected to an external interrupt port on the microcontroller 148. This interrupt is set up as a high priority, unmasked interrupt. When the sychronization signal is received, an external interrupt service routine is entered, and a determination whether 25 milliseconds has elapsed is made. A software configurable value is then loaded into the time registers associated with the external interrupt port to establish a timer interrupt to occur within 25 milliseconds in order to perform ring switching if necessary. When the timer interrupt is entered, a determination is made to establish if any ring switching is required. If so, the appropriate action is taken (i.e., ring-on, ring-off, or ringtrip) for the indicated lines. The line status registers are updated and, in the case of a ringtrip, an RTD (Ring Trip Detected) command is sent to the CPU board 56. Using this technique, separate timer reloads can be used for the ring-on, ring-off, or ringtrip conditions to allow optimum control of the switching actions for varying relay make and break times and signal characteristics.

V. Trunk Board

Figure 13:
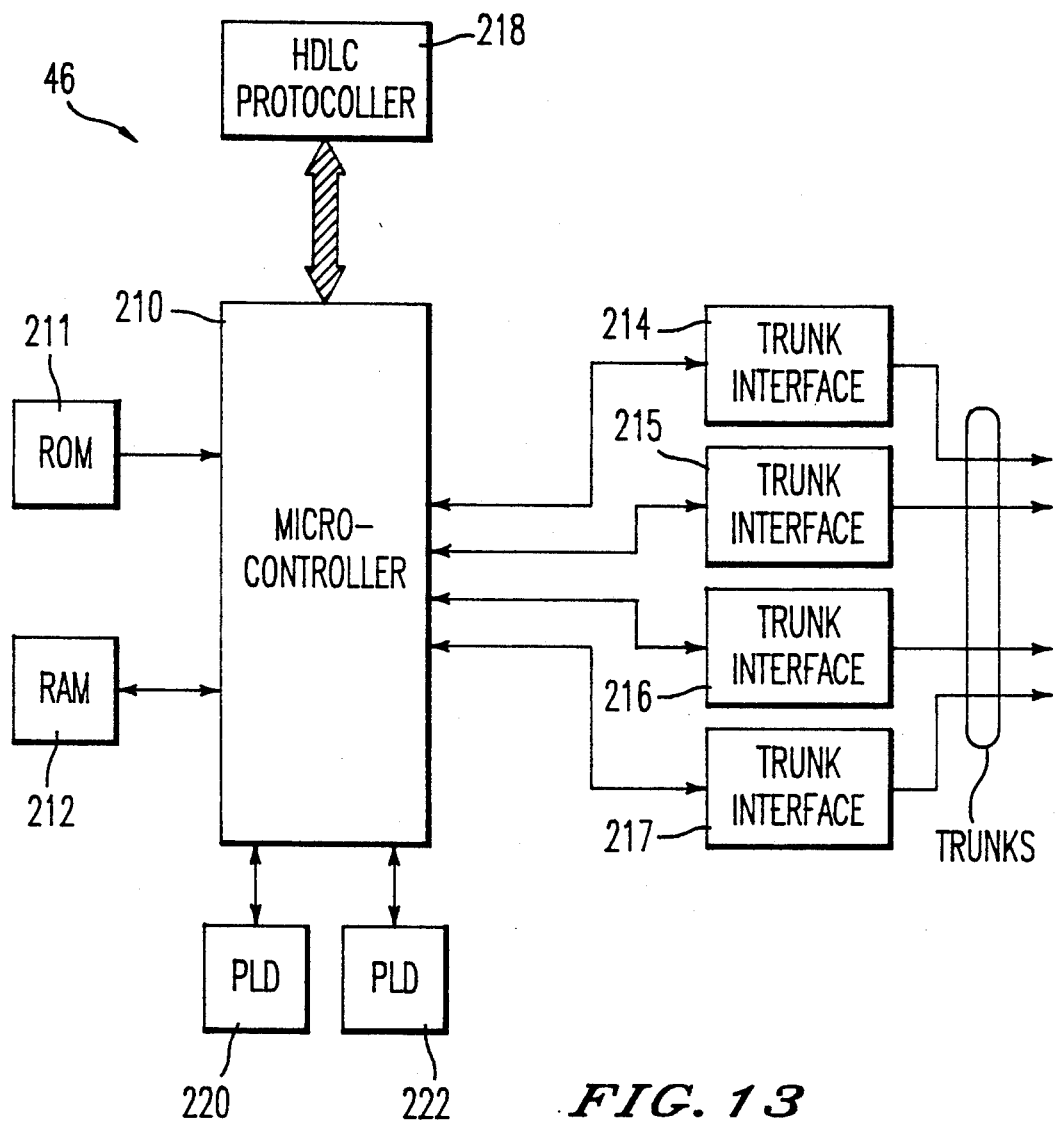
FIG. 13 is a block diagram of a trunk board constructed in accordance with the present invention.

Each trunk board 46 associated with the telecommunications system 10 comprises circuitry for processing a plurality of trunk lines. For example, the trunk board can perform any of the following line functions for each trunk that is interfaced with the board: line status and line seizure control, ring detection, digit dialing, CODEC control, trunk line control, line power up/down, and PCM time slot selection. With reference to FIG. 13, the trunk board comprises an onboard processor which is preferably an Intel 80C51 microcontroller 210. The microcontroller 210 is provided with a 4 kilobyte read-only memory (ROM) 211, which is masked with microcontroller firmware for controlling basic microcontroller functions, and a 128 byte random access memory (RAM) 212. The microcontroller 210 is coupled to several peripheral devices including four trunk interfaces 214 through 217, an HDLC protocoller 218 and two programmable logic devices (PLDs) 220 and 222. The basic functions of the trunk board 46 are PC and channel selection, slot address reading, initialization, HDLC communication, maintenance and error detection. These board functions and the aforementioned line functions are implemented by trunk board firmware which is stored in the RAM 212 of the microcontroller 210. The trunk board firmware is written in a modular fashion for reasons described above in connection with the analog board firmware.

The trunk board firmware program is preferably divided into four main sections, including the initialization routines, the device drivers, the main foreground program, and the interrupt driven background routines. The majority of the actual processing takes place with the various background routines so as to provide deterministic, real-time operation.

The initialization routines for the trunk board 46 are similar to those of the analog board 44. The trunk board initialization routines will therefore be described in connection with the flow chart depicted in FIG. 11. Like the analog board, the initialization routines for the trunk board are executed after the microcontroller 210 is reset during a hardware reset (i.e., trunk board power-up or watchdog timer reset) or during a software reset called from within the firmware program, as shown in block 168. Following a microcontroller reset, the microcontroller 210 is programmed to determine the type of board that it controls, and to read the address of the board on which it is mounted, as indicated by block 170.

With reference to block 172 of FIG. 11, the microcontroller 210 initializes components associated with the peripheral devices, i.e., various microcontroller data registers, trunk interfaces 214 through 217, the HDLC protocoller 218 and the PLDs 220 and 222. Each trunk interface consists of an audio CODEC, a trunk interface hybrid circuit, an addressable latch, and passive devices required for line seizure (i.e., ground start or loop start). The microcontroller 210 accesses the CODEC directly through a serial link that is implemented in software. The trunk hybrid output signals are provided to the microcontroller 210 through extended I/O ports on the CODEC. The addressable latch is accessed by the microcontroller 210 through a single data line and three address lines. The trunk hybrid circuit input signals are controlled through the latch I/O. The microcontroller 210 initializes the CODEC PCM time slot, the receive and transmit volume, companding method, and hybrid balance registers. A loop seizure relay, a ground start relay, a status LED, and ring ground control are initialized on the trunk hybrid circuits. The HDLC protocoller 218 is initialized to run at 192 kilobits/second, and the internal timing and the receive address recognition functions are enabled. The receive address is the slot address that is determined by the microcontroller. The two PLDs 220 and 222 are used for signal buffering, multiplexing and PCM highway access. The microcontroller 210 uses one of the PLDs 220 to read the backplane lines B_SA0 through B_SA4 for the slot address described above. The other PLD 22 is used to select the appropriate PCM voice highway and to provide a tri-state condition on all time slots not being used. The microcontroller 210 selects and enables the appropriate highway through three I/O pins on the PLD 222.

Following initialization of the peripheral devices, the microcontroller 210 loads a ready-to-start (RTS) command in digital memory (i.e., an internal transmit stack) in preparation for its transmission, as indicated by block 174 of FIG. 11. Further, a watchdog timer coupled to the microcontroller 210 is reset, and the HDLC protocoller 218 is enabled, as shown in boxes 176 and 178 respectively. Following enablement for reception, the HDLC protocoller 218 acts as a slave to the microcomputer 80 on the CPU board 56 in a master/slave communications environment. As will be described in further detail below, reception of a valid packet causes the HDLC protocoller 218 to generate an interrupt which the microcontroller 210 then services.

With reference to decision block 180, the microcontroller 210 does not engage in further processing until an HDLC interrupt request signal is received from the HDLC protocoller 218, as shown by the negative branch of decision block 180. The valid interrupt conditions for generation of the HDLC interrupt requests are the same as those for the analog board, that is, the presence of a receive end of a transmitted packet received by the HDLC protocoller 218, or the presence of a transmit end of a packet upon completion of packet transmission to the system CPU board 56. An interrupt error condition is generated and the HDLC protocoller 218 is re-initialized if either of these two conditions does not exist.

Upon receipt of an HDLC interrupt request signal, the microcontroller 210 transmits the RTS command stored in the internal transmit stack to the CPU board microcomputer 80, as shown in block 182. The microcontroller 210 subsequently receives initialization data, which is stored in the ROM of the CPU board microcomputer 80, and loads the data into appropriate data registers, as indicated in block 184. The initialization data can include, for example, the addresses of authorized lines and the designation of time slots on the PCM, highways 57 that are to be used for trunk board data transfers. The microcontroller 210 does not engage in further processing until a Begin Normal Operation (BNO) command is received from the CPU board microcomputer 80, as shown by the negative branch of the decision block 186. The main control program for the trunk board 46 is executed following receipt of a BNO command from the CPU board microcomputer 80, as indicated by the affirmative branch of block 186 and block 188.

The main control program generally comprises a foreground program which invokes the initialization routines described above, as well as device driver program modules and interrupt driven background routines which are used on an ad hoc basis. The foreground, background and device driver software modules will described in connection with FIG. 12 as they are invoked in a similar manner to the corresponding analog board software components.

The foreground program of the trunk board 46 is the main control program for controlling the microcontroller 210 upon reset and calling the various initialization routines. As stated previously in connection with FIG. 11, the microcontroller 210 transmits an RTS signal to the system CPU board 56 as indication of the trunk boards presence and status, and accepts any initialization instructions from the microcontroller 80. Once a BNO command is received from the CPU board 56, the foreground program of the trunk board enters a loop where it waits until an interrupt is entered (block 180 of FIG. 11). When an interrupt is initiated by the HDLC protocoller 218, the microcontroller 210 disables its designated interrupt input, as indicated by block 192 of FIG. 12, and determines whether or not any packet activity has occurred in the HDLC receive stack or FIFO by checking for activity flags stored therein, as indicated by block 194. If any of these flags are valid, the microcontroller 210 branches to an appropriate service routine which invokes device drivers and background routines, as indicated by block 196, to service the command specified in the command byte of the received packet. If there are no packets in the internal receive stack, or the service routine is complete, the microcontroller 210 enables its interrupt input to receive future HDLC interrupt requests from the other boards, as shown in block 198.

Upon completion of an HDLC interrupt, the microcontroller 210 under control of the main program continues to look for the presence of any packet activity in the HDLC receive stack by disabling its interrupt input, as indicated in block 200, and by determining if there are any current packets in the receive FIFO, as indicated by decision block 202. As shown in block 204, if packets are stored in the received FIFO of the HDLC protocoller 218, the microcontroller 210 recalls the receive command service routine which programs the microcontroller 210 to unload the bottom of the receive stack, read the command byte and branch accordingly within the routine to service the command. If the command is successfully serviced, the receive stack pointer is adjusted and appropriate flags are set or reset. If the command cannot be serviced (i.e., if the transmission is required and the transmit stack is currently full), the receive packet is left in place and will be serviced at the next interrupt. When the receive command routine is complete, the main program returns to a sleep mode, as shown in block 206, during which the microcontroller 210 waits for another HDLC interrupt signal (block 180 of FIG. 11).

As with the analog board 44, the main control program for the trunk board 46 comprises device drivers, which are reusable blocks of code that allow communication with the peripheral devices on the trunk board (i.e., the HDLC protocoller, the addressable latches and the CODEC). These drivers are called repeatedly by other sections of code to minimize code space and to maximize the reliability of the code.

The CODEC register read and write drivers are serial links that are created in software through the standard microcontroller I/O ports. These routines allow a CODEC register address and line to be selected and data to be read or written to the register by switching microcontroller I/O lines to produce a three-wire synchronous serial link consisting of the data signal, the clocking signal and the chip select signal. The CODEC read driver is called 800 times per second by a trunk board scanning routine in the main program when the full board is authorized. The CODEC read driver routine controls the microcontroller to read each line's status 200 times per second and to report the status to the scanning routine. The CODEC write routine is called when the program needs to control the CODEC (i.e., volume control, time slot selection, and so on).

The latch read and write drivers access the latch's output registers by incremental addressing through a single data line. These outputs are connected to the trunk hybrid's control inputs.

The HDLC protocoller device drivers simulate a memory access in software to transmit output signals to the microcontroller 210 or receive input signals therefrom. These read and write routines are called by the HDLC interrupt driver background routine to read the HDLC interrupt and FIFO status and the receive FIFO, and to load the transmit FIFO.

The interrupt driven background routines constitute the majority of the code space and execution time of the program. These routines respond to interrupts from two sources, service them, and then report the program status to the foreground program before returning program control. With this technique, real-time control can be maintained and the foreground program provides service only when required without the overhead of continuous polling. The two main interrupt sources are a 5 millisecond internal hardware timer and an external interrupt request from the HDLC protocoller.

The 5 millisecond timer is serviced by a timer reset routine that checks for any overflow and compensates for it during the timer reload. This routine then initiates a call to the aforementioned timed trunk line scanning routine, which reads each current line status and services it according to the current operation for that line. These service functions include line seizure and release, ring monitoring, dialing, and call connection.

The current line status is determined by a read from that line's CODEC. The current activity is determined by checking the operation code for the line. The microcontroller 210 branches to the appropriate section of the code, and checks the line status for any change. The final scanning branch is then performed by the microcontroller 210, and the appropriate action is taken, if an, for the line. Typical actions include loading a command onto the internal transmit stack to report ringing activity, CO line seizure, CO line release, and pulse dialing completed. The scan is performed every 5 millisecond for each line, which allows for sufficient resolution for performing pulse dialing, counting rings, and other timed operations. The program supports both ground seizure and loop seizure, a variable make/break ratio for pulse dialing, a variable inter-digit timer period, and a variable hookflash time. These variables can be set and reset by the microcomputer 80 on the CPU board 56 according to an individual user's needs.

The HDLC interrupt request is performed through external interrupt of the microcontroller 210. An HDLC service program reads the HDLC protocoller interrupt status register and branches accordingly. The valid interrupt conditions are a receive end of packet which occurs when a full packet with the correct slot address has been received by the HDLC, and a transmit end of packet which occurs when a packet transmission to the CPU board 56 has been completed. If one of these two conditions does not exist, an interrupt error condition is generated, and the HDLC protocoller 218 device is re-initialized.

When a transmit end of packet occurs, the HDLC service routine branches to turn off the HDLC transmitter. This must be done as soon as possible since the transmit channel is common among all slave boards. Once the transmitter is disabled, the routine returns to check for a receive end of packet. If this condition is valid, it is serviced.

For a receive end of packet, the HDLC service routine begins unloading the receive FIFO of the HDLC protocoller 218. The protocoller processor verifies the status of each byte as it is unloaded. Each valid packet is checked for the minimum three data byte length. The first byte is checked for the correct slot address. If it is an ALLCALL address (i.e., a message directed to all peripheral boards) the HDLC service routine causes the processor to branch to a special section of code that services the message but does not respond. The second byte contains the line number that the command references and is stored on the internal receive stack. The third byte contains the command which is checked for two special conditions: the slave activity inquiry (SAI) command and the negative acknowledgement (NAK) command. The SAI command simply permits the trunk board to access the transmit channel and the NAK command requests retransmission of the last packet sent. If one of these is received, the message is not stored on the receive stack and the program branches to the transmit routine. For an NAK command, the transmission is a repeat of the last command sent to the system CPU board 56. For an SAI command, the transmission is available outgoing command, if any.

If the message is a non-special case it is fully unloaded and stored on the receive stack for interpretation by the foreground program. A flag is sent to notify the foreground program. The receive stack has the capacity to hold three HDLC messages. If the receive stack is full when a new message is received, the microcontroller 210 generates an NAK command and discards the received packet. Once the packet has been stored, the program enters the transmit routine.

The HDLC transmit routine controls the microcontroller 210 to check the internal transmit command stack and to form a command to load onto the HDLC protocoller 218 transmit FIFO. Since data space is at a premium in the microcontroller 210, these commands are not stacked in the final format. Rather, the transmit stack contains a one or two byte code that is interpreted by the transmit routine, and the appropriate command is then formed. For example, for a CODEC register read operation, the transmit code is unstacked and interpreted, and the specified CODEC register is then read at this time. The slot address, line address, command value, register address and register value are then formed by the HDLC transmit routine during the interrupt service period and loaded into the HDLC protocoller 218. The HDLC transmitter is then enabled. The HDLC service routine is now complete and program control returns to the foreground program.

VI. Digital Board

Each digital board 48 (FIG. 3) associated with the telecommunications system 10 comprises circuitry for processing a plurality of digital lines. For example, the digital board can form any of the following line functions for each digital line coupled to the board: subscriber network interface circuit (SNIC) control, transmission of messages between digital phones connected to the digital board and the CPU board 56 via the SNICs, and processing maintenance terminal communication signals.

Figure 14:
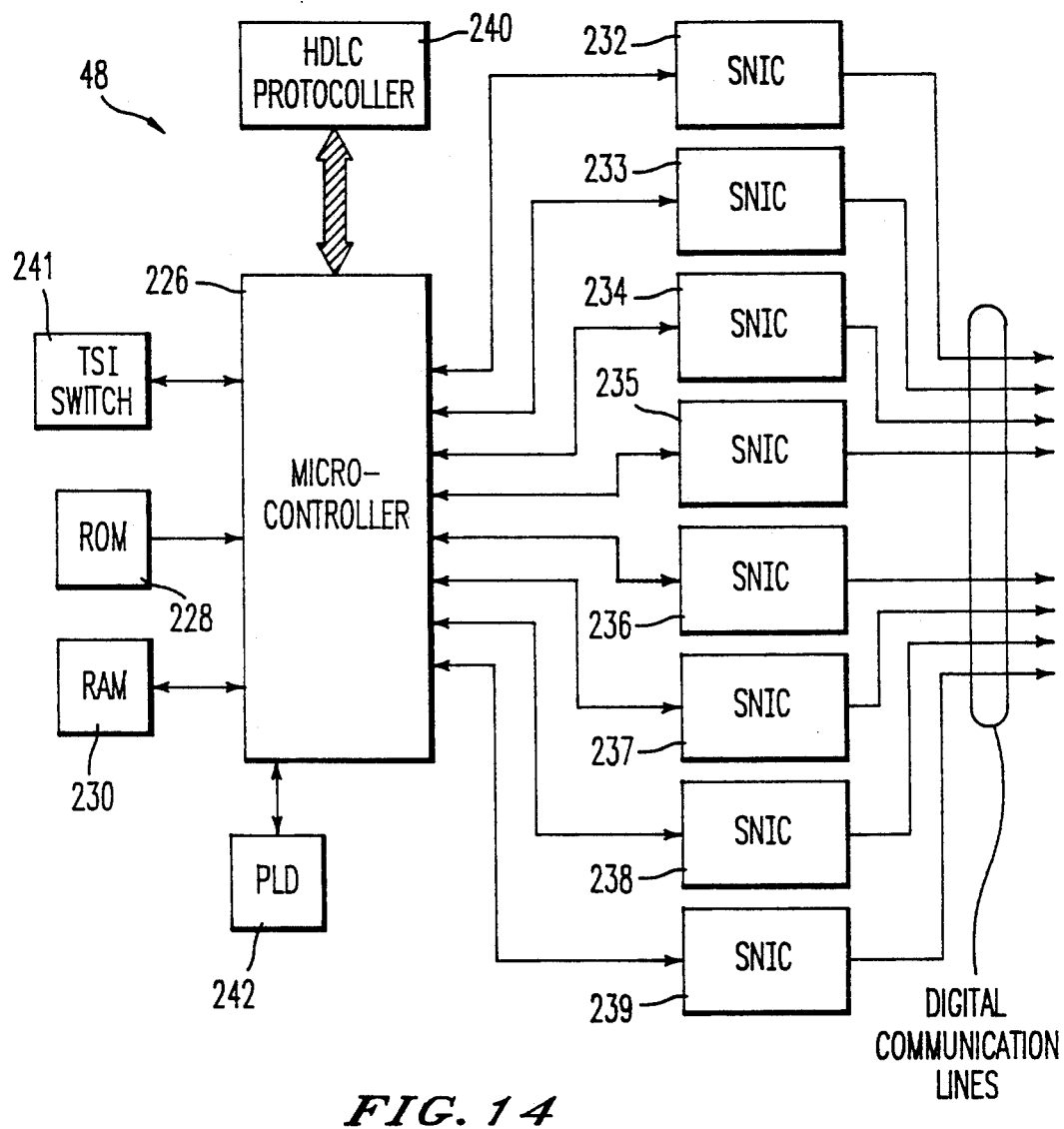
FIG. 14 is a block diagram of a digital board constructed in accordance with the present invention.

With reference to FIG. 14, the digital board 48 comprises an onboard processor 226, i.e., an Intel 80C52 microcontroller, which is described above in connection with both the analog board. The microcontroller 226 is coupled to several peripheral devices including eight SNICs 232 through 239, an HDLC protocoller 240 for communications with the CPU board 56, a time slot interchange (TSI) switch 241, and a programmable logic device (PLD) 242. The basic functions of the digital board are switch control, slot address reading, initialization, HDLC communication, maintenance and error detection. These board functions and the aforementioned line functions of the digital board are implemented by firmware which is stored in the RAM 230 of the microcontroller 226. The digital board firmware is written in a modular fashion as is the analog board and trunk board firmware for reasons discussed above. As with the analog and trunk boards, the digital board firmware program is preferably divided into four main sections, including the initialization routines, the device drivers, the main foreground program, and the interrupt driven background routines.

The initialization routines for the digital board 48 are similar to the initialization routines of the analog and trunk boards and therefore are described with reference to FIG. 11.

As shown in block 168 of FIG. 11, digital board initialization begins with a microcontroller reset such as during a hardware reset (i.e., digital board power up or watchdog timer reset) or during a software reset called from within the firmware program. Following a microcontroller reset, the microcontroller 226 is programmed to determine the type of board that it controls, and to read the address of the board on which it is mounted, as indicated by block 170. Board address is read by multiplexing a single I/O pin through a logic device to read the five signal lines BSA0 through BSA4 provided on the backplane (FIG. 6).

With reference to block 172, the microcontroller 226 initializes components associated with the peripheral devices, i.e., various microcontroller data registers, the SNICs 232 through 239, the HDLC protocoller 240, the TSI switch 241 and the PLD 242. Each digital line interface comprises an S-bus transceiver and passive components which are required for line interfacing and protection. The microcontroller 226 accesses the transceivers directly through a microprocessor memory port that is simulated through microcontroller I/O ports. The microcontroller 226 initializes the S-bus status, the HDLC link associated with each transceiver, and sets up channel assignments for B, C and D PCM channels.

A "B" channel is a 64 kilobit per second channel for carrying voice and data between, for example, the digital board and a digital telephone. A "C" channel is an 8 kilobyte per second channel for carrying control signals between, for example, the microcontroller 226 and an S-bus transceiver. A "D" channel is a 16 kilobit per second channel for carrying, for example, framing and clocking signals between a digital telephone and the digital board. The TSI switch 241 is used to select the PCM highway for the digital board and to place the B-channel data from the S-bus interfaces onto the selected PCM highway 57. The switch 241 is accessed by the microcontroller 226 through a I/O simulated memory port which is similar in function to the memory ports used with the HDLC protocoller 240 and the S-bus transceivers. The switch 241 is initialized to place the B-channel data on 16 contiguous channels on the highway that is specified by the microcontroller 80 on the CPU board 56 during the initialization procedure. All other channels and highways are placed in a high impedance state. The HDLC protocoller 240 is initialized to run at 192 kilobits per second, and the internal timing and the received address recognition functions are enabled. The receive address is a slot address that is determined by the microcontroller 226. The PLD 242 is useful for signal buffering and multiplexing. For example, the microcontroller 226 uses the PLD 242 to read the backplane for the slot address of the digital board 48.

Following initialization of the peripheral devices, the microcontroller 226 loads a ready-to-start (RTS) command into an HDLC protocoller internal transmit stack, in preparation for its transmission, as indicated by block 174 of FIG. 11. Further, a watchdog timer coupled to the microcontroller 226 is reset, and the HDLC protocoller 240 is enabled, as shown in boxes 176 and 178, respectively. Following enablement for reception, the HDLC protocoller 240 acts as a slave to the CPU board 56 in a master/slave communications environment. As will be described in further detail below, reception of a valid packet causes the HDLC protocoller 240 to generate an interrupt which the microcontroller 226 then services.

With reference to decision block 180 of FIG. 11, the microcontroller 226 does not engage in further processing until an HDLC interrupt request signal is received from the HDLC protocoller 240, as shown by the negative branch of decision block 180. The valid interrupt conditions for generation of the HDLC interrupt requests are the same as those for the analog board, that is, the presence of a receive end of a transmitted packet received by the HDLC protocoller 240, or the presence of a transmit end of a packet upon completion of packet transmission to the system CPU board 56. An interrupt error condition is generated, and the HDLC protocoller 240 is reinitialized if either of these two conditions does not exist.

Upon receipt of an HDLC interrupt request signal, the microcontroller 226 transmits the RTS command stored in the HDLC internal transmit stack to the CPU board microcomputer 80, as shown in block 182 of FIG. 11. The microcontroller 226 subsequently receives initialization data, which is stored in the ROM of the CPU board microcomputer 80, and loads the data into appropriate data registers, as indicated in block 184. The initialization data can include, for example, the addresses of authorized lines and the designation of time slots on the PCM highways 57 that are to be used for digital board data transfers. The microcontroller 226 does not engage in further processing until a Begin Normal Operation (BNO) command is received from the CPU board microcomputer 80, as shown by the negative branch of the decision block 186. The main control program for the analog board is executed following receipt of a BNO command from the CPU board microcomputer 80, as indicated by the affirmative branch of decision block 186 and block 188.

The main control program generally comprises a foreground program which invokes the initialization routines described above, as well as device driver program modules and interrupt driven background routines, which are used on an ad hoc basis. The foreground, background and device driver software modules will described in connection with FIG. 12.

The foreground program of the digital board 48 is the main control program for controlling the microcontroller upon reset and calling the various initialization routines. As stated previously in connection with FIG. 11, the microcontroller 226 transmits an RTS signal to the system CPU board 56 as an indication of the digital board's presence and status, and accepts any initialization instructions from the microcomputer 80 on the CPU board 56. Once a BNO command is received from the CPU board 56, the foreground program of the digital board 48 enters a loop where it waits until an interrupt is entered (block 180 of FIG. 11). When an interrupt is initiated by the HDLC protocoller 240, the microcontroller 226 disables its designated interrupt input, as indicated by block 192 of FIG. 12, and determines whether or not any packet activity has occurred in the HDLC receive stack or FIFO by checking for activity flags stored therein, as indicated by block 194. If any of these flags are valid, the microcontroller 226 branches to an appropriate service routine which invokes device drivers and background routines, as indicated by block 196, to service the command specified in the command byte of the received packet. If there are no packets in the internal receive stack, or the service routine is complete, the microcontroller 226 enables its interrupt input to receive future HDLC interrupt requests from the other boards, as shown in block 198.

Upon completion of an HDLC interrupt, the microcontroller 226 in accordance with the main program continues to look for the presence of any packet activity in the HDLC receive stack by disabling its interrupt input, as indicated in block 200, and by determining if there are any current packets in the receive FIFO, as indicated by block 202. As shown in block 204, if packets are stored in the received FIFO of the HDLC protocoller, the microcontroller 226 recalls the receive command service routine which programs the microcontroller 226 to unload the bottom of the receive stack, read the command byte, and branch accordingly within the routine to service the command. If the command is successfully serviced, the receive stack pointer is adjusted and appropriate flags are set or reset. If the command cannot be serviced (i.e., if the transmission is required and the transmit stack is currently full) the receive packet is left in place and will be serviced at the next interrupt. When the receive command routine is complete, the main program returns to a sleep mode, as shown in block 206, during which the microcontroller waits for another HDLC interrupt signal (block 180 of FIG. 11).

The device drivers of the main control program are reusable blocks of code that allow the microcontroller 226 to communicate with the peripheral devices on the digital board (i.e., the HDLC protocoller 240, the TSI switch 241 and the S-bus interfaces of the SNIC's 232 through 239). These drivers are called repeatedly by other sections of code to minimize code space and to maximize code reliability. The device drivers for all of these components are similar in that a memory access is simulated through a microcontroller I/O. The HDLC protocoller device drivers allow the microcontroller to access the microprocessor memory port associated with the HDLC protocoller 240 through the microprocessor I/O simulating a memory access software. This memory access is simulated in separate routines for read and write operations. These read and write routines are called by an HDLC service routine to read the HDLC interrupt and FIFO status, the receive FIFO, and to load the transmit FIFO. The device drivers for the TSI switch 241 and the SNICs 232 through 239 are similar to the drivers for the HDLC protocoller 240.

Since the major function of the digital board 48 is the transmission of messages between the system CPU board 56 and the digital telephones coupled to the digital board, the main processing routines are somewhat limited in scope. Most of the background processing time is used for querying the digital phones and loading and unloading HDLC commands.

The interrupt driven background routines constitute the majority of the code space and execution time of the digital board firmware program. These routines respond to interrupt from three sources, service them, and then report the program status to the foreground program before returning program control. With this technique, real time control can therefore be maintained, and the foreground program provides service only when required to do so without the overhead of continuous polling. The three main interrupt sources are a five millisecond internal hardware timer, an external interrupt request from the HDLC protocoller 240, and an external interrupt request from the SNICs 232 through 239.

The five millisecond timer is serviced by a timer reset routine that checks for any overflow and compensates for it during the timer reload. This routine then initiates a call to the aforementioned digital line scanning routine, which reads each current line status and services the line according to the current operation for that line. These service functions include line activation and deactivation, transmission of commands to a digital phone and querying of the digital telephone for message transmission.

The HDLC interrupt from the SNICs 232 through 239 is performed through an external interrupt of the microcontroller 226. The microcontroller 226 then scans the lines that have valid transmit status. If a message is available in the HDLC protocoller FIFO buffer, the microcontroller 226 unloads the message, checks for message validity and passes the message to the CPU board 56.

The HDLC interrupt request is performed through external interrupt of the microcontroller. The HDLC service program reads the microcontroller interrupt status register and branches accordingly. The valid interrupt conditions are a receive end of a packet which occurs when a full packet with the correct slot address has been received by the HDLC protocoller, and a transmit end of a packet which occurs when a packet transmission to the system CPU board 56 has been completed. If one of these conditions does not exist, an interrupt error condition is generated by the microcontroller 226, and the HDLC protocoller 240 is reinitialized.

When a transmit end of a packet occurs, the service routine branches to turn off the HDLC transmitter. This is generally done as soon as possible since the transmit channel is common among all slave boards. Once the transmitter is disabled, the service routine controls the microcontroller 226 to check for a receive end of a packet. If this condition is valid, the packet is serviced by the microcontroller 226.

When a receive end of a packet occurs, the HDLC service routine operates the protocoller processor to begin unloading the receive FIFO of the HDLC protocoller. The protocoller processor verifies the status of each byte as it is unloaded. Each valid packet is checked for the correct slot address. If it is an ALLCALL address (i.e., a message directed to all of the peripheral boards), the service routine controls the protocoller processor to branch to a special section of code that services the message but does not respond. The second byte contains the line number that the command references and is stored on the internal receive stack. The third byte contains a command which is checked for two special conditions: The Slave Activity and Query (SAI) command and the Negative Acknowledgement (NAK) command. The SAI command permits the digital board to access the transmit channel, and the NAK command requests retransmission of the last packet sent. If one of these is received, the message is not stored on the receive stack, and the program branches to a transmit routine. For a NAK command, the transmission is a repeat of the last command sent to the system CPU board 56. For an SAI command, the transmission is the next available outgoing command, if any.

If the message is a non-special case, it is fully unloaded and stored in the receive stack by the microcontroller 226 for interpretation by the foreground program. A flag is set to notify the foreground program. The receive stack has the capacity to hold three HDLC messages. If the receive stack is full when a new message is received, the microcontroller 226 generates an NAK command and discards the receive packet. Once the packet has been stored, the program enters the transmit routine.

The HDLC transmit routine controls the microcontroller 226 to check the internal transmit command stack of the HDLC protocoller 240 take the next available command from the stack and pass the command to the system CPU board 56. The slot address and line address are added by the HDLC transmit routine during the interrupt service, and loaded into the HDLC protocoller 240 to minimize storage space. The HDLC transmitter is then enabled by the microcontroller. The HDLC service routine is now complete and program control is returned to the foreground program.

VII. Storage Module Board

Figure 15:
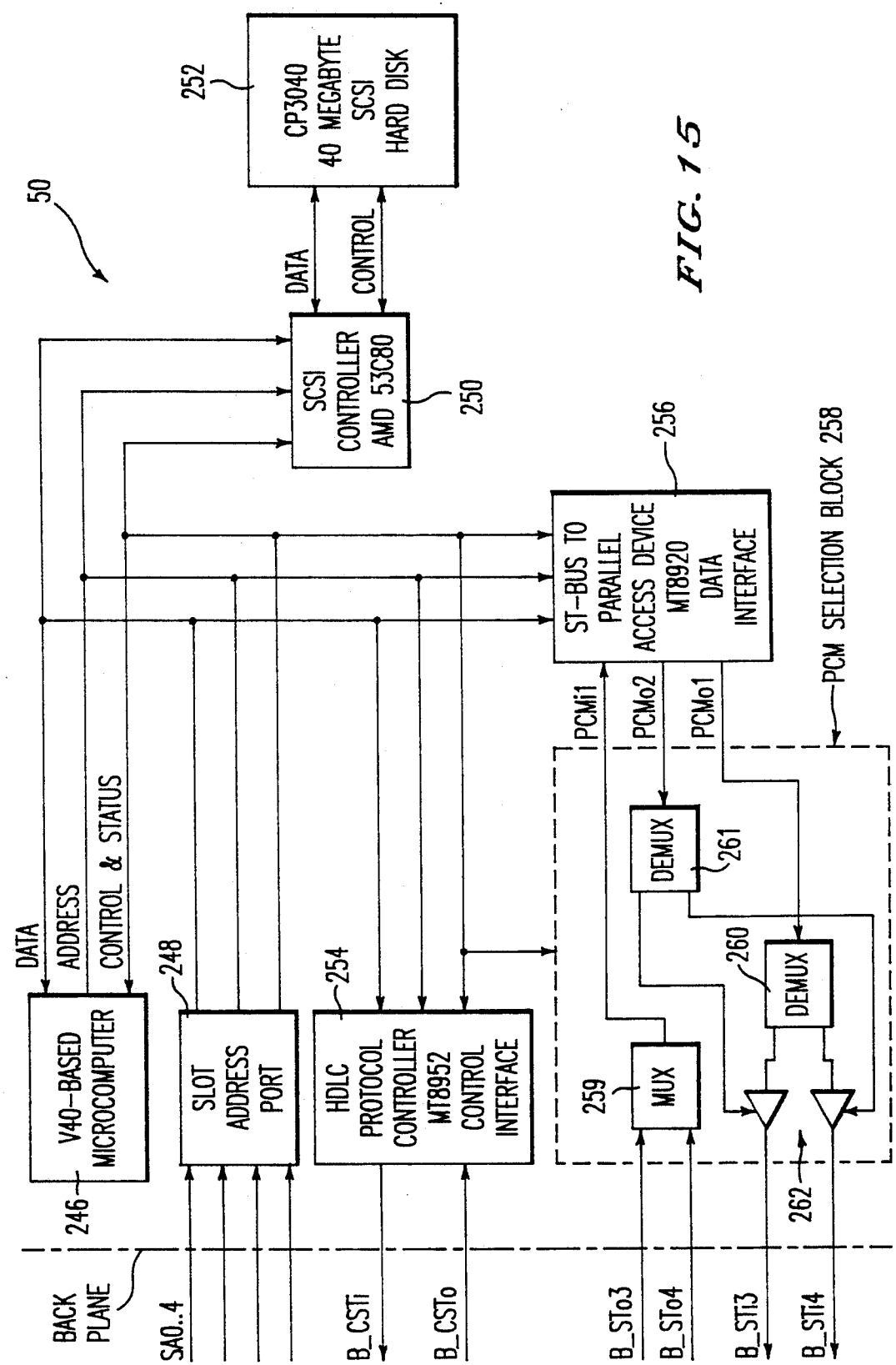
FIG. 15 is a block diagram of a storage module board constructed in accordance with the present invention.

Each storage module (SM) board 50 (FIG. 3) comprises circuitry for providing the telecommunications system 10 with a non-volatile mass storage medium for storing, for example, voice mail messages, data and system messages. With reference to FIG. 15, the SM board 50 comprises an on-board microcomputer 246 such as an NEC V40 microcomputer. The microcomputer 246 controls board functions in response to commands received from the CPU board 56. The microcomputer 246 is generally IBM PC software semicompatible, in that it comprises commercially available XT BIOS and SCSI BIOS software programs in a 256 kilobyte ROM device. The microcomputer 246 preferably comprises software buffers, data structures and storage module program code stored in as many as three 128 kilobyte RAM devices. The microcomputer 246 further comprises hardware for providing address decoding for the microcomputer memory and I/O devices.

With further reference to FIG. 15, the SM board 50 is provided with a slot address port 248, (i.e., a programmable logic device (PLD)) which enables the storage module board to read its rack location from the backplane. An SCSI controller 250 (i.e., an AMD53C80 device) is provided on the SM board and operates as an interface between a hard disk 252 and the microcomputer 246. It is controlled by the software in the SCSI BIOS and allows the storage module board to access files through Disk Operating System (DOS) function calls. The hard disk 252 preferably has a capacity of 40 megabytes. Data is stored on the disk 252 in the form of DOS files. In addition to storing the message and data files, the hard disk 252 stores the DOS program and the storage module program. The storage module program is down loaded to RAM during the initialization process. The disk 252 is controlled by the SCSI controller 250. Access to the control PCM highway 59 on the backplane is through an HDLC protocol controller 254. This device provides buffering of a command packet for reception or transmission. It also provides error detection and the rejection of inbound packets that do not match the address specified in its receive address register. The HDLC protocoller 254 can indicate reception of a valid packet by driving an interrupt line.

As shown in FIG. 15, a data interface device 256 (i.e., an ST-Bus to parallel access device) is provided as an interface between the microcomputer 246 and the backplane PCM highways 57. It also supplies a signal to the PCM selection device (described below) to disconnect the storage module board from channels not used for storage module data transfer. The data interface device 256 contains two output PCM highways PCMo1 and PCMo2 and one input PCM highway PCMi1. Each time slot on each PCM highway into and out of the ST-Bus interface is mapped to a particular register address. Channels on the PCM highways 57 are accessible to the microcomputer 246 by reading from, or writing to the appropriate register on the data interface device 256 for input or output PCM highways, respectively.

The SM board 50 preferably accesses only two of the six PCM data/voice highways 57 on the backplane for data transfer processes. Only six channels on either one of these highways are preferably used at a time. A PCM selection device 258 comprising a multiplexer 259 and two demultiplexers 260 and 261 is provided which connects the selected backplane PCM 57 to the data interface device 256 and tri-states its output from the storage module board 50 during channels (time slots) that are not in use by the storage module board. The selected backplane input PCM highway is connected to the input PCM highway PCMi1 on the data interface device 256 through the multiplexer 259. The selected backplane output PCM highway is connected to the first output PCM highway PCMo1 on the data interface device 256 through a demultiplexer 260 and a tri-state buffer 262. The multiplexer and demultiplexers are controlled by the microcomputer 246. The tri-state buffers 262 are controlled by the second output PCM highway PCMo2 on the data interface device 256. This highway is connected to the control of the tri-state buffers 262 through a demultiplexer 261. To provide desired channels on the output PCM highways with access to the backplane, high bytes are provided as output signals on the channels in the second PCM highway PCMo2 from the data interface device 256. Low bytes are likewise provided to the other channels on the second PCM highway from the data interface device. The control line of the tri-state buffer for the selected backplane output PCM highway will be high for the time slots desired to be enabled and low for the others.

The SM board 50 software comprises initialization routines, the main foreground program, and background interrupt driven routines ISRs for executing commands for data storage and retrieval operations between the hard disk on the SM board and the DSP 72 on the CPU board 56. The foreground routine comprises a command dispatcher routine and a data communication branch routine for executing commands received on the dedicated HDLC PCM highway 59, and from the DSP device 72 (FIG. 7), respectively. Generally, software control of the SM board is provided by Programs developed for the SM board, which are written in a high level language such as Turbo C+, the Disk Operating System (DOS) and ROM resident BIOS software. As stated previously, DOS, and the ROM resident BIOS, are preferably commercially available software programs. Disk access and some other low level processes are accomplished by transmit and receive function calls to DOS, the ROM resident XT BIOS, and the ROM resident SCSI BIOS. High level control is provided by programs written in the high level TELECOM language of the present invention. Hardware specific processes relating to the HDLC protocoller 254 and the data interface device 256 are also provided by high level program code.

The initialization process is substantially the same as a standard PC "booting" procedure where the XT BIOS, the SCSI BIOS, and the DOS cooperate to provide a PC XT compatible platform. Once the storage module is "booted", the storage module board main software program, which is stored on the disk 252, is executed from an AUTOEXEC.BAT file in the disk's root directory. The storage module program begins an initialization routine whereby the microcomputer 246 is operated to read the slot address from the rack and to initialize its data structure. The microcomputer also initializes the data interface device 256 and the HDLC protocoller 254. The HDLC protocoller 254 is initialized to operate in address detection mode (described below), and to provide an interrupt to the microcomputer 246 when a packet with a valid address is received. The data interface device 256 is initialized to operate in 32 channel mode (CEPT compatibility), and to interrupt the microcomputer 246 when a change of state (toggle) occurs on the bits in the appropriate channel (described below). The data interface device is also initialized to place a high state on the second data interface device output during the time slots (channels) that will be used for data transfer as described above. When the initialization is complete, the microcomputer 246 loads a Ready To Start (RTS) command into the transmit FIFO associated therewith to be sent upon the first inquiry from the CPU board.

Commands from the CPU board 56 and responses and data destined for the CPU board are carried over the dedicated HDLC channel 59. Commands are formed and packetized in a manner substantially similar to that described for the CPU board. The manner in which the interrupt is triggered, however, is different from the CPU board. The SM board is preferably implemented as a slave board and therefore does not initiate communication. The HDLC protocoller 254 triggers a hardware interupt whenever a valid packet is received, with the upper seven bits of the slot address in the packet being identical to the upper 7 bits in the HDLC receive address register. This register is initialized to the board's slot address. The HDLC protocoller 254 reads the packet and checks for errors, as described for the CPU board. If there are errors, the microcomputer 246 sends a negative acknowledgement (NAK) command to the CPU board 56. If there are no errors, the microcomputer 246 controls the HDLC protocoller 254 to place the received packet into a software receive FIFO associated with the microcomputer. The software transmit FIFO is then checked by the microcomputer for a command to send. If such a command exists, the command is loaded into the HDLC transmit buffer and the HDLC transmitter is enabled. If there are no commands to send, the microcomputer 246 sends a positive acknowledgement (PAK) command to the CPU board to acknowledge packet reception. When the HDLC protocoller 254 has completed sending the command, it triggers a hardware interrupt. The HDLC ISR then controls the HDLC protocoller 254 to disable the HDLC transmitter in order to free the communication channel for use by other boards on the bus 59.

The data communication ISR transmits or receives a data packet to or from the data interface device 256, respectively. This interrupt responds to an interrupt from the data interface device 256. As described in further detail below, the interrupt is triggered when a data bit in a specified channel is toggled. The DSP 72 on the CPU board 56 toggles the data bit when it is ready to transfer or receive a new packet, thus triggering the previously mentioned interrupt.

The storage module board foreground software operates in a continuous loop that consists of two command processing routines. One is the command dispatcher and the other is the data communications branch. The data communications branch is concerned with data transfer between the DSP 72 and the storage module hard disk, and is described in more detail below.

The command dispatcher operates in the foreground program. It carries out the commands which are received from the CPU board 56. The commands are generally concerned with operations on files. The command dispatcher obtains commands from the HDLC protocoller receive FIFO, and places data destined for the CPU board 56 into the HDLC protocoller transmit FIFO. The HDLC ISR handles the transfer process between the CPU board and the receive and transmit FIFOs of the HDLC protocoller. When the command dispatcher receives a file operation command, the microcomputer 246 operates in accordance with Turbo C function calls (described above in connection with the CPU board low level drivers) to DOS procedures to carry out the command. The microcomputer 246 then returns the status of the command to the CPU board via the transmit FIFO of the HDLC protocoller.

Transfer of data for storage on the hard disk is accomplished through the data interface device 256. Six time slots or channels are used on a PCM highway for data transfer to the storage module from the DSP 72 (FIG. 7), and five time slots are used for data transfer to the DSP 72 from the storage module board. Hardware interrupts are triggered by the data interface device when the bits in sixth channel from the DSP 72 are toggled (i.e., to change state from 1 or 0 or from 0 to 1).

The process of transferring data is controlled by both the foreground and the background routines. The handshaking for the data transfer and the file access to the disk is done in the foreground routine. Actual transfer of data bytes between the DSP 72 and the storage module board 50 is done in the background routine. Two ISRs, that is, the data transmit ISR and the data receive ISR, are used for the data transfer process. The choice of which ISR to use depends on the desired direction of transfer. For example, the data transmit ISR is called by the foreground program to transfer a command from the DSP 72 to the SM board. The data receive ISR is executed when the SM board 50 transfers data to the DSP 72. The foreground routine changes the data interface device's assigned interrupt vector to point to the desired ISR to make the use of two ISRs possible with only one interrupt line.

Data transfers are initiated by the DSP 72. The storage module board microcomputer 246 polls the fifth channel for reception of a transfer command. There are two transfer initiation commands, the Prepare to Transmit (PTX) command and the Prepare to Receive (PRX) command. If a Prepare to Transmit command is detected on the fifth channel, the SM board microcomputer reads the logical file number (described below) and the desired buffer size from the first, second and third channels. It then fills a buffer from the logical file on the hard disk. If the end of the file is reached during the reading of this buffer, that information, along with the number of bytes read into the buffer, is placed onto the first, second and third channels of the output PCM highway. The storage module board microcomputer then sets the interrupt vector assigned to the data interface device's interrupt line to point to the data receive ISR which enables the interrupt. The microcomputer 246 places a Ready To Transmit (RDYTX) command in the fifth channel. If a Prepare to Receive (PRX) command is detected on the fifth channel, the SM board microcomputer reads the size and logical file number of the file to receive from the first, second and third channels. It then sets the interrupt vector assigned to the data interface device 256 to point to the data receive ISR and enables the interrupt. The storage module board microcomputer then places the Ready to Receive (RDYRX) command on the fifth channel. The RDYRX, PRX, RDYTX and PTX commands are listed in Appendix F along with definitions and other commands used in connection with the SM board 50.

When the storage module board 50 is in a data transfer phase, the microcomputer 246 polls the fifth channel for a Transmission Done (DONETX) command from the DSP. It does the polling from within a software loop timer. During the polling time, the storage module board microcomputer 246 is free to accept interrupts. Depending on the data direction desired, the ISRs either place data from the buffer onto channels 1 through 4 of the data interface device 256 or obtain data from channels 1 through 4 of the data interface device 256 and place it into the buffer. A counter in the ISR increments a pointer to the buffer to ensure a sequential flow of data to or from the buffer. When the DSP 72 is sending data, it toggles the sixth channel whenever it places new data on channels 1 through 4. When the storage module is sending data, the DSP 72 toggles the sixth channel in order to place valid data on channels 1 through 4 in the next frame. A frame is valid for 125 microseconds, which is the time required to send the 32 time slots of the PCM highway.

When the DSP 72 determines that the buffer is completely transferred, or wishes to terminate for some other reason, it places a Transmission Done command on channel 5. If a Transmission Done command is not received before the end of the timer, the storage module board microcomputer assumes normal transmission procedures. Normal transmission procedures depend on two factors: the direction of transmission, and whether the buffer transmitted was the last one in the file. If the storage module board is receiving a file, the received buffer is written to the disk. In both cases, if the buffer was the last in the file, the file pointer is set to the beginning of the file on the disk for immediate re-play or re-record, if desired. In all cases, the hardware interrupt from the data interface device 256 is masked, or disabled.

Before describing some of the functions of the SM board 50 in a mailbox application, the configuration of mailboxes in the storage module board memory will be described. A mailbox is generally an allocation of memory space for storing messages for a particular system user. A system file is a file in the hard disk drive which is ready for immediate data transfer operations when it is opened. A logical number is a number system command relating to the SM board 50 that is provided by the SM board microcomputer when a mailbox or a system file is opened. It is then used by the CPU board microcomputer 80 or the DSP 72 to reference the system file or mailbox while open. A maximum of 8 mailboxes and 16 system files may be open at any one time.

A mailbox is assigned to each port number and type. Any port number can have preferably as many as 26 mailboxes, one for each type. Each mailbox can have as many as 256 messages. Each mailbox keeps a record of the number of messages that are stored in the mailbox, the maximum number of messages allowed in the mailbox, the date and time of each message, and the length of each message in bytes. New mailboxes are generally created by the SM board upon receipt of a Create Mailbox (CRM) command before they are opened for the first time. When a mailbox is opened, a direction must be specified for recording. A message sent to a mailbox open for recording can be played back without closing the mailbox and re-opening the mailbox to play. If a mailbox is opened to record, then the message pointer may not be moved. Further, the pointer points to the new message recorded for the purposes of deleting and playing a message. One new message is preferably recorded for each time the mailbox is opened to record, although it may be recorded over many times and played back many times while the mailbox is open for recording. Unless the new message is deleted before closing the mailbox, the new message is saved in the mailbox. When a mailbox is open for playing, only the message pointed to by the message pointer will be acted upon in accordance with commands sent to the SM board for deletion or playing. New messages cannot be sent or recorded into a mailbox open for playing.

Each system file is assigned a type and a number, which is specified by the port number sent to the SM board when the command was sent to create the system file (OSF). This allows a maximum of 6656 possible system files, that is, 256 port numbers times 26 possible types. When a system file is open, it can be played or recorded over without further specification from the CPU board 56.

The command dispatcher program module and the data communication branch program module are described in connection with the flow chart for the storage module main procedure depicted in FIG. 16. Following initialization of data ports and interrupt service routines, as shown in block 264, the microcomputer 246 checks the HDLC protocoller receive FIFO for the existence of a new command, as shown in block 266. If a new command exists in the receive FIFO, the microcomputer 246 invokes a subroutine for carrying out the command and returning status information and data to the CPU board. As shown on blocks 268, 269, 270 and 271, the microcomputer 246 under control of a subroutine can create mailbox memory space or remove data from memory space, open or close a mailbox, select a message from a mailbox and delete a message for a mailbox, respectively. As shown in block 272, the microcomputer 246 places mailbox data in the HDLC protocoller transmit FIFO when the subroutine for opening and closing a mailbox has been called by the microcomputer. When a user selects a message from a mailbox, the microcomputer places data relating to the message length and the origination time in the transmit FIFO of the HDLC protocoller 254, as shown in block 273. When a message is deleted from a mailbox, the microcomputer 246 places information relating to the next message in the HDLC protocoller transmit FIFO for transmission to the CPU board 56, as indicated in block 274. As shown in block 275, the microcomputer 246 also places command status data in the HDLC protocoller transmit FIFO.

As shown in decision block 276, the microcomputer checks the appropriate channel on the data interface device 256 for the existence of new data communication commands from the CPU board DSP 72 following completion of the HDLC command process. As shown by the negative branch of decision block 276, the microcomputer 246 continues to check the HDLC protocoller receive FIFO for new commands from the CPU when no new commands are received from the DSP. As shown in block 278, if a command is received from the CPU board DSP 72, the microcomputer under control of the main program opens or closes any necessary files and sets file pointers accordingly. Further, the microcomputer sets the appropriate interrupt vector to point to the appropriate ISR that handles the desired data transfer. The microcomputer under control of foreground programs subsequently checks for new commands from the CPU board 56 in the HDLC protocoller receive FIFO.

VII. Quad DSP Board

Each Quad DSP array board 52 (FIG. 3) associated with the telecommunications system 10 comprises several Digital Signal Processors (DSPs) which can be programmed to independently provide many of the services offered by the telecommunications system 10. The extent and number of these services depends on the particular application that the system is designed to perform. For example, if the system is being used as a "Fax Refiler", the DSP board can be programmed to support services such as Group II-IV facsimile reception and transmission. As an another example, if the system is being used as a "Fax Response" unit, services such as the generation of a text file from a fax file can be provided by the system. Other services can include, for example, tone generation of all applicable telecommunications tones including musical tones with complete user control over tone frequency, amplitude, and on/off duty cycles; DTMF decoding and dialing with user control over the frequencies that are to be detected; conferencing; dial pulse decoding for providing detection of either rotary or DTMF digits; modem support; companding of voice; video data and facsimile; storage and retrieval of voice, data and image files; echo cancellation; packet switching and protocol conversion; text to speech conversion; and speech recognition.

Figure 17:
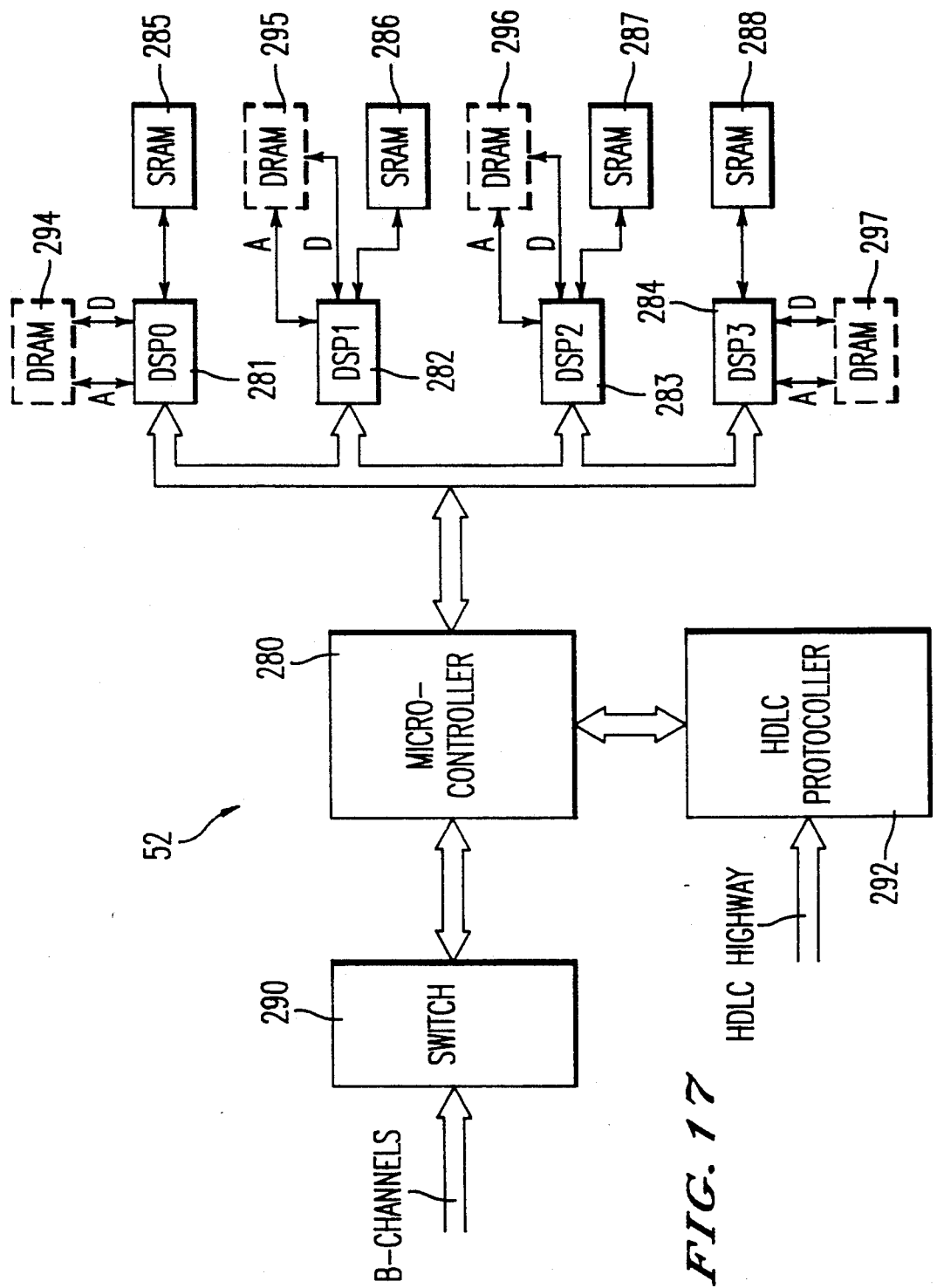
FIG. 17 is a block diagram of a quad digital signal processing array board constructed in accordance with the present invention.

With reference to FIG. 17, the Quad DSP array board 52 comprises a microcontroller 280, such as an Intel 80C51 microcontroller, which is coupled to four DSPs 281 through 284 and their corresponding static RAMs (SRAMs) 285 through 288. A time slot interchange (TSI) switch 290 is provided for placing data from the DSPs onto a selected PCM data/voice highway. The TSI switch 190 is accessed by the microcontroller 280 through an I/O simulated memory port. An HDLC protocoller 292 is provided on the board 52 as an interface between the microcontroller and the dedicated PCM highway 59. The DSPs can be optionally coupled to dynamic RAMs 294 through 297 (DRAMs). The DRAMs are therefore depicted as phantom boxes. The DRAMs generally comprise a microcontroller. The DSP, therefore, is capable of multiplexing the DRAM address lines, eliminating the need for an interface network between the DSP board and the DRAM.

The DSPs on the Quad DSP array board 52 can be programmed to perform a specific task either during power up initialization or at any time during normal operation of the system. This feature makes it possible to use the system resources on demand. For example, if a large number of modems is needed for a specific application such as school registration, the system can suspend other telecommunications services to dynamically provide the modem services. Further, the DSPs 281 through 284, when used in connection with the DRAMs 294 through 297, can operate as a message buffer before messages are transmitted to the storage module (SM) board 50. A message, for example, from a telephone is generally transmitted to the analog board which sends the data through the CPU board TSI switch 70 to a DSP. The DSP provides the data to a DRAM until the SM board 50 is available to process the data.

The Quad DSP board 52 is initialized in the same manner as the digital board 48, except that the DSPs are preferably provided with a basic communication routine which enables them to download files from the storage module board 50 and to execute those files as their basic program. Thus, the DSPs 281 through 284 are controlled by flexible programs, as opposed to fixed programs. This flexibility in program control is advantageous because changes in the services provided by a DSP can be implemented by a change in the software stored in the hard disk of the SM board 50, as opposed to a change in system hardware. After the DSPs are loaded, the function of the microcontroller 280 is generally to poll the DSPs on the Quad DSP array board 52 and to transmit their commands to the CPU board 56. The microcontroller 280 also receives commands from the CPU board 56 and transmits them to the DSP addressed by the command.

Generally, commands exchanged between the CPU board 56 and the microcontroller 280 of the Quad DSP array board 52 are similar to those used with the digital board 48. For example, Quad DSP array board commands are provided which operate the microcontroller 280 to read the board slot address and to transmit a command to, or receive a command from, a DSP. Further, commands are provided to reset a DSP, control HDLC communications and to download software from the CPU Board to a DSP. Some of the commands which are exchanged between the microcontroller 280 and the DSPs 281 through 284 are listed in Table 1.

TABLE 1

| | DSP Command Code | |
|---|---|---|
| HEX CODE | ACRONYM | NAME |
| 7 | STA | Status |
| 8 | REC | Record |
| 9 | SPR | Stop Play/Record |
| A | PLA | Play |
| D | DEL | Delete |
| E | DBU | DIR Back UP |
| F | DRD | DIR Read |
| 10 | FBU | FAT Back UP |
| 11 | FRD | FAT Read |
| 18 | LHD | Load Hard Drive File to ROM |
| 19 | WHD | Write DRAM File to Hard Drive |

In accordance with the present invention, the DRAMs 291 through 294 can function as buffers for temporarily storing voice messages prior to the transmittal of the messages to the SM board 50. For example, a voice message or an analog line can be converted to a digital signal by an LNIC or an analog board 44 and transmitted over a PCM highway 57 to the CPU board 56. The CPU board 56 in turn can switch the voice message to a DSP on either the CPU board 56 or the Quad DSP array board 52. The DSP can place the message in DRAM until a sufficient amount of data is available to commence the transfer of data to the SM board 50. Similarly, the SM board can send voice messages, through a DSP to a DRAM until a sufficient amount of data (i.e., 8000 samples per second of voice) is available to commence its transmittal to an analog, digital or trunk board.

With reference to Table 1, the status (STA) command is generally transmitted to a DSP on the Quad DSP array 52 to determine the size of the DRAM connected thereto. Accordingly, the DSP sends a response command to the microcomputer 80 on the CPU board 56 which indicates, for example, that the size of the DRAM is 512 kilobytes, 2 megabytes or that no DRAM is available. The Record (REC), Stop Play/Record (SPR), Play (PLA) and Delete (DEL) commands are transmitted to the Quad DSP array board 52 by the microcomputer 80 to record, for example, a voice message into a file in the DRAM corresponding to the addressed DSP or to the hard disk of the SM board 50, to play a voice message on a specified channel or to delete a file from DRAM.

With further reference to Table 1, the DIR Back Up (DBU) and the FAI Back UP (FBU) commands are generally transmitted by the microcomputer to the DSP board 52 to copy the contents of a directory file, that is, a DOS directory file associated with the SM board 50, to a second backup file or to copy a file allocation table (FAT) file associated with a DSP to a second backup file, respectively. A DSP generally comprises buffers for use with its files. The FAT file comprises data indicating which buffers belong to which files. Further, DIR READ (DRD) and FAT READ (FRD) commands can be transmitted by the microcomputer 80 to a DSP to read from an SM board directory or a DSP FAT file, respectively. The Load Hard Disk to DRAM (LHD) and the Write DRAM File to Hard Drive (WHD) commands are transmitted to the DSPs by the microcomputer 80 to perform read and write operations between the DSPs and the SM board 50.

IX. System Commands

The system command format is depicted in FIG. 18. Commands are generally transmitted within packets of data on the dedicated PCM highway 59. A command packet comprises a minimum of three bytes of data and a maximum of nineteen bytes. Command packets generally have two address bytes at the beginning of the packet. The first address byte 300 is a slot address which is removed by an HDLC protocoller from the command when the packet containing the command is received at the board having the specified slot address. The slot address is loaded into the HDLC protocoller of the board during board reset initialization. The second byte 302 is the line or port address. The third byte 304 is the command opcode, and the remaining bytes 306 through "Q" are operands. The format for a response to a command packet is similar. A response packet generally comprises a slot address byte and a port address byte corresponding to the board from which the response is originating, a command opcode byte and operand bytes.

With further reference to FIG. 18, the second address byte 302 of a command packet is generally forwarded to the specified, individual line along with the rest of the command signal, including the data in the command field 304 and the data field 306. A data field 308 is provided which relates to the size or number of bits in the packet. The size field 308 generally is not transmitted along the HDLC PCM highway 59, but rather is provided along with the packet data by a CPU low level software driver for the HDLC protocoller to enumerate the number of bytes that will be transmitted to or received by the CPU board during packet processing. The size byte 308 is removed from a packet prior to its transmission to a peripheral board by the CPU board HDLC protocoller in accordance with the low level driver.

Figure 19:
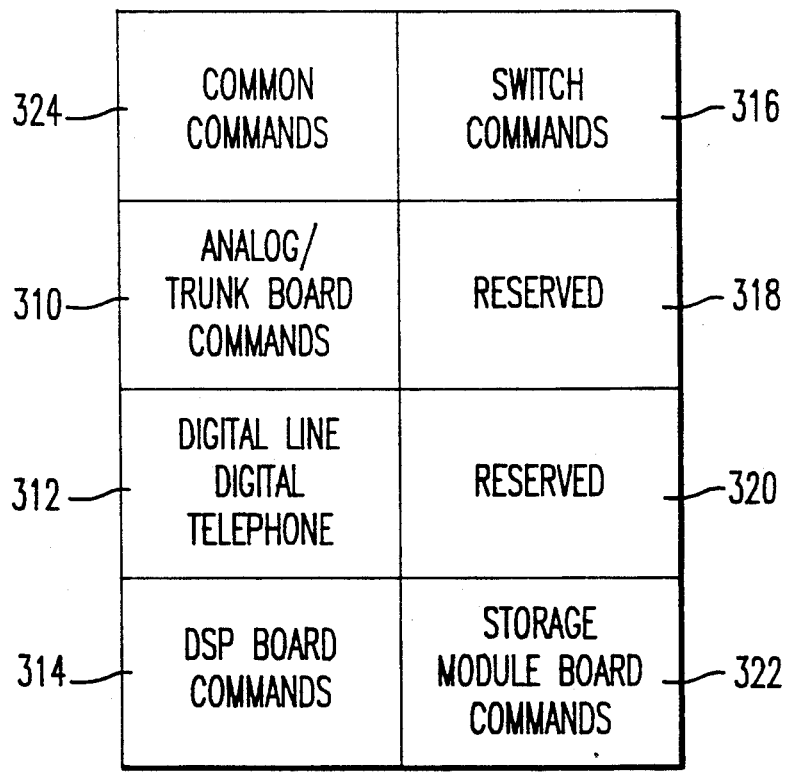
FIG. 19 illustrates a memory space for storing system commands.

With reference to FIG. 19, there are 256 outbound commands, that is, commands which are transmitted by the system CPU 80 to the peripheral boards, and approximately 256 inbound commands (i.e., commands that are transmitted from the peripheral boards to the system CPU board 56). The commands are stored in the EPROM 88 (FIG. 8) and are preferably stored in blocks of memory that are allocated to different peripheral functions. The blocks of memory depicted in FIG. 19 correspond to both outbound and inbound commands. For example, memory block 310 can contain inbound or outbound commands for use with analog boards 44 and trunk boards 46 (FIG. 3). Memory blocks 312, 314 and 322 are provided with inbound or outbound commands for use with digital boards 48, DSP boards 52 and storage module boards 50, respectively. Memory block 324 comprises commands that are common to all peripheral boards, and memory blocks 318 and 320 are reserved for future use.

Table 2 and Table 3 each contain, respectively, a list of some of the common commands, which can be transmitted, respectively, as outbound and inbound commands to any of the peripheral boards regardless of their type.

TABLE 2

| Outbound Common Command Codes | | |
|---|---|---|
| HEX CODE | ACRONYM | NAME |
| 00 | NULL | |
| 01 | SAI | Slave Activity Inquiry |
| 02 | NAK | Negative Acknowledgement |
| 03 | BNO | Begin Normal Operation |
| 04 | TDU | Time/Date Update |
| 05 | EPD | Emergency Power Down |
| 06 | RMR | Read microcontroller Register |
| 07 | WMR | Write micorcontroller Register |
| 08 | SCH | Select PCM Channel |
| 09 | RWT | Reset Watchdog Timer |
| 0A | VER | Version Number |
| 0B | RBD | Reset Board |

TABLE 3

| Inbound Common Command Codes | | |
|---|---|---|
| HEX CODE | ACRONYM | NAME |
| 00 | NULL | |
| 01 | PAK | Positive Acknowledgement |
| 02 | NAK | Negative Acknowledgement |
| 03 | RTS | Ready to Start |
| 04 | MRD | microcontroller Register Data |
| 05 | VER | Version Number |
| 06 | CER | Command Error |

The Slave Activity Inquiry (SAI) command is used to allow the microcomputer 80 and the CPU board 56 to grant a slave microcontroller on a peripheral board access to the HDLC bus 59. The Negative Acknowledgement (NAK) command is sent to notify a peripheral board that a bad packet has been received by the microcontroller 80. The Begin Normal Operation (BNO) command is sent by the microcomputer 80 to command a peripheral board microcontroller to begin normal operation after a power up reset or other reset condition. The SAI command is periodically sent out by the microcomputer 80 to grant HDLC access to the peripheral board receiving it. The SAI command generally requires no action on the part of the receiving board but simply allows the board to transmit on the HDLC link 59. The NAK command signifies that the last packet was received improperly at the CPU board 56 and therefore needs to be resent by the transmitting peripheral board. The microcomputer 80 typically transmits the NAK command when a packet having bad Frame Control Synchronization (FCS) bit has been unloaded from the HDLC interface 94 (FIG. 7), an invalid packet has been received, i.e., a packet having an invalid format, or when the receiver in the HDLC interface is full. The BNO command is generally transmitted by the microcomputer 80 during the last part of a peripheral board initialization process. The BNO command activates the receiving peripheral board for normal operation including any line scanning, HDLC accessing or operation during the sleep mode.

Further examples of outbound common commands include the Time/Date Update (TDU) command, which is a broadcast signal sent by the microcomputer 80 at one minute intervals to update the real-time clocks on applicable peripherals, and the Emergency Power Down (EPD) command, which is transmitted by the microcomputer 80 to notify individual boards and peripherals to enter a power down mode during power loss situations in order to conserve system power and to extend system operating time during battery backup operation. The Read Microcontroller Register (RMR) and the Write Microcontroller Register (WMR) commands are used to allow the microcomputer 80 to read from or write to a peripheral board microcontroller. The Select PCM channel (SCH) command is used by the microcomputer 80 to instruct a peripheral board as to which PCM highway should be selected for its B-channel information. The Reset Watchdog Timer (RWT) command is used by the microcomputer 80 to instruct the peripheral boards which are specified with the four data bytes following the command byte in the packet to reset their watchdog timers. The Version Number (VER) command is used to query a peripheral board to obtain the version and type number of that board. The Reset Board (RBD) command is used by the microcomputer 80 to instruct a peripheral board to undergo a software reset. The TDU command is a global command that is sent to all peripheral boards but is generally ignored by trunk boards, analog boards and Direct-Inward Dialing (DID) boards. The peripheral boards do not transmit a response to the TDU command. The EPD command can be used to power down an entire board or only a few, specified individual lines. The RMR command generally does not affect the contents of the specified register. The WMR command calls for an unconditional write to the specified memory register and does not require a response from the peripheral board. With regard to the VER command, the board version number identifies the board type and the hardware/software version, which is stored in ROM, implemented on that board. For example, the analog board can be implemented as one of several versions such as a direct-inward dialing (DID) board, or a board configured for loop start (LS) or ground start (GS) operation. The other peripheral boards can also be implemented in different versions. During initialization, each peripheral board sends version and board type data to the CPU board in response to a VER command, and the microcomputer 80 confirms the data by reading from the configuration file. The peripheral board response to an outbound VER command is an inbound VER command (described below) with the data requested.

Examples of inbound command commands include the Positive Acknowledgement (PAK) command, which is sent by the peripheral boards in response to every valid packet that is received except for a packet containing the Slave Activity Inquiry, to acknowledge that a valid packet has been received, and to implement handshaking. Further, the Negative Acknowledgement (NAK) command is sent by the peripheral boards to the microcomputer 80 to signify that a bad packet (i.e., a packet having a bad FCS bit or invalid format) has been received. The Ready-To-Start (RTS) command is sent by the peripheral boards to inform the microcomputer 80 that the board has undergone reset initialization and is ready to be initialized by the system. The Microcontroller Register Data (MRD) command contains a peripheral board data response to a read microcontroller register command sent by the microcomputer 80. The Version Number (VER) command is a peripheral board response to a version number query from the microcontroller 80. The Command Error (CER) command is sent when an invalid command is received from the microcomputer 80. The PAK command generally indicates that the last command received from the CPU board is acceptable and that no message needs to be sent. The NAK command is similar to the outbound NAK command described above in that it is generally sent when a packet with a bad FCS bit has been unloaded from the receiver in the HDLC protocoller on that board, when an improperly formatted or otherwise invalid packet has been received, or when the HDLC receiver is full and the message needs to be resent. The expected response to an NAK command is the retransmission of the last command sent from the board receiving the NAK command. The CER command or message is passed to the CPU board when an invalid command has been received at the transmitting peripheral board, that is, the received command has a good FCS bit and slot address but has, for example, an invalid port address, command value, data value, or data length. The CER command is generally returned along with the port address and the value of the invalid command that was received.

Table 4 and Table 5 contain some of the inbound and particular peripheral function as opposed to being global commands.

TABLE 4

| HEX CODE | ACRONYM | Outbound Command Code NAME |
|---|---|---|
| 10 | RCR | Read CODEC Register |
| 11 | WCR | Write CODEC Register |
| 12 | RPH | Ring Phone |
| 14 | WTC | Write Trunk Control |
| 15 | DDG | Dial Digits |
| 16 | SZT | Seize Trunk |
| 17 | RLT | Release Trunk |
| 18 | CNT | Connect Trunk |
| 19 | HKF | Hookflash |
| 20 | CDD | Character Display Data |
| 21 | IKC | Invalid Key Closure |
| 22 | RPH | Ring Phone |
| 23 | CDD | LED Display Data |
| 24 | SYN | Synchronization Acknowledgement |
| 27 | DDI | Dial DTMF |
| 31 | IKC | Invalid Key Closure |
| 32 | DDR | Display Data Register |
| 35 | RDP | Ring D-Phone |
| 36 | SDT | Send DTMF |
| 39 | MOP | Maintenance Outbound Packet |
| 3A | LDC | LED Display Control |

TABLE 5

| HEX CODE | ACRONYM | Inbound Command Code NAME |
|---|---|---|
| 10 | CRD | CODEC Register Data |
| 11 | OHH | On Hook |
| 12 | OFH | Off Hook |
| 13 | HKF | Hook Flash |
| 14 | DGC | Digits Collected |
| 15 | RTD | Ring Trip Detected |
| 16 | GKD | Ground Key Detected |
| 17 | DGE | Digit Error |
| 18 | DIP | Digit in Progress |
| 1A | TLS | Trunk Line Status |
| 1B | TSD | Trunk Seizure Detected |
| 1C | DBE | Digit Buffer Empty |
| 20 | KCD | Key Closure Detected |
| 21 | ONH | On Hook |
| 22 | OFH | Off Hook |
| 23 | RTD | Ring Trip Detection |
| 24 | SNU | Synchronization Acknowledgement |
| 25 | SNU | Sequence Number Update |

With reference to Table 4, the Read CODEC Register (RCR) command is transmitted by the microcomputer 80 to instruct the microcontroller on a designated analog or trunk board to perform a read operation from a selected CODEC register. The Write CODEC Register (WCR) command is transmitted by the microcomputer 80 to instruct the microcontroller on a designated analog or trunk board to perform a write operation from a selected CODEC register. Unlike the RCR command, the WCR command affects the power up/power down state of the affected CODEC. Further, the write operation changes the contents of the selected CODEC register but does not affect the analog or trunk board microcontroller status register. The ring phone (RPH) command is transmitted by the microcomputer 80 to instruct the microcontroller on an analog or trunk board to ring a designated line with a specified ring pattern.

With further reference to Table 4, the Write Trunk control (WTC) command instructs the selected trunk boards to write directly to the trunk interface control latch of a selected line. The data is generally written immediately without updating of the line scanning program data. The Seize Trunk (SZT) command causes the designated trunk board to attempt to seize a selected trunk line according to the trunk type (i.e., loop start or ground start) which is indicated in an LSGS register of the trunk board microcontroller. The trunk board will respond with a CER command if the selected line is already seized. If the selected line has begun ringing, the designated trunk board transmits a Trunk Seizure Detected (TSD) command (described below) to indicate that central office ringing has been detected for a LS line. Once the selected line has been seized by the designated trunk board, a Trunk Line Status (TLS) command (described below) is sent to indicate a successful seizure. For an LS trunk, dial tone detection or cut-through is required to verify true PBX initiated seizure. For a GS line, a TLS command is sent after the hand shaking sequence has been properly completed. The release trunk (RLT) command is sent by the microcomputer 80 to instruct a selected trunk board to release or hang up on the indicated trunk line. This command causes the board to open the loop and return normal biasing voltages. The CODEC is deactivated and placed in a standby state. The Connect Trunk (CNT) command is sent by the microcomputer 80 to instruct a designated trunk board to connect a selected line's audio and to activate the CODEC. The CNT command is generally sent in response to a CO seizure, i.e., in response to a TSD command from a trunk board, or to complete a PBX seizure connection, i.e., in response to a TLS command from a trunk board. If the CODEC is already active, the command is ignored. If the line is not seized, or if ringing is not in progress, a CER command is returned. For a CO seizure, the CNT command instructs the trunk board to complete the loop and connect the audio line (i.e., enable the CODEC). For a PBX seizure, the CNT command instructs the trunk board to connect the audio line. On an LS line, the CNT command permits cut-through or tone decoder detection of the dial tone to verify the connection. For a GS line, the connection has already been verified by the trunk board before the TLS was sent to the CPU board. The Hookflash (HKF) command instructs a trunk board to send a hookflash on a select line. The duration of the hookflash is determined by a variable in the data RAM of the trunk board microcontroller, which can be altered using values stored in the CPU board memory. The HKF command is valid during an active line. If the line is not active, a CER command will be sent to the CPU board.

With reference to Table 5, the CODEC register data (CRD) command is transmitted by the microcontroller on an analog or trunk board to the CPU board in response to an RCR command. The response includes the data requested by the RCR command and the queried addressed byte. The On Hook (ONH) command indicates to the microcomputer 80 that a specified analog line is currently on hook. The ONH command is sent when a line has gone from being off hook to being on hook for more than approximately 1.3 seconds. The Off Hook (OFH) command is sent by an analog board microcontroller to the microcomputer 80 to indicate that a specified line is currently off hook. The Hookflash (HKL) command is generally sent to the CPU board by an analog board to indicate that a particular line has completed a hookflash. The Digits Collected (DGC) command is generally transmitted by an analog board and contains one digit which has been collected for a selected line. An individual board can buffer up to three digits. Once the number of digits exceeds three, a Digit Error (DGE) is detected and transmitted to the CPU board. The Ring Trip Detection (RTD) command is sent by an analog board to indicate that a ring trip has been performed on a selected line, that the SLIC is in the active state and that the CODEC power amplifier is powered down. If a ring off command is received after an RTD is transmitted for the selected line, that line is deactivated. The Ground Key Detected (GKD) command is transmitted by a peripheral board to indicate that ground key activity is detected on a selected analog line. The Digit Error (DGE) command signifies to the CPU board that an invalid digit pattern has been detected at an analog board. For example, the DGE signal is transmitted to the CPU board when an invalid make/-break ratio has been detected, the minimum interdigit time has not been met, the digit counter has exceeded the count of 11, or the digit collector buffer is overflowing. The response to a DGE command is generally a busy tone. With further reference to Table 5, the Trunk Line Status (TLS) command provides the CPU board with the current status of a select trunk interface. The TLS command is generally sent to update trunk line status in response to a SZT command to indicate the seizure state. The TLS command is transmitted to the CPU board when a CO stops ringing the indicated line, the CO releases the line, an unsuccessful GS seizure, or an open line condition or reverse current condition exists.

X. System

Figure 20:
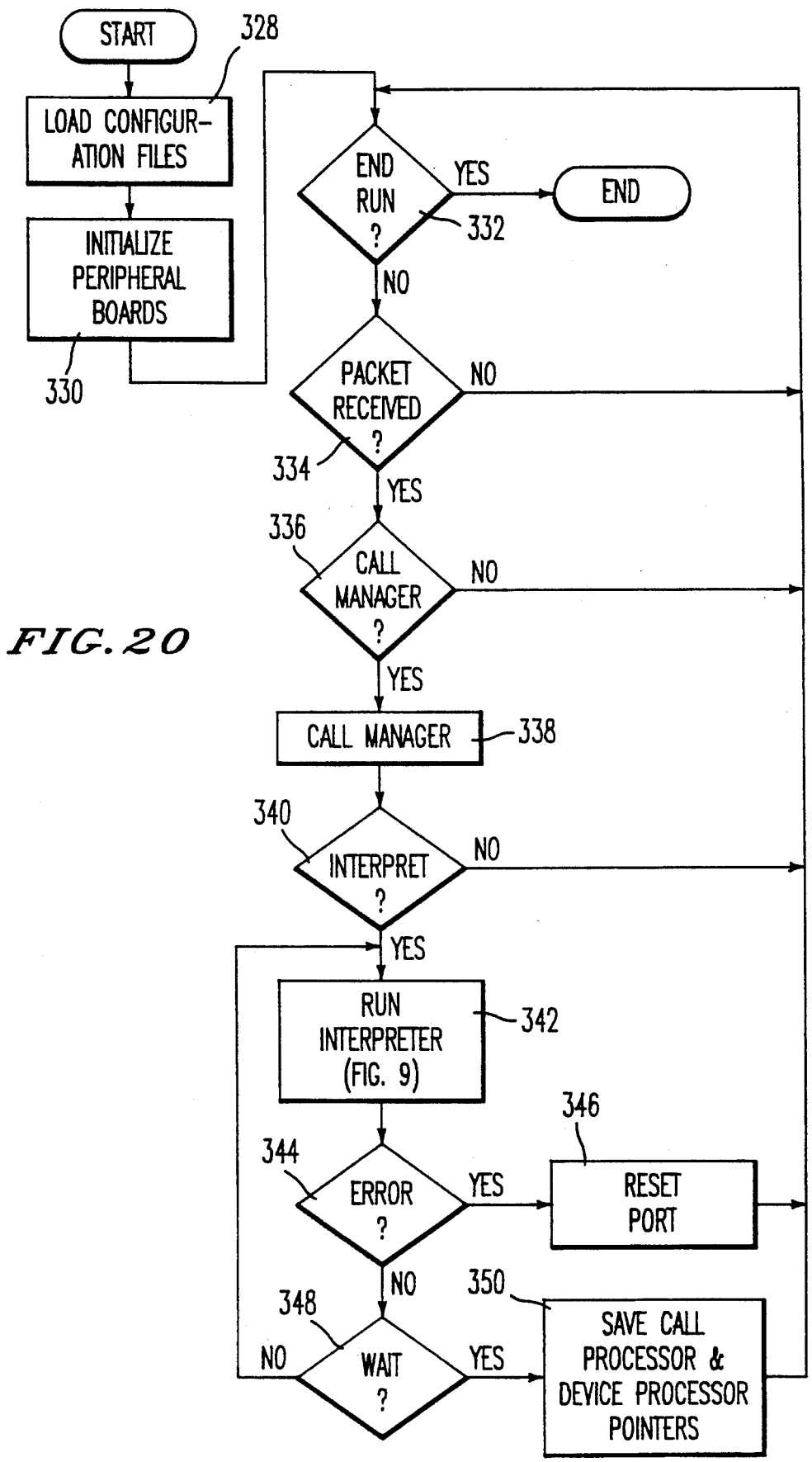
FIG. 20 is a flow chart depicting a sequence of operations for processing a packet using a CPU board.

With reference to the flow chart in FIG. 20, the mid-level software controls the CPU board microcomputer 80 to initialize the peripheral boards coupled to the CPU board and to load the configuration files, as indicated by blocks 328 and 330. When the CP board is operating, the microcomputer 80 checks the receive FIFO of the HDLC protocoller to determine if command packets have been received, as shown in decision block 334. The main FIFOS (i.e., the transmit and receive FIFOs of the CPU board) receive and transmit command packets in accordance with low level CPU software, which generally operates to place packets into the receive FIFO as fast as the packets arrive on the HDLC coded PCM highway 59. Mid-level CPU board software processes the packet in the FIFO at a time which is designated by the mid-level program. To process the packet, the mid-level code controls the microcomputer 80 to read the command byte first. If the command specified by the command byte is a low level or mid-level command, the packet is processed in accordance with the command. Further, the microcomputer continues to look for received packets, as indicated by the negative branch of decision block 334. If the command is not a special low or mid-level command, the mid-level code controls the microcomputer 80 to read the slot address byte in the command and to read appropriate configuration data corresponding to the slot address. The slot address allows the microcomputer 80, in accordance with mid-level code, to determine which manager is to be called to process the received packet, as shown in block 338. If the slot address is higher than the maximum number of slots allowed per rack in the system, the microcomputer 80 analyzes the packet to determine if, for example, the packet is from a DSP device. Once the slot address is determined and the microcomputer 80 determines where the packet is from, the microcomputer 80 knows which manager to call depending on the command byte.

With reference to decision block 340, before a manager is called in response to the reception of a packet, the first location in the Global Command buffer (GCB) is set to a pre-defined value called INCOMING. This tells the manager upon invocation that it is processing an incoming packet and not GCB data from a high level language program. The manager proceeds to process the packet by setting up data in the GCB with which the high level language program can work. The second location in the GCB at this time is provided with the number of the port from which the interpreter is to start processing. If the manager has placed a zero in the first location in the GCB, it processes the packet without invoking the interpreteer, as indicated by the negative branch of block 340. If the packet requires processing by the interpreter, the corresponding high level code is processed until a C[W=???] command occurs in the code. The wait command releases control so that the microcomputer 80 can check the incoming FIFOS again.

XI. Digital Telephone

Figure 21:
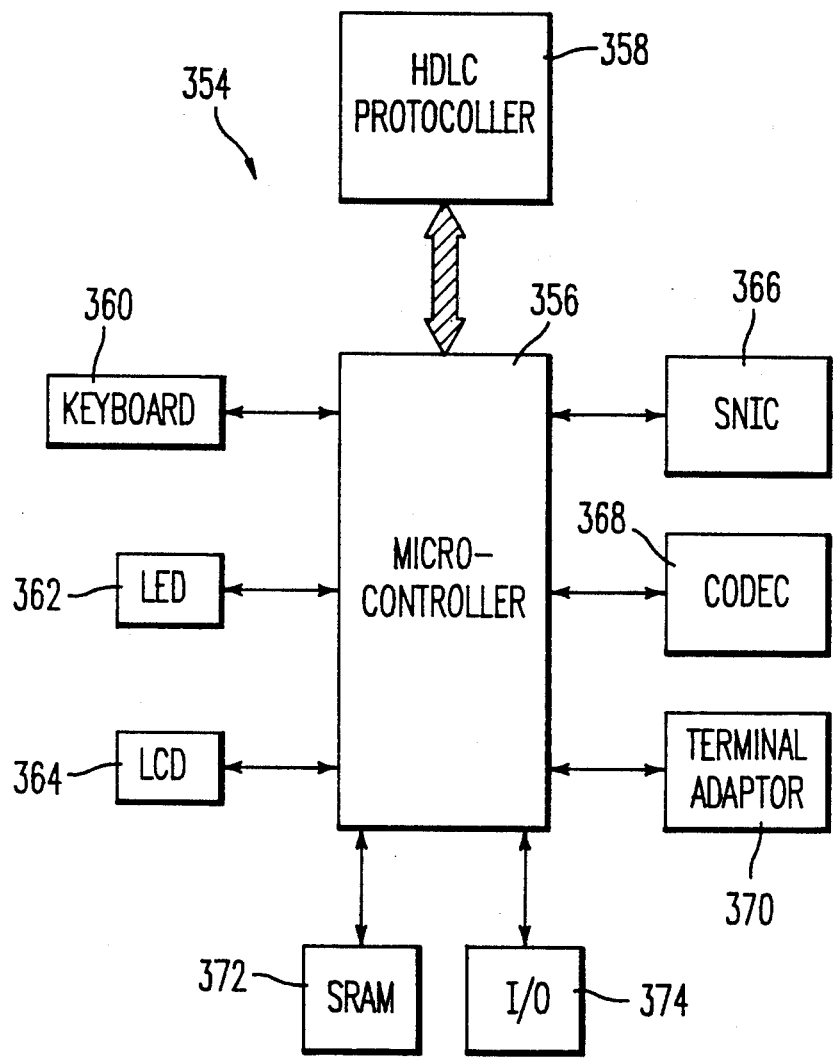
FIG. 21 is a schematic diagram of a digital telephone constructed in accordance with the present invention.

The digital telephone (D-phone) 354 is a remote peripheral device that provides many of the same services as a traditional analog telephone in addition to digital telephone services. Further, the digital telephone of the present invention incorporates additional features such as operator console capabilities which render it superior to an analog phone and to many existing digital telephone designs. With reference to FIG. 21, the digital telephone comprises a microcontroller 356, i.e., an Intel 80C51 microprocessor, an HDLC protocoller 358 controls, a keyboard 360, an LED array 362, an LCD 364, a subscriber network interface circuit (SNIC) 366, a telephone CODEC 368, a Terminal Adapter interface 370, a static ram (SRAM) 372, and a programmable I/O device 374. The CODEC 368 comprises a tone ringer, as well as handset and speaker phone interfaces. The microcontroller 356, in connection with the CODEC, can control ringing, transducer activation, volume, DTMF generation and port control. The SRAM 372 provides 2 kilobytes of storage for the microcontroller 356.

The audio operation of the digital telephone 354 is similar to that of an analog feature telephone, with speaker phone access provided through single key closure. Dedicated keys on the keyboard 360 are also provided for transfer, hold, conferencing, messaging and memory access. A bank of keys is preferably provided on the keyboard for speed dialing. The keys are user programmable for use with other dedicated functions. Six keys are preferably dedicated to direct line access. A standard twelve key telephone key pad is also provided.

The programmable I/O device 374 has 24 input/output lines which can be accessed by the microcontroller 356 for keyboard scanning and LED driving. These two operations preferably use the same I/O lines and are multiplexed in software by the microcontroller 356. Transistor drivers operate up to 128 LEDs 362 using a pulsed drive scheme that is implemented in software. The lines are alternatively used to provide scanning for as many as 128 keys in a keyboard. The microcontroller 356 controls scanning, debouncing, and key verification in software to provide a full range of application flexibility. The LCD 364 is controlled through an I/O parallel port. This is preferably a 2 line by 20 character display. The microcontroller 356 buffers display information from the system and supplies it to the LCD 364. LCD type information generally comprises a dialed number, the caller's number, the phone type, help screens, messaging information, as well as the time and the date. The LED display provides the user with data relating to line status (i.e., whether the line is ringing, active, or on hold) and to feature activation.

The SNIC 366 provides the physical link between the digital telephone 354 and a CPU board 56 in a rack. The link is preferably a four-wire ISDN compliant S-Bus interface which provides a point-to-point link of up to 1 kilometer. The system hardware design is such that software modifications can be made to implement the digital telephone as an ISDN compatible device. The S-Bus interface provides for the transmission of two 64 kilobit per second B-channels and one 16 kilobit per second D-channel. One of the B-channels is preferably used for voice, while the other B-channel is used for data. The D-channel comprises framing, clocking and link activation information for interfacing the digital telephone with a digital board.

The Terminal Adapter (TA) interface 370 can operate as a complete terminal interface between a CCITT V or X standard terminal serial Port and the S-Bus interface to the system in order to support, for example, V.24, X.21 and X.20 terminals. This system interface can also support V.110, V.110 embedded HDLC, or V.120 frame formats, and can generate output signals at 56 kilobits per second rates for restricted channels. Along with setting up its operating parameters, the microcontroller 356 can monitor data flow and use it to provide call control. For V.120 formatting, the microcontroller 356 is used to handle the data flow in real time and place it onto the B-channel. The TA interface 370 converts data from a terminal port to an ISDN B-channel. This conversion can support a variety of formats. The TA also performs the call set-up and tear-down functions for the data connection. The TA interface of the present invention is preferably integrated directly into the digital telephone. The physical link to the terminal is preferably a RS-232 level interface device that provides the proper interface voltages.

The primary function of the TA interface 370 is rate adaptation. This consists of handling a variety of data rates and formats at a terminal interface and converting them to the B-channel at the system interface. This conversion can involve bit adaptation, stop character stuffing and deleting, asynchronous to synchronous conversion and framing. The data rate between the TA interface 370 and the terminal can be synchronous or asynchronous, and can be a rate between 300 bits per second and 64 kilobits per second. The TA interface 370 can have connection control characters embedded into the data stream. The types of terminal interfaces supported include V.24, X.20, and X.21. The TA interface 370 is programmable to handle any of the supported terminal types.

The TA interface 370 supports call set-up and teardown at either the digital telephone or the terminal itself. The call connection information is sent from the digital telephone to the system over the D-channel of the S-Bus interface.

The digital telephone design of the present invention uses high quality digital communications and provides users with services that have generally been unavailable in private telecommunications systems. As stated previously, the digital telephone has both an operator console capability and a key telephone type functionality, and communicates with other devices in the system 10 using clear, reliable digital transmissions. A line source phantom power feed is used in order to eliminate the need for an AC connection or batteries. The on-board microprocessor 356 provides the digital telephone with a downloading flexibility and therefore provides for system configuration changes.

XII. Switch Board

As stated previously, the telecommunications system 10 of the present invention generally operates as a PBX. The system 10 preferably comprises three hierarchical levels of hardware including the boards, the rack, and the cabinet. As stated previously, the individual boards fit into a rack, and each rack preferably supports 192 ports. A cabinet preferably contains up to eight racks. A complete system can, for example, consist of one cabinet with one rack, or two cabinets, each with eight racks. Each rack is equipped with its own CPU board that controls all the boards within the rack. The CPU board communicates with the boards in its rack through the HDLC PCM highway 59. If there are other racks in the system, there must be at least one switch board in each rack. If there are two cabinets in the system, there must be two switch boards per rack. The switch board mediates communication between CPU boards in different racks.

Figure 22:
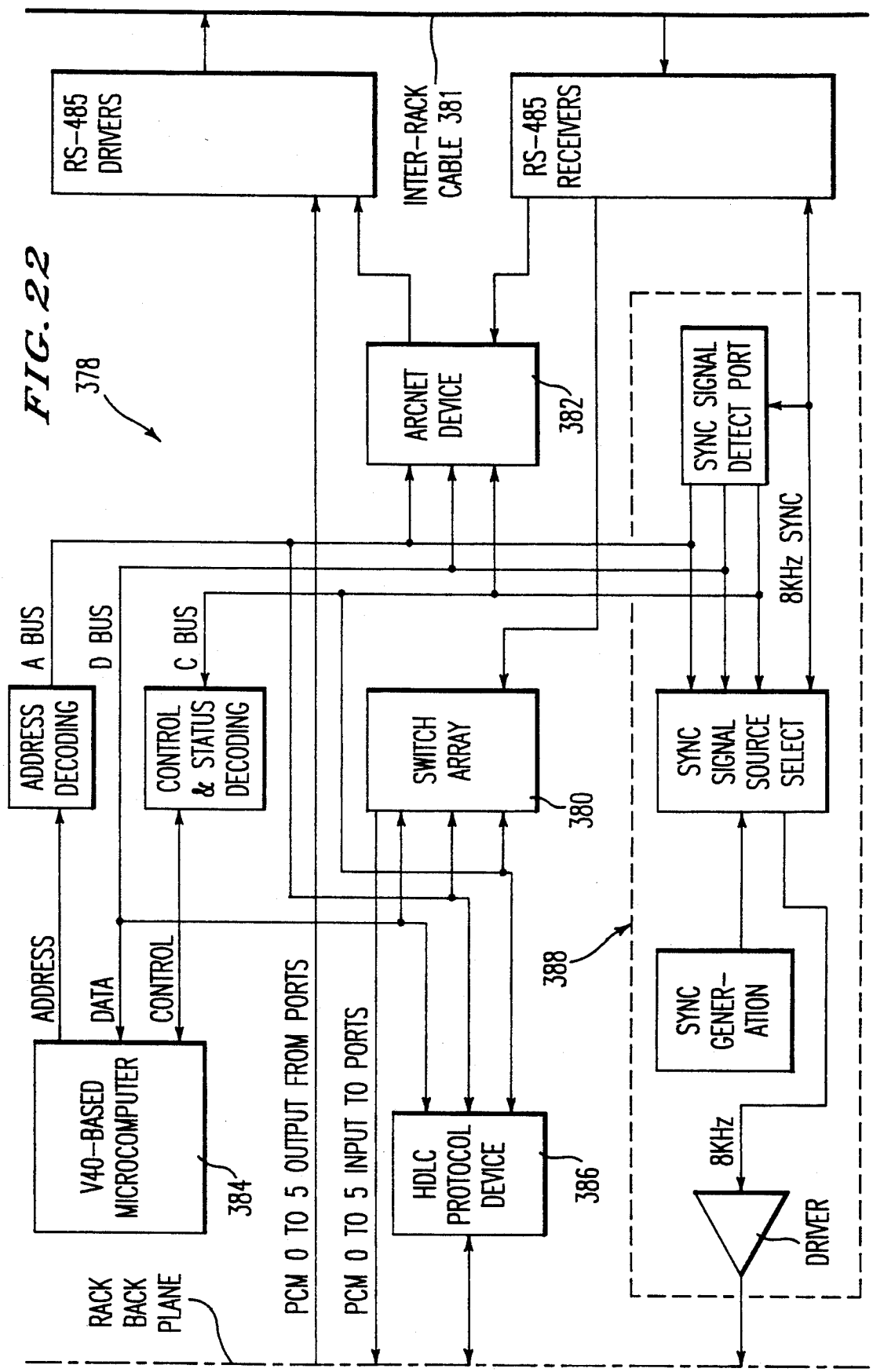
FIG. 22 is a schematic diagram of a switch board for interconnecting two cabinets in accordance with the present invention.

With reference to FIG. 22, the switch board 378, or switch board pair in a two cabinet system, generally performs three main functions. First, the switch board 378 connects the digital signals (voice or data) from any port in one rack to any port in another rack. Second, the switch board mediates control communication between racks. Third, the switch board provides the synchronization signal for all the digital components in the system.

The switch board connects digital signals from any port in one rack to any port in another rack using a switch array 380 which preferably comprises six digital time/space crosspoint switches. The inputs of the switches in the array are physically connected to the output (with respect to ports) PCM highways of other racks in the cabinet through a multi-wire cable 381. The output of the switches in the array 380 are connected to the input (with respect to ports) PCM highways of the switch board's rack. This allows the connection of any time slot on any PCM highway from any rack to any time slot on any PCM highway in the switch board's rack. The ports assigned to the time slot/PCM highway combinations are connected in this manner for voice or data communication between racks. For communication between two racks in separate cabinets, a second (or slave) switch board in the rack is used. This slave switch board is connected to the PCM highways in all the racks of the other cabinet. The physical connection between the slave switch board and the racks in the other cabinet is substantially the same as the physical connection between the master switch board and racks in the same cabinet. The slave switch board is controlled preferably through an ARCNET network 382 by the master (or first) switch board.

Control communication between the racks is handled by the switch board's on-board V40 based microcomputer 384 and HDLC protocoller 386 which communicate with the rack's CPU board 56 through the HDLC coded PCM highway 59, and with other switch boards (i.e., switch boards in a plural rack system) through the ARCNET network 382. When a connection to an off-board port is desired, a CPU board 56 will send a request for the status of the port to its switch board 378. It will use the port's LDN (a logical number assigned to each port in the system) to reference the port. The initiating rack's switch board will broadcast a message requesting the status of the LDN to all other switch boards on the network. The target switch board in the rack where the LDN resides will get the status of the LDN from its CPU board. It will then transmit the status with the LDN, the LDN's PCM and channel numbers, and the rack address to the initiating switch board through the network. The initiating switch board will pass the status data to its CPU board. If the initiating CPU board desires to connect the ports, it will send a command to its switch board to connect its LDN to the LDN in the target rack. The initiating switch board will search its database for the PCM highway and channel data that it received for the LDN in the target rack. The initiating switch board will make the proper switch connections and then transmit a message on the network to the target switch board to make the appropriate connections. The target switch board will make connections based on the information in its database and inform its CPU board of the connection. A similar process is used to disconnect LDN reference ports.

Synchronization for the digital components in the system is handled by an on-board oscillator divider combination 388. The synchronization signal is tri-state buffered so that it can be provided by any one rack in the system. It is ordinarily provided by the first rack in the first cabinet, but any switch board can provide the signal for the entire system. A switch board's microcontroller can detect the lack of signal and use a timing algorithm based on its location in the system to determine how long to wait before it provides the signal for the system.

The foregoing detailed description is illustrative of various preferred embodiments of the present invention. It will be apreciated that numerous variations and changes can be made thereto without departing from the scope of the invention as defined in the accompanying claims.

APPENDIX A

CALLPROC.027

```
      MODULE<CALL_PROCESSOR>                              * CALLPROC.027 *
                                                * USE WITH ANALOG.021 AND UP *
      INCLUDE<COMMANDS.DEF>                       * and trunk.021 and up *
      INCLUDE<PARAMETE.DEF>                     * includes basic messaging *
      DEFINE<BEGIN=CAA>                      * and features like fowarding *
      DEFINE<RESET=CAR>    *and now 3 speed dialing #'s and conferencing *
                           * and storage module messaging w/keypad and auto *
      ENTRY<START>
CAA:  X[DBASE,STBT\Port,Collecting_bit,ON]                    * BEGINNING *
      X[DBASE,STBY\Port,Digit_pointer,0]  * SET COLLECTING BIT AND DIGIT *
      C[J=SET_DECODERS,0,Port]                * CALL SET DECODERS MODULE *
      C[J=DIAL_TONE,0,Port]                      * CALL DIAL TONE MODULE *
      C[J=COLLECT_1_DIGIT,0,Port]        * CALL COLLECT ONE DIGIT MODULE *
      C[J=TONE_OFF,0,Port]                   * CALL MODULE TO TURN TONE OFF *
      X[DBASE,CKNB\Port,Dialed_number,First_digit] *GET DIGIT COLLECTED *

******************* MAIN DECISION POINT *******************************
      Q[P1\10=OPE,9=TRU,8=TIE,7=FEA,ELSE=NEXT]      * ELSE IS EXTENSION *

******************* EXTENSION *****************************************
      X[DBASE,STBY\Port,Digits_to_collect,3]      * INTERNAL EXTENSION *
      C[J=COLLECT_N_DIGITS,0,Port]
      C[J=CLEAR_DECODERS,0,Port]
      X[DBASE,STBT\Port,Collecting_bit,OFF]
      C[J=CAG]                                 * CAG FOR JUMP TO GROUP BEGIN *

******************* OPERATOR ******************************************
OPE:  X[DBASE,STNB\Port,Dialed_number,All_digits,255]   * CLEAR DIALED # *
      C[J=CLEAR_DECODERS,0,Port]
      X[DBASE,STBT\Port,Collecting_bit,OFF]
      C[J=OUT_OF_SERVICE_TONE,0,Port]   * PUT OUT OF SERVICE TONE ON PORT*
      C[J=CAP]

******************* TRUNK *********************************************
TRU:  C[S=TRUNK_ACCESS,0,Port]          * AUTO SETS PORT DIALED ON SUCESS *
      Q[P1\YES=NEXT,ELSE=TRF]           * YES CONTINUE, NO BUSY AND PARK *
      C[J=RING_PORT,1,Port_dialed]            * SEIZE PORT IN PORT DIALED *
      X[SWITCH,CONE\Port_dialed,Port]   * CONN INPUT TO SW FROM CO TO OUT *

X[TIMER_COUNTER,STMP\Port,20]   * SET TIMER FOR FIRST DIGIT COLL    *
      C[W=NEXT]
      Q[C\DGCX=NEXT,TMOF=TRC,DGEX=TRC,HKFX=LAST,ONHX=TRE,ELSE=TRE]
      X[DBASE,STNB\Port,Dialed_number,Next_digit,Parameter2]
      X[SWITCH,RSPT\Port]           *DISCONNECT PORT SO DONT HEAR DIALING*
      C[J=TRB]
TRA:  X[TIMER_COUNTER,STMP\Port,15]   * SET TIMER FOR DIGIT COLL FOR PORT*
      C[W=NEXT]
      Q[C\DGCX=NEXT,TMOF=TRC,DGEX=TRC,HKFX=LAST,ONHX=TRE,ELSE=TRE]
      X[DBASE,STNB\Port,Dialed_number,Next_digit,Parameter2]
TRB:  X[TIMER_COUNTER,CTMP\Port]
      C[S=TRUNK_DIAL_CHECK,0,Port_dialed] *CALL TRUNK DIAL CK RT  4 PORT*
                       * IT DIALS DIGIT FOR YOU, 0=ERROR,1=CONT,2=DONE *
      Q[P1\0=TRC,1=TRA,2=NEXT]                  *RETUD RESUL FROM ROUTIN*

C[J=CLEAR_DECODERS,0,Port]   * ON SUCCESS, CLEAR DECODERS AND COLL *
      X[DBASE,STBT\Port,Collecting_bit,OFF]              * BIT, THEN    *
      X[TIMER_COUNTER,STMP\Port,10]      * TEN SECOND TIMER FOR ERROR *
                       * DIALING OUT, TOO LONG FOR HAND SHAKE SIGNAL*
      C[W=NEXT]
      Q[C\HNDS=NEXT,TMOF=CAC,ONHX=CAR,ELSE=LAST] * WAIT FOR HAND SHAKE *
                                 * SIGNAL OR TIMER OVERFLOW (ERROR) *
      X[TIMER_COUNTER,CTMP\Port]
      C[J=CAC] *ASSUME RG PT ALLREADY CALLED SO JP 2 CALLED PARTY START *
```

```
TRF: C[J=BUSY_TONE,0,Port]
     C[J=TRD]
TRC: X[TIMER_COUNTER,CTMP\Port]
     X[TRUNK_BASIC,RLTX\Port_dialed]          * RELEASE TRUNK CONNECTED TO *
     X[DBASE,STBT\Port_dialed,Connected_bit,OFF]  * CLEAR ITS CONN BIT *
     C[J=OUT_OF_SERVICE_TONE,0,Port]  * PUT OUT OF SERVICE TONE ON PORT*
TRD: X[DBASE,STNB\Port,Dialed_number,All_digits,255]  * CLEAR DIALED # *
     C[J=CLEAR_DECODERS,0,Port]
     X[DBASE,STBT\Port,Collecting_bit,OFF]
     C[S=TRUNK_DIAL_CHECK,255,Port_dialed]       * CLEAR TRUNKS DIALER *
     C[J=CAP]      * JUMP TO PARK *
TRE: X[TIMER_COUNTER,CTMP\Port]
     C[J=CAR]

******************** TIE TRUNK ******************************************
TIE: X[DBASE,STNB\Port,Dialed_number,All_digits,255]  * CLEAR DIALED # *
     C[J=CLEAR_DECODERS,0,Port]
     X[DBASE,STBT\Port,Collecting_bit,OFF]
     C[J=OUT_OF_SERVICE_TONE,0,Port]  * PUT OUT OF SERVICE TONE ON PORT*
     C[J=CAP]

******************** FEATURE ACCESS *************************************
FEA: C[J=COLLECT_1_DIGIT,0,Port]          * CALL COLLECT ONE DIGIT MODULE *
     X[DBASE,CKNB\Port,Dialed_number,First_digit]  *GET DIGIT COLLECTED*

Q[P1\1=SAA,2=SBA,3=SCA,4=FEB,ELSE=NEXT]   * 1=speed1,2=speed2,3=spd3*
     Q[P1\5=FMA,6=FFA,7=SPA,8=COA,ELSE=NEXT]   * 4=trans,5=mssg,6=foward *
FEC: C[J=CLEAR_DECODERS,0,Port]                   * 7=speeddialset,8=conf *
     X[DBASE,STBT\Port,Collecting_bit,OFF]

C[J=BUSY_TONE,0,Port]                    * IF ERROR, GIVE BUSY TONE *
     C[J=CAP]                                                * AND PARK *
*    ********** MESSAGING ACCESS ****************
FMA: X[DBASE,CKBT\Port,Connected_bit]         * MAKE SURE YOU ARE NOT *
     Q[P1\YES=FEC,ELSE=NEXT]                  * CONNECTED AND YOU HAVE NO ONE *
     X[DBASE,CKBT\Port,Hold_bit]              * ON HOLD BEFORE YOU ENTER THE *
     Q[P1\YES=FEC,ELSE=NEXT]                  * MESSAGE PROGRAM/PLAYBACK MODE *
     C[J=COLLECT_1_DIGIT,0,Port]
     X[DBASE,CKNB\Port,Dialed_number,First_digit]
     Q[P1\1=NEXT,2=NEXT,10=NEXT,ELSE=FEC] * FEC IS  TO GO IN ERR CONDT *
     X[STORAGE,SMLD\Port,0,Parameter1]
     C[J=COLLECT_1_DIGIT,0,Port]
     X[DBASE,CKNB\Port,Dialed_number,First_digit]
     X[STORAGE,SMLD\Port,1,Parameter1]
     C[J=COLLECT_1_DIGIT,0,Port]
     X[DBASE,CKNB\Port,Dialed_number,First_digit]
     X[STORAGE,SMLD\Port,2,Parameter1] * PLACE LSDigit IN MANAGER*
     X[STORAGE,SMLD\Port,3,0]                 * NOW CALCULATE *
     Q[C\MLER=FEC,ELSE=NEXT]          * CHECK IF CALCULATION WENT OK *
        * NOW COLLECT AND SET MESSAGE NUMBER *
     C[J=COLLECT_1_DIGIT,0,Port]
     X[DBASE,CKNB\Port,Dialed_number,First_digit]
     Q[P1\1=NEXT,10=NEXT,ELSE=FEC]  *FEC IS WHERE TO GO IN ERROR CONDT *
     X[STORAGE,SMND\Port,0,Parameter1]
     C[J=COLLECT_1_DIGIT,0,Port]
     X[DBASE,CKNB\Port,Dialed_number,First_digit]
     X[STORAGE,SMND\Port,1,Parameter1]
     C[J=COLLECT_1_DIGIT,0,Port]
     X[DBASE,CKNB\Port,Dialed_number,First_digit]
     X[STORAGE,SMND\Port,2,Parameter1] * PLACE LSDigit IN MANAGER*
     X[STORAGE,SMND\Port,3,0]                 * NOW CALCULATE *
     Q[C\MNER=FEC,ELSE=NEXT]     * CHECK TO SEE IF CALCULATION WENT OK *
     C[J=COLLECT_1_DIGIT,0,Port] * COLLECT DIGIT TO TELL PLAY OR REC ? *
     C[J=CLEAR_DECODERS,0,Port]                  * CLEAR DECODERS NOW *
     X[DBASE,STBT\Port,Collecting_bit,OFF]
     X[DBASE,CKNB\Port,Dialed_number,First_digit]
     Q[P1\1=NEXT,2=FMQ,3=FMR,4=FMD,ELSE=FEC]
        * PLAY A MESSAGE * ******************************************
     X[STORAGE,OSMP\Port,Port,0,0] *OPEN SYSTEM MESSAGE USING SET PARAM*
     Q[C\SUCC=NEXT,ELSE=FMZ]
```

```
       C[W=NEXT]
       Q[C\HNDS=NEXT,SMOS=NEXT,ONHX=FMW,ELSE=FMY]
       X[STORAGE,PYMG\Port,Port]                    * PLAY MESSAGE *
       Q[C\MGSS=NEXT,ELSE=FMY]                      * IF OK CONTINUE ELSE FEC *
       C[W=NEXT]                                    * WAIT FOR MESSAGE TO BE DONE *
       Q[C\MGDN=NEXT,ONHX=FMW,ELSE=FMX]             * IF ONHOOK, RESET *
       X[SWITCH,RSPT\Port]                          * RESET PORT, TURN OFF OUTPUT *
       X[STORAGE,CSMM\Port,0,0]                     * CLOSE SYSTEM MESSAGE *
       X[DBASE,STNB\Port,Dialed_number,All_digits,255]  * CLEAR DIALED # *
       C[J=CAA]                                     * JUMP TO BEGINNING *
                * RECORD A MESSAGE ***********************************
FMR:   X[STORAGE,OSMR\Port,Port,0,0] *OPEN SYS MESS FOR REC USING SET PAR*
       Q[C\SUCC=NEXT,ELSE=FMZ]
       C[W=NEXT]
       Q[C\HNDS=NEXT,SMOS=NEXT,ONHX=FMW,ELSE=FMY]
FMQ:   C[J=DIAL_TONE,0,Port]                        * ENTER FOR REC IN DRAM *
       X[TIMER_COUNTER,STMP\Port,2]     * PLAY DIALTONE FOR TWO SECONDS *
       C[W=NEXT]       * WAIT FOR TIMER, MUST CHECK OTHER POSSIBILITIES *
       Q[C\ONHX=FMW,TMOF=NEXT,ELSE=LAST]
       C[J=TONE_OFF,0,Port]                         * CLEAR TONE *
       X[DBASE,CKNB\Port,Dialed_number,First_digit] * CHECK IF TO GO TO *
       Q[P1\2=NEXT,3=FMS,ELSE=FMW]                  * HARD DISK OR DRAM *
       X[STORAGE,RCMG\Port,Port,0]                  * RECORD MESSAGE IN DRAM *
       C[J=FMT]
FMS:   X[STORAGE,RCMG\Port,Port,1]         * RECORD MESSAGE IN HARD DISK *
FMT:   Q[C\MGSS=NEXT,ELSE=FMY]
       C[W=NEXT]  * WAIT FOR END OF MESS, MUST CHECK OTHER POSSIBILITIES *
       Q[C\MGDN=NEXT,ONHX=FMW,ELSE=FMX]
       X[STORAGE,CSMM\Port,0,0]
       X[SWITCH,RSPT\Port]                          * RESET PORT, TURN OFF OUTPUT *
       X[DBASE,STNB\Port,Dialed_number,All_digits,255]  * CLEAR DIALED # *
       C[J=CAA]

* DELETE A MESSAGE *  ***********************************
FMD:   X[STORAGE,GMPM\Port]                         * GET PARAMETERS SO MESSAGE # *
       X[STORAGE,DMGF\Parameter3,3,Port]            * DELETE MESSAGE BOTH PLACES *
       C[J=CAA]                                     * JUMP TO BEGINING *

* STOP PLAYING/ RECORDING MESSAGE AND RESET ****************
FMW:   X[STORAGE,SRPM\Port]
       X[STORAGE,CSMM\Port,0,0]
       X[SWITCH,RSPT\Port]                          * RESET PORT, TURN OFF OUTPUT *
       X[DBASE,STNB\Port,Dialed_number,All_digits,255]  * CLEAR DIALED # *
       C[J=CAR]

* STOP PLAYING/ RECORDING MESSAGE AND PARK ****************
FMX:   X[STORAGE,SRPM\Port]
FMY:   X[STORAGE,CSMM\Port,0,0]
FMZ:   X[SWITCH,RSPT\Port]                          * RESET PORT, TURN OFF OUTPUT *
       X[DBASE,STNB\Port,Dialed_number,All_digits,255]  * CLEAR DIALED # *
       C[J=FEC]

************ CALL TRANSFER DIRECTLY ****************************
FEB:   X[DBASE,GTBT\Port,Class1_byte,0]  * CHECK TO BE SURE YOU MAY TRANS *
       Q[C\SUCC=NEXT,ELSE=FEC]                      * DBASE RESPOND CORRECTLY ? *
       Q[P2\ON=NEXT,ELSE=FEC]                       * IS BIT SET ? *
       X[DBASE,CKBT\Port,Hold_bit]       * MAKE SURE YOU HAVE ONE ON HOLD *
       Q[P1\YES=NEXT,ELSE=FEC]
       C[J=COLLECT_1_DIGIT,0,Port]       * CALL COLLECT ONE DIGIT MODULE *
       X[DBASE,STBY\Port,Digits_to_collect,3]       * INTERNAL EXTENSION *
       C[J=COLLECT_N_DIGITS,0,Port]
       C[J=CLEAR_DECODERS,0,Port]
       X[DBASE,STBT\Port,Collecting_bit,OFF]
       X[DBASE,SDNB\Port,port_dbase]                * SEARCH LDN # IN PORT DBASE *
       Q[P1\YES=NEXT,ELSE=FED]
       X[DBASE,STBY\Port,Port_dialed,Parameter2]
       X[DBASE,CKBY\Port,Port_dialed]
       X[DBASE,STBY\Hold_port,Port_dialed,Parameter1] *PUT PORT DIALED IN*
       X[DBASE,CKBT\Port_dialed,Activity_bit]       * IS PORT DIALED BUSY ? *
       Q[P1\NO=NEXT,ELSE=FEE]
```

```
     X[DBASE,CKBT\Port_dialed,Ringing_bit]
     Q[P1\NO=NEXT,ELSE=FEE]
     X[DBASE,STBY\Port_dialed,Port_ringing,Hold_port]
     X[STORAGE,OSMP\Hold_port,Port,1,23]   * OPEN PROPER SYSTEM MESSAGE *
     Q[C\SUCC=NEXT,ELSE=FEJ]                                            *
     C[W=NEXT]                                                          *
     Q[C\HNDS=NEXT,SMOS=NEXT,SMFO=FEG,ONHX=FEG,ELSE=LAST]                *
     X[STORAGE,SMNB\Hold_port,23]                                       *
     X[STORAGE,PYMG\Hold_port,Port]                *       *            *
     Q[C\MGSS=NEXT,ELSE=FEF]                                            *
     C[W=NEXT]                                                          *
     Q[C\MGDN=FEG,ONHX=NEXT,ELSE=CAR]  *IF OPERATOR HANGS UP BEFORE MSG*
     C[S=MACRO,23,Port]       *IS DONE,MACRO ONHOOK SO CAN FINISH STUFF*
FEG: X[STORAGE,CSMM\Hold_port,1,23]
FEJ: X[DBASE,CKBT\Hold_port,Activity_bit] *MAKE SURE YOUR PERSON BEING *
     Q[P1\YES=NEXT,NO=FEI]                 * TRANSFERED IS STILL THERE *
     X[DBASE,CKBT\Port_dialed,Activity_bit]    * IS PORT DIALED BUSY ? *
     Q[P1\NO=NEXT,ELSE=FEE]
     X[DBASE,CKBT\Port_dialed,Ringing_bit] *IS PORT DIALED RINGING FROM*
     Q[P1\NO=NEXT,ELSE=FEE]                               * SOMEONE ELSE ? *
FEF: C[J=RING_PORT,1,Port_dialed]          * RING PORT TRANSFERING TO *
     Q[C\EERR=FEE,ELSE=NEXT] * IF ERROR RINGING, IS BUSY ELSE CONTINUE *
     C[J=RING_BAK,1,Hold_port]           * GIVE RING BACK TO HOLD PORT *
FEI: X[DBASE,STBT\Hold_port,On_hold_bit,OFF]
     X[DBASE,STBT\Hold_port,Connected_bit,OFF]
     X[DBASE,STBY\Port,Port_dialed,255]        * CLEAR YOUR PORT DIALED *
     X[DBASE,STBY\Port,Hold_port,255]            * CLEAR YOUR HOLD PORT *
     X[DBASE,STBT\Port,Hold_bit,OFF]              * CLEAR YOUR HOLD BIT *
     X[DBASE,STNB\Port,Dialed_number,All_digits,255]  * CLEAR DIALED # *
     C[J=CAA]          * JUMP TO BEGINNING SINCE SUCESSFUL TRANSFER *
FED: C[J=OUT_OF_SERVICE_TONE,0,Port]
     C[J=CAP]
FEE: X[DBASE,STBY\Port,Port_dialed,255]
     X[DBASE,STBY\Hold_port,Port_dialed,Port]
     C[J=BUSY_TONE,0,Port]
     C[J=CAP]

*    ****** PROGRAM USER'S CALL FOWARDING SECTION **********************
FFA: C[J=COLLECT_1_DIGIT,0,Port]        * CALL COLLECT ONE DIGIT MODULE *
     X[DBASE,CKNB\Port,Dialed_number,First_digit]  *GET DIGIT COLLECTED*
     Q[P1\1=NEXT,2=FFB,3=FFC,4=FFD,5=FFE,6=FFF,ELSE=FEC]
*    ****** CFAC ******   1=CFAC  2=CFB  3=CFNA
     X[DBASE,GTBT\Port,Class1_byte,1]
     Q[C\SUCC=NEXT,ELSE=FEC]
     Q[P2\ON=NEXT,ELSE=FEC]
     C[J=COLLECT_1_DIGIT,0,Port]        * CALL COLLECT ONE DIGIT MODULE *
     X[DBASE,STBY\Port,Digits_to_collect,3]        * INTERNAL EXTENSION *
     C[J=COLLECT_N_DIGITS,0,Port]
     C[J=CLEAR_DECODERS,0,Port]
     X[DBASE,STBT\Port,Collecting_bit,OFF]
     X[DBASE,SDNB\Port,port_dbase]         * SEARCH LDN # IN PORT DBASE *
     Q[P1\YES=NEXT,ELSE=FFZ]                 * MAKE SURE NUMBER EXISTS *
     X[DBASE,CKBY\Port,Port_dialed]                      * DIAL SELF ? *
     Q[P1\Port=FFY,ELSE=NEXT]       * IF DIALED SELF, GO SOMEWHERE ELSE *
     X[DBASE,CKNB\Port,Dialed_number,0]
     X[DBASE,STNB\Port,Cfac_number,0,Parameter1]
     X[DBASE,CKNB\Port,Dialed_number,1]
     X[DBASE,STNB\Port,Cfac_number,1,Parameter1]
     X[DBASE,CKNB\Port,Dialed_number,2]
     X[DBASE,STNB\Port,Cfac_number,2,Parameter1]
     X[DBASE,CKNB\Port,Dialed_number,3]
     X[DBASE,STNB\Port,Cfac_number,3,Parameter1]
     X[DBASE,STNB\Port,Dialed_number,All_digits,255]  * CLEAR DIALED # *
     X[DBASE,STBY\Port,Port_dialed,255]            * CLEAR PORT DIALED *
     X[DBASE,STBT\Port,Cfac_bit,ON]
     C[J=CAA]
*    **** CFB ****************
FFB: X[DBASE,GTBT\Port,Class1_byte,2]
     Q[C\SUCC=NEXT,ELSE=FEC]
     Q[P2\ON=NEXT,ELSE=FEC]
```

```
        C[J=COLLECT_1_DIGIT,O,Port]         * CALL COLLECT ONE DIGIT MODULE *
        X[DBASE,STBY\Port,Digits_to_collect,3]       * INTERNAL EXTENSION *
        C[J=COLLECT_N_DIGITS,O,Port]
        C[J=CLEAR_DECODERS,O,Port]
        X[DBASE,STBT\Port,Collecting_bit,OFF]
        X[DBASE,SDNB\Port,port_dbase]        * SEARCH LDN # IN PORT DBASE *
        Q[P1\YES=NEXT,ELSE=FFZ]              * MAKE SURE NUMBER EXISTS *
        X[DBASE,CKBY\Port,Port_dialed]                    * DIAL SELF ? *
        Q[P1\Port=FFY,ELSE=NEXT]     * IF DIALED SELF, GO SOMEWHERE ELSE *
        X[DBASE,CKNB\Port,Dialed_number,0]
        X[DBASE,STNB\Port,Cfb_number,0,Parameter1]
        X[DBASE,CKNB\Port,Dialed_number,1]
        X[DBASE,STNB\Port,Cfb_number,1,Parameter1]
        X[DBASE,CKNB\Port,Dialed_number,2]
        X[DBASE,STNB\Port,Cfb_number,2,Parameter1]
        X[DBASE,CKNB\Port,Dialed_number,3]
        X[DBASE,STNB\Port,Cfb_number,3,Parameter1]
        X[DBASE,STNB\Port,Dialed_number,All_digits,255]  * CLEAR DIALED # *
        X[DBASE,STBY\Port,Port_dialed,255]            * CLEAR PORT DIALED *
        X[DBASE,STBT\Port,Cfb_bit,ON]
        C[J=CAA]
*       **** CFNA **********
FFC:    X[DBASE,GTBT\Port,Class1_byte,3]
        Q[C\SUCC=NEXT,ELSE=FEC]
        Q[P2\ON=NEXT,ELSE=FEC]
        C[J=COLLECT_1_DIGIT,O,Port]         * CALL COLLECT ONE DIGIT MODULE *
        X[DBASE,STBY\Port,Digits_to_collect,3]       * INTERNAL EXTENSION *
        C[J=COLLECT_N_DIGITS,O,Port]
        C[J=CLEAR_DECODERS,O,Port]
        X[DBASE,STBT\Port,Collecting_bit,OFF]
        X[DBASE,SDNB\Port,port_dbase]        * SEARCH LDN # IN PORT DBASE *
        Q[P1\YES=NEXT,ELSE=FFZ]              * MAKE SURE NUMBER EXISTS *
        X[DBASE,CKBY\Port,Port_dialed]                    * DIAL SELF ? *
        Q[P1\Port=FFY,ELSE=NEXT]     * IF DIALED SELF, GO SOMEWHERE ELSE *
        X[DBASE,CKNB\Port,Dialed_number,0]
        X[DBASE,STNB\Port,Cfna_number,0,Parameter1]
        X[DBASE,CKNB\Port,Dialed_number,1]
        X[DBASE,STNB\Port,Cfna_number,1,Parameter1]
        X[DBASE,CKNB\Port,Dialed_number,2]
        X[DBASE,STNB\Port,Cfna_number,2,Parameter1]
        X[DBASE,CKNB\Port,Dialed_number,3]
        X[DBASE,STNB\Port,Cfna_number,3,Parameter1]
        X[DBASE,STNB\Port,Dialed_number,All_digits,255]  * CLEAR DIALED # *
        X[DBASE,STBY\Port,Port_dialed,255]            * CLEAR PORT DIALED *
        X[DBASE,STBT\Port,Cfna_bit,ON]
        C[J=CAA]
*       ***** CLEAR CFAC *************
FFD:    C[J=CLEAR_DECODERS,O,Port]
        X[DBASE,STBT\Port,Collecting_bit,OFF]
        X[DBASE,STBT\Port,Cfac_bit,OFF]
        X[DBASE,STNB\Port,Cfac_number,All_digits,255]  * CLEAR CFAC NUMBER *
        C[J=CAA]
*       ***** CLEAR CFB *************
FFE:    C[J=CLEAR_DECODERS,O,Port]
        X[DBASE,STBT\Port,Collecting_bit,OFF]
        X[DBASE,STBT\Port,Cfb_bit,OFF]
        X[DBASE,STNB\Port,Cfb_number,All_digits,255]   * CLEAR CFB NUMBER *
        C[J=CAA]
*       ***** CLEAR CFNA ************
FFF:    C[J=CLEAR_DECODERS,O,Port]
        X[DBASE,STBT\Port,Collecting_bit,OFF]
        X[DBASE,STBT\Port,Cfna_bit,OFF]
        X[DBASE,STNB\Port,Cfna_number,All_digits,255]  * CLEAR  CFNA NUMBER *
        C[J=CAA]

FFY:    C[J=BUSY_TONE,O,Port]                * IF ERROR, GIVE BUSY TONE *
        C[J=CAP]                                              * AND PARK *
FFZ:    C[J=OUT_OF_SERVICE_TONE,O,Port]  *IF ERROR,GIVE OUT OF SERVICETONE*
        C[J=CAP]                                              * AND PARK *
```

```
*       ******* SETTING SPEED DIALING NUMBERS ****************************
SPA:    X[DBASE,GTBT\Port,Class1_byte,5]
        Q[C\SUCC=NEXT,ELSE=SPJ]
        Q[P2\ON=NEXT,ELSE=SPJ]

C[J=COLLECT_1_DIGIT,0,Port]
        X[DBASE,CKNB\Port,Dialed_number,First_digit]
        Q[P1\1=SPB,2=SPD,3=SPF,ELSE=SPJ]
*       ****** SETTING SPEED DIALING NUMBER 1 ******************************
SPB:    X[DBASE,STNB\Port,Speed1_number,All_digits,255]
        X[DBASE,STBY\Port,Digit_pointer,0]
SPC:    X[TIMER_COUNTER,STMP\Port,15]
        C[W=NEXT]
        Q[C\DGCX=NEXT,TMOF=SPI,ONHX=SPH,HKFX=SPI,ELSE=SPJ]
        X[DBASE,STNB\Port,Speed1_number,Next_digit,Parameter2]
        X[TIMER_COUNTER,CTMP\Port]
        X[DBASE,CKBY\Port,Digit_pointer]
        Q[P1\14=SPI,ELSE=SPC]
*       ****** SETTING SPEED DIALING NUMBER 2 ******************************
SPD:    X[DBASE,STNB\Port,Speed2_number,All_digits,255]
        X[DBASE,STBY\Port,Digit_pointer,0]
SPE:    X[TIMER_COUNTER,STMP\Port,15]
        C[W=NEXT]
        Q[C\DGCX=NEXT,TMOF=SPI,ONHX=SPH,HKFX=SPI,ELSE=SPJ]
        X[DBASE,STNB\Port,Speed2_number,Next_digit,Parameter2]
        X[TIMER_COUNTER,CTMP\Port]
        X[DBASE,CKBY\Port,Digit_pointer]
        Q[P1\14=SPI,ELSE=SPE]
*       ***** SETTING SPEED DIALING NUMBER 3 *******************************
SPF:    X[DBASE,STNB\Port,Speed3_number,All_digits,255]
        X[DBASE,STBY\Port,Digit_pointer,0]
SPG:    X[TIMER_COUNTER,STMP\Port,15]
        C[W=NEXT]
        Q[C\DGCX=NEXT,TMOF=SPI,ONHX=SPH,HKFX=SPI,ELSE=SPJ]
        X[DBASE,STNB\Port,Speed3_number,Next_digit,Parameter2]
        X[TIMER_COUNTER,CTMP\Port]
        X[DBASE,CKBY\Port,Digit_pointer]
        Q[P1\14=SPI,ELSE=SPG]
*       ****** FOR CORRECT TERMINATION AND RESTART ************************
SPI:    X[TIMER_COUNTER,CTMP\Port]
        C[J=CLEAR_DECODERS,0,Port]
        X[DBASE,STBT\Port,Collecting_bit,OFF]
        C[J=CAA]
*       ****** FOR HANG UP TERMINATION OF ENTRY ***************************
SPH:    X[TIMER_COUNTER,CTMP\Port]
        C[J=CLEAR_DECODERS,0,Port]
        X[DBASE,STBT\Port,Collecting_bit,OFF]
        C[J=CAR]
*       ****** FOR ERROR TERMINATION **************************************
SPJ:    X[TIMER_COUNTER,CTMP\Port]
        C[J=CLEAR_DECODERS,0,Port]
        X[DBASE,STBT\Port,Collecting_bit,OFF]
        C[J=OUT_OF_SERVICE_TONE,0,Port]
        C[J=CAP]

*       ****** RUN SPEED DIAL NUMBER **************************************
SAA:    X[DBASE,CKNB\Port,Speed1_number,First_digit]
        Q[P1\255=SZZ,ELSE=NEXT]
        C[S=MACRO,Parameter1,Port]
SAB:    X[DBASE,CKNB\Port,Speed1_number,Next_digit]
        Q[P1\255=SZZ,ELSE=NEXT]
        C[S=MACRO,Parameter1,Port]
        C[J=SAB]

SBA:    X[DBASE,CKNB\Port,Speed2_number,First_digit]
        Q[P1\255=SZZ,ELSE=NEXT]
        C[S=MACRO,Parameter1,Port]
SBB:    X[DBASE,CKNB\Port,Speed2_number,Next_digit]
        Q[P1\255=SZZ,ELSE=NEXT]
        C[S=MACRO,Parameter1,Port]
        C[J=SBB]
```

```
SCA: X[DBASE,CKNB\Port,Speed3_number,First_digit]
     Q[P1\255=SZZ,ELSE=NEXT]
     C[S=MACRO,Parameter1,Port]
SCB: X[DBASE,CKNB\Port,Speed3_number,Next_digit]
     Q[P1\255=SZZ,ELSE=NEXT]
     C[S=MACRO,Parameter1,Port]
     C[J=SCB]

SZZ: C[J=CLEAR_DECODERS,0,Port]
     X[DBASE,STBT\Port,Collecting_bit,OFF]
     C[J=CAA]
*    ************ CONFERENCING ******************************
COA: X[DBASE,GTBT\Port,Class1_byte,6]         * MAKE SURE YOU CAN ACCESS *
     Q[C\SUCC=NEXT,ELSE=COD]                  * CONFERENCING *
     Q[P2\ON=NEXT,ELSE=COB]
     C[J=COLLECT_1_DIGIT,0,Port]              * CALL COLLECT ONE DIGIT MODULE *
     C[J=CLEAR_DECODERS,0,Port]
     X[DBASE,STBT\Port,Collecting_bit,OFF]
     X[DBASE,CKNB\Port,Dialed_number,First_digit] *GET DIGIT COLLECTED *

Q[P1\1=COH,2=COI,3=CON,ELSE=COB]         * 1=ADD,2=DELETE,3=RELEASE *

*    **** ADD A PORT TO A CONFERENCE **************
COH: X[DBASE,CKBT\Port,Hold_bit]              * DO YOU HAVE ANYONE ON HOLD ? *
     Q[P1\NO=COP,ELSE=NEXT]
     X[DBASE,CKBY\Port,Conference_byte]       * ARE YOU IN A CONFERENCE ? *
     Q[P1\255=NEXT,ELSE=COP]
*    YOU WANT TO START A CONFERENCE WITH THE PERSON YOU HAVE ON HOLD*
     X[CONFERENCE,APTC\Port,Port,1]           * NEW CONFERENCE CHANNEL *
     Q[C\SUCC=NEXT,ELSE=COB]
     X[DBASE,STBY\Port,Conference_byte,Parameter2]  * LOAD CH # IN YOUR *
     X[DBASE,STBT\Port,Conference_bit,1]      * SET YOUR CONF STUFF *
     X[DBASE,STBT\Port,Conf_master_bit,1]     * FOR RECORDS *
     X[DBASE,STBT\Port,Connected_bit,1]       * SET YOUR CONNECTED BIT *
     X[DBASE,STNB\Port,Dialed_number,All_digits,255]  * CLEAR DIALED # *
     X[CONFERENCE,APTC\Port,Hold_port,0]      * + OTHER PORT TO CONFERENCE*
     X[DBASE,STBT\Hold_port,Conference_bit,1] * SET OTHERS CONF BIT *
     X[DBASE,STBY\Hold_port,Port_dialed,255]  * CLEAR OTHERS PORT DIAL*
     X[DBASE,CKBY\Port,Conference_byte]       * SET OTHERS CONFERENCE BYTE *
     X[DBASE,STBY\Hold_port,Conference_byte,Parameter1]    * HERE *
     X[DBASE,STBT\Hold_port,On_hold_bit,OFF]  *CLEAR OTHERS ON HLD BIT *
     X[DBASE,STBY\Port,Hold_port,255]         *CLEAR Hold_port,(FOR BELOW)*
     X[DBASE,STBT\Port,Hold_bit,OFF]          * CLEAR HOLD BIT *
     C[J=CAP]

COP: X[DBASE,CKBT\Port,Conf_master_bit]
     Q[P1\YES=NEXT,ELSE=COE]
     X[DBASE,CKBY\Port,Conference_byte]
     X[CONFERENCE,GCCD\Parameter1,1]          * GET CONF CH DATA TYPE # 1 *
     Q[C\SUCC=NEXT,EERR=COD,ELSE=COE]
     Q[P4\0=NEXT,ELSE=CAA]                    * IF ROOM LEFT, JUMP TO BEGINING *
COE: C[J=BUSY_TONE,0,Port]                    * GIVE BUSY TONE *
     C[J=CAP]                                 * JUMP TO PARK *
COD: C[J=OUT_OF_SERVICE_TONE,0,Port]          * GIVE OUT OF SERVICE TONE *
     C[J=CAP]                                 * JUMP TO PARK *
COE: X[DBASE,CKBY\Port,Conference_byte]
     Q[P1\YES=NEXT,ELSE=COF]
     C[J=CAP]
COF: X[DBASE,CKBT\Port,Conference_bit]
     Q[P1\YES=NEXT,ELSE=COG]
     C[J=CAP]
COG: X[CONFERENCE,APTC\Port,Port,1]           * NEW CONFERENCE CHANNEL *
     Q[C\SUCC=NEXT,ELSE=COB]
     X[DBASE,STBY\Port,Conference_byte,Parameter2]  * LOAD CH # IN YOUR *
     X[DBASE,STBT\Port,Conference_bit,1]
     X[DBASE,STBT\Port,Conf_master_bit,1]
     X[DBASE,CKBY\Port,Conference_byte]       * GET CONFERENCE BYTE *
     X[CONFERENCE,TRPC\Port,Parameter1]       * TEMP REMOVE FROM CH *
     X[DBASE,STBT\Port,Conf_hold_bit,1]       * SET HOLD BIT *
     C[J=CAA]
```

```
*     *****  DELETE LAST PORT OFF CONFERENCE ***************
COI:  X[DBASE,CKBT\Port,Conf_master_bit]
      Q[P1\YES=NEXT,ELSE=COK]
      X[DBASE,CKBY\Port,Conference_byte]       * GET CONF CH # *
      X[CONFERENCE,RLPC\Port,Parameter1]       * RELEASE LAST CH *
      Q[C\SUCC=NEXT,ELSE=COM]
      X[DBASE,CKBY\Port,Conference_byte]                 * GET CONF CH # *
      X[CONFERENCE,RRPC\Port,Parameter1]                 * RECONNECT YOU *
      X[DBASE,STBT\Port,Conf_hold_bit,0]        * CLEAR CONF HOLD BIT *
      C[J=CAP]                                                   * PARK *
COM:  Q[P1\2=NEXT,ELSE=COL]
COO:  X[DBASE,CKBY\Port,Conference_byte]                 * GET CONF CH # *
      X[CONFERENCE,RCCH\Port,Parameter1] * RELEASE ENTIRE CONFERENCE CH *
      X[DBASE,STBY\Port,Conference_byte,255]
      X[DBASE,STBT\Port,Conf_master_bit,0]
      X[DBASE,STBT\Port,Conf_hold_bit,0]                * CLEAR HOLD BIT *
      C[J=CAA]                                          * GO TO BEGINING *

COK:  C[J=BUSY_TONE,0,Port]                             * GIVE BUSY TONE *
      C[J=CAP]                                          * JUMP TO PARK *
COL:  C[J=OUT_OF_SERVICE_TONE,0,Port]
      C[J=CAP]

*     *****  RELEASE CONFERENCE ***************************
CON:  X[DBASE,CKBT\Port,Conf_master_bit]
      Q[P1\YES=COO,ELSE=COK]

******************* CONTINUATION OF MAIN PROGRAM PATH ****************
CAG:  C[S=GROUP,1,Port]                          * CALL GROUP SUBROUTINE *
CAJ:  X[DBASE,SDNB\Port,port_dbase]              * SEARCH LDN # IN PORT DBASE *
      Q[P1\YES=CAK,NO=NEXT,ELSE=CAR]
*     ****** THIS NEXT BLOCK IS FOR AUDIO MESSAGE *********************
      X[STORAGE,OSMP\Port,Port,1,21]           * OPEN MESSAGE # 21 *       *
      Q[C\SUCC=NEXT,ELSE=CBN]                  * MAKE SURE IT IS OK *      *
      C[W=NEXT]                                *IF IT IS OK *              *
      Q[C\HNDS=NEXT,SMOS=NEXT,SMFO=CEN,ONHX=CBK,ELSE=LAST] *CONTINUE ON *
*
      X[STORAGE,SSMN\Port,First_message,21] *SET SEQU MESS NUMBER TO 21 *
      Q[C\SMER=CBN,ELSE=NEXT]                                             *
      ********                                                            *
      X[DBASE,CKNB\Port,Dialed_number,First_digit]                        *
      Q[P1\10=NEXT,255=CBN,ELSE=CBB]                                      *
      X[STORAGE,OSMP\Port,Port,1,0]            * OPEN SYSTEM MESSAGE ZERO *
      Q[C\SUCC=NEXT,ELSE=CBN]                                             *
      C[W=NEXT]                                                           *
      Q[C\HNDS=NEXT,SMOS=NEXT,SMFO=CBN,ONHX=CBK,ELSE=LAST]                *
      X[STORAGE,SSMN\Port,Next_message,0]      * SET SEQU MESS NUMBER TO 0 *
                                *
      Q[C\SMER=CBN,ELSE=CBC]                                              *
CBB:  X[STORAGE,OSMP\Port,Port,1,Parameter1] *OPEN PROPER SYSTEM MESSAGE*
      Q[C\SUCC=NEXT,ELSE=CBN]                                             *
      C[W=NEXT]                                                           *
      Q[C\HNDS=NEXT,SMOS=NEXT,SMFO=CBN,ONHX=CBK,ELSE=LAST]                *
      X[DBASE,CKNB\Port,Dialed_number,Present_digit]   * RE-ESTABLISH P1 *
      X[STORAGE,SSMN\Port,Next_message,Parameter1]
      Q[C\SMER=CBN,ELSE=NEXT]                                             *
      ********                                                            *
CBC:  X[DBASE,CKNB\Port,Dialed_number,Next_digit]                         *
      Q[P1\10=NEXT,255=CBN,ELSE=CBD]                                      *
      X[STORAGE,OSMP\Port,Port,1,0]            * OPEN SYSTEM MESSAGE ZERO *
      Q[C\SUCC=NEXT,ELSE=CBN]                                             *
      C[W=NEXT]                                                           *
      Q[C\HNDS=NEXT,SMOS=NEXT,SMFO=CBN,ONHX=CEK,ELSE=LAST]                *
      X[STORAGE,SSMN\Port,Next_message,0]                                 *
      Q[C\SMER=CBN,ELSE=CBE]                                              *
CBD:  X[STORAGE,OSMP\Port,Port,1,Parameter1] *OPEN PROPER SYSTEM MESSAGE*
      Q[C\SUCC=NEXT,ELSE=CBN]                                             *
      C[W=NEXT]                                                           *
      Q[C\HNDS=NEXT,SMOS=NEXT,SMFO=CBN,ONHX=CBK,ELSE=LAST]                *
      X[DBASE,CKNB\Port,Dialed_number,Present_digit]   * RE-ESTABLISH P1 *
```

```
       X[STORAGE,SSMN\Port,Next_message,Parameter1]
       Q[C\SMER=CBN,ELSE=NEXT]                                              *
       **********                                                            *
  CBE: X[DBASE,CKNB\Port,Dialed_number,Next_digit]                          *
       Q[P1\10=NEXT,255=CBN,ELSE=CBF]                                       *
       X[STORAGE,OSMP\Port,Port,1,0]        * OPEN SYSTEM MESSAGE ZERO *
       Q[C\SUCC=NEXT,ELSE=CBN]                                              *
       C[W=NEXT]                                                            *
       Q[C\HNDS=NEXT,SMOS=NEXT,SMFO=CBN,ONHX=CBK,ELSE=LAST]                 *
       X[STORAGE,SSMN\Port,Next_message,0]                                  *
       Q[C\SMER=CBN,ELSE=CBG]                                               *
  CEF: X[STORAGE,OSMP\Port,Port,1,Parameter1] *OPEN PROPER SYSTEM MESSAGE*
       Q[C\SUCC=NEXT,ELSE=CBN]                                              *
       C[W=NEXT]                                                            *
       Q[C\HNDS=NEXT,SMOS=NEXT,SMFO=CBN,ONHX=CBK,ELSE=LAST]                 *
       X[DBASE,CKNB\Port,Dialed_number,Present_digit]   * RE-ESTABLISH P1 *
       X[STORAGE,SSMN\Port,Next_message,Parameter1]                         *
       Q[C\SMER=CBN,ELSE=NEXT]                                              *
       ***********                                                           *
  CBG: X[DBASE,CKNB\Port,Dialed_number,Next_digit]                          *
       Q[P1\10=NEXT,255=CBN,ELSE=CBH]                                       *
       X[STORAGE,OSMP\Port,Port,1,0]        * OPEN SYSTEM MESSAGE ZERO *
       Q[C\SUCC=NEXT,ELSE=CBN]                                              *
       C[W=NEXT]                                                            *
       Q[C\HNDS=NEXT,SMOS=NEXT,SMFO=CBN,ONHX=CBK,ELSE=LAST]                 *
       X[STORAGE,SSMN\Port,Next_message,0]                                  *
       Q[C\SMER=CBN,ELSE=CBI]                                               *
  CBH: X[STORAGE,OSMP\Port,Port,1,Parameter1] *OPEN PROPER SYSTEM MESSAGE*
       Q[C\SUCC=NEXT,ELSE=CBN]                                              *
       C[W=NEXT]                                                            *
       Q[C\HNDS=NEXT,SMOS=NEXT,SMFO=CBN,ONHX=CBK,ELSE=LAST]                 *
       X[DBASE,CKNB\Port,Dialed_number,Present_digit]   * RE-ESTABLISH P1 *
       X[STORAGE,SSMN\Port,Next_message,Parameter1]                         *
       Q[C\SMER=CBN,ELSE=NEXT]                                              *
  CBI: X[STORAGE,OSMP\Port,Port,1,22]                                       *
       Q[C\SUCC=NEXT,ELSE=CBN]              * OPEN MESSAGE # 21 *
       C[W=NEXT]                            * MAKE SURE IT IS OK *
                                            *IF IT IS OK *                  *
       Q[C\HNDS=NEXT,SMOS=NEXT,SMFO=CBN,ONHX=CBK,ELSE=LAST] * CONTINUE ON*
       X[STORAGE,SSMN\Port,Next_message,22]                                 *
       Q[C\SMER=CBN,ELSE=CBJ] * ON ERROR GOTO CBN ON SUCCESS GOTO CBJ       *

* CLEAR STUFF *
  CBM: X[STORAGE,SRPM\Port]
       X[TONE_MESSAGE,PSPO\Port]           * STOP PLAYING IF ALLREADY STARTED *
       C[W=NEXT]                                    * PUT SCIELENCE ON PORT *
       Q[C\MGDN=NEXT,ELSE=LAST]                                              *
  CBL: X[TIMER_COUNTER,CTMP\Port]                   * STOP PLAYING MESSAGE *
  CBK: X[STORAGE,CASM\Port]                         * CLEAR TIMER IF NEEDED *
       C[J=CAR]                 * CLEAR ALL MESSAGE STUFF FOR THIS PORT *
                                                           * JUMP TO RESET *
  CBN: X[STORAGE,CASM\Port]     * CLEAR ALL MESSAGE STUFF FOR THIS PORT *
       C[J=CBA]                       * THEN JUMP TO OUT OF SERVICE TONE *

CBJ: X[STORAGE,PSMG\Port,Port]      * !!!! PLAY SEQUENTIAL MESSAGE !!!! *

Q[C\SMSS=NEXT,ELSE=CBA]
                                                                              *
       C[W=NEXT]
       Q[C\ONHX=CBM,MGDN=NEXT,ELSE=LAST] *ONHX MUST STOP PLAYING MESSAGE *

X[TONE_MESSAGE,PSPO\Port]                    * PUT SCIELENCE ON PORT *
       X[STORAGE,CASM\Port]    * CLEAR ALL MESSAGE STUFF FOR THIS PORT *
 *     ***** END BLOCK FOR AUDIO MESSAGE ***********************************

CBA: C[J=OUT_OF_SERVICE_TONE,0,Port]            * CALL OUT OF SERVICE MODULE *
       C[J=CAP]                                                 * NOW PARK *

CAK: X[DBASE,STBY\Port,Port_dialed,Parameter2]      * PUT PORT DIALED IN *
 ******************** DID PORT DIAL SELF ? **************************
       ENTRY(TRUNK_IN)
```

```
     X[DBASE,CKBY\Port,Port_dialed]                    * DIAL SELF ? *
     Q[P1\Port=NEXT,ELSE=CAD]      * IF DIALED SELF, GO SOMEWHERE ELSE *
     C[J=BUSY_TONE,0,Port]                       * CALL BUSY TONE MODULE *
     C[J=CAP]                                          * NOW PARK *

****************** CHECK CALL FOWARD ALL CALLS **********************
CAD: X[DBASE,CKBT\Port_dialed,Cfac_bit]   * CHECK CALL FOWARD ALL CALLS *
     Q[P1\YES=NEXT,NO=CAT,ELSE=CAR]

X[DBASE,CKBY\Port,Call_fowards_byte]           * CLEAR STUFF HERE *
     Q[P1\0=NEXT,1=NEXT,2=CAE,ELSE=CAE]      * CHECK # OF CALL FOWARDS *
     X[DBASE,ICBY\Port,Call_fowards_byte] * INCREMENT CALL FOWARD BYTE *
     X[DBASE,CKNB\Port_dialed,Cfac_number,0]
     X[DBASE,STNB\Port,Dialed_number,0,Parameter1]
     X[DBASE,CKNB\Port_dialed,Cfac_number,1]
     X[DBASE,STNB\Port,Dialed_number,1,Parameter1]
     X[DBASE,CKNB\Port_dialed,Cfac_number,2]
     X[DBASE,STNB\Port,Dialed_number,2,Parameter1]
     X[DBASE,CKNB\Port_dialed,Cfac_number,3]
     X[DBASE,STNB\Port,Dialed_number,3,Parameter1]
     X[DBASE,STBY\Port,Port_dialed,255]             * CLEAR PORT DIALED *
     C[J=CAJ]                         * JUMP TO PROCESSING NUMBER DIALED *

******************** CHECK IF PORT IS BUSY **************************
CAT: X[DBASE,CKBT\Port_dialed,Activity_bit]        * PORT DIALED BUSY ? *
     Q[P1\YES=NEXT,NO=CAF,ELSE=CAR]

C[J=MULTI_PORT_ACCESS,1,Port_dialed]        * CALLED PARTY MODULE *

******************* CHECK CALL FOWARD ON BUSY ***********************
CAL: X[DBASE,CKBT\Port_dialed,Cfb_bit]     * CHECK CALL FOWARD BUSY BIT *
     Q[P1\YES=NEXT,NO=CAE]
     X[DBASE,CKBY\Port,Call_fowards_byte]           * CLEAR STUFF HERE *
     Q[P1\0=NEXT,1=NEXT,2=CAE,ELSE=CAE]       * CHECK # OF CALL FOWARDS *
     X[DBASE,ICBY\Port,Call_fowards_byte] * INCREMENT CALL FOWARD BYTE *
     X[DBASE,CKNB\Port_dialed,Cfb_number,0]
     X[DBASE,STNB\Port,Dialed_number,0,Parameter1]
     X[DBASE,CKNB\Port_dialed,Cfb_number,1]
     X[DBASE,STNB\Port,Dialed_number,1,Parameter1]
     X[DBASE,CKNB\Port_dialed,Cfb_number,2]
     X[DBASE,STNB\Port,Dialed_number,2,Parameter1]
     X[DBASE,CKNB\Port_dialed,Cfb_number,3]
     X[DBASE,STNB\Port,Dialed_number,3,Parameter1]
     X[DBASE,STBY\Port,Port_dialed,255]             * CLEAR PORT DIALED *
     C[J=CAJ]                        * JUMP TO PROCESSING NUMBER DIALED *

******************** LINE IS BUSY AND NO CALL FOWARD ON BUSY **********
CAE: C[J=BUSY_TONE,0,Port]                          * SEND BUSY MESSAGE *
     X[DBASE,STBY\Port,Port_dialed,255]
     C[J=CAP]                                              * NOW PARK *

***************** LINE IS NOT BUSY SO CHECK IF BEING RUNG **********
CAF: X[DBASE,CKBT\Port_dialed,Ringing_bit]      * START HERE IF NOT BUSY *
     Q[P1\YES=CAL,NO=NEXT,ELSE=CAR] *IF SOMEONE ELSE RINGING PHONE,BUSY*

******************* RING LINE ***************************************
     * SET RING TIMER HERE *

C[J=RING_PORT,1,Port_dialed]       * CALL RING PORT TO RING PORT *
     Q[C\EERR=NEXT,ELSE=CTT]  * IF RING ERROR,BUSY & PARK, ELSE CONNECT *
     X[DBASE,STBT\Port_dialed,Ringing_bit,OFF]
     X[DBASE,STBY\Port,Port_dialed,255]
     C[J=BUSY_TONE,0,Port]
     C[J=CAP]
CTT: C[J=RING_BAK,0,Port]          * CALL RING BAK TO GIVE PROPER MESSAGE *
     X[DBASE,STBY\Port_dialed,Port_ringing,Port]*MAKE SURE THIS WILL WK*
     X[TIMER_COUNTER,STMP\Port,15]       * SET RING TIMER FOR 15 SECONDS *

***************** ENTRY CALLED PARTY START **************************
     ENTRY(CALLED_PARTY_START)
```

```
******************** CONNECT PORTS *******************************
CAC:  C[J=CONNECT_PORTS,0,Port]   * CALLED PARTY START AND HOLD RECOVERY *

******************** PARK *******************************************
      ENTRY<PARK_START>
CAP:  C[J=PARK,0,Port]            * CAP STANDS FOR CALL PROCESSOR PARK *
      Q[C\ONHX=NEXT,HKFX=CAH,TMOF=CAI,ELSE=LAST]

******************** ON HOOK *****************************************
      X[TIMER_COUNTER,CTMP\Port]  * CLEAR ANY TIMER THAT EXISTS FOR PORT*
      C[J=TONE_OFF,0,Port]        * CALL MODULE TO TURN OFF TONES ON THIS PORT *
      C[J=ON_HOOK,0,Port]         * CALL ON_HOOK MODULE TO TAKE CARE OF STUFF *
      C[J=CAA]                    * IF THIS POINT IS REACHED, MUST JUMP TO BEGIN *

CAH:  X[TIMER_COUNTER,CTMP\Port]  * CLEAR ANY TIMER THAT EXISTS FOR PORT*
      X[DBASE,CKBT\Port,Connected_bit] * ARE YOU CONNECTED TO ANYTHING? *
      Q[P1\NO=NEXT,YES=CAV,ELSE=CAP]   * YES GOTO HOLD, NO THEN CHECK IF*
      X[DBASE,CKBT\Port,Hold_bit]      * YOU HAVE ANYONE ON HOLD, IF SO GOTO*
      Q[P1\NO=NEXT,YES=NEXT,ELSE=CAP]       * HOLD ALSO, OTHERWISE PARK *
      X[DBASE,CKBT\Port,Conf_master_bit]    * OR IF YOUR A CONF MASTER *
      Q[P1\YES=NEXT,ELSE=CAP]               * GO TO HOLD *
CAV:  C[J=HOLD,0,Port]                      * CALL PROCESSOR HOLD *
      C[J=CAA]                    * JUMP TO BEGINING OF CALL PROCESSOR *

******************** CHECK CALL FOWARD NO ANSWER *********************
                                  * THE TIMER OVERFLOW IS FOR THE DIALING PORT *
CAI:  X[DBASE,CKBT\Port_dialed,Cfna_bit]  * CHECK THE PORT YOUR DIALING *
      Q[P1\YES=NEXT,NO=CAP]              * IF NO RE-PARK, IF YES, DO IT *

X[DBASE,CKBY\Port,Call_fowards_byte]   * CLEAR STUFF HERE *
      Q[P1\0=NEXT,1=NEXT,2=CAP,ELSE=CAP]     * CHECK # OF CALL FOWARDS *
      X[DBASE,ICBY\Port,Call_fowards_byte]   * INCREMENT CALL FOWARD BYTE *
      C[J=STOP_RINGING_PORT,1,Port_dialed]   * STOP RINGING THE PORT *
      C[J=TONE_OFF,0,Port]   * CALL MODULE TO TURN OFF TONES ON THIS PORT *
      X[DBASE,STBY\Port_dialed,Port_ringing,255]  * CLEAR PD'S PORTRING *
      X[DBASE,CKNB\Port_dialed,Cfna_number,0]
      X[DBASE,STNB\Port,Dialed_number,0,Parameter1]
      X[DBASE,CKNB\Port_dialed,Cfna_number,1]
      X[DBASE,STNB\Port,Dialed_number,1,Parameter1]
      X[DBASE,CKNB\Port_dialed,Cfna_number,2]
      X[DBASE,STNB\Port,Dialed_number,2,Parameter1]
      X[DBASE,CKNB\Port_dialed,Cfna_number,3]
      X[DBASE,STNB\Port,Dialed_number,3,Parameter1]
      X[DBASE,STBY\Port_dialed,Port_dialed,255]   * CLEAR PORT DIALED *
      C[J=CAJ]                    * JUMP TO PROCESSING NUMBER DIALED *

CAR:  X[SWITCH,RSPT\Port]                   * RESET PORT, TURN OFF OUTPUT *
      C[J=RESET_PORT,0,Port]
      C[J=CLEAR_DECODERS,0,Port]
      C[J=ON_HOOK,0,Port]
      C[J=BEGIN,0,Port]           * note this jumps to begining of cp !! *
      END<CALL_PROCESSOR>
```

APPENDIX B

ANALOG.021

```
      MODULE<ANALOG_DEVICE_PROCESSOR>                    * ANALOG.021 *
                                                 * use with callproc.021 *
      INCLUDE<COMMANDS.DEF>                      * uses condt 3 as well *
      INCLUDE<PARAMETE.DEF>                      * this one will not answer*
      DEFINE<BEGIN=AAA>              * trunk untill inside line answers it*
      DEFINE<RESET=AZZ>                                * uses trunk.021 *
                                                 * HAS CONFERENCING ALSO *
******************** BEGIN *******************************************
      ENTRY<BEGIN>
AA:   C[W=NEXT]                   *WAIT TILL LINE ACTIVITY,BIT IS SET IN MNG*
      Q[C\OFHX=NEXT,ONHX=RESET,HKFX=LAST,RTDX=AAX,ELSE=RESET]
      C[J=START,0,Port]                                * JUMP TO CP START *
```

```
,X: X[DBASE,CKBY\Port,Port_ringing]         * GET PORT WHICH IS RINGING *
    X[DBASE,STBY\Port,Port_dialed,Parameter1]  * PUT INTO PORT DIALED *
    X[DBASE,STBY\Port,Port_ringing,255]        * CLEAR PORT RINGING *
    X[DBASE,STBT\Port,Ringing_bit,OFF]          * CLEAR RINGING BIT *
    C[J=CALLED_PARTY_START,O,Port]         * JUMP TO CALLED_PARTY_START *
         * ABOVE XTRA LINES TO SET PORT DIALED WITH THE RINGING LINE *
              * SO WHEN CONNECT_PORTS IS EXECUTED, THE LINES WILL BE *
                                             * PROPERLY CONNECTED *

*********************** SET DECODERS ***********************************
    ENTRY<SET_DECODERS>
    X[DBASE,CKBT\Port,Dtmf_bit]
    Q[P1\YES=NEXT,NO=AAL,ELSE=RESET]
    X[DTMF_DECODER,CDCP\Port]
    Q[C\NDCA=AAT,DCCP=NEXT,ELSE=RESET]
.L: C[J=CONTINUE]
.T: X[TONE_MESSAGE,CNPT\Port,Busy_tone]      *SINCE NO DTMF DECODER AVAIL*
    C[J=PARK_START,O,Port]                                  * THEN PARK *

******************** COLLECT 1 DIGIT ***********************************
    ENTRY<COLLECT_1_DIGIT>
    C[W=NEXT]                               * WAIT FOR DIGIT TO COME IN *
    Q[C\DGCX=NEXT,DGEX=AAW,HKFX=LAST,ONHX=RESET,ELSE=RESET]
    X[DBASE,STNB\Port,Dialed_number,First_digit,Parameter2] * SAVE IT *
    C[J=CONTINUE]                         * SUCESSFUL SO RETURN TO CP *

.W: X[DTMF_DECODER,DSDP\Port]
    X[TONE_MESSAGE,CNPT\Port,Out_of_service_tone]
    C[J=PARK_START,O,Port]

******************** COLLECT N DIGITS **********************************
    ENTRY<COLLECT_N_DIGITS>
    X[DBASE,CKBY\Port,Digits_to_collect]
    Q[C\EYCK=NEXT,ELSE=RESET]
    X[TIMER_COUNTER,SCTL\Port,Parameter1]   * SET CTR WITH DIGITS 2 COL*
.S: C[W=NEXT]                               * line *
    Q[C\DGCX=NEXT,DGEX=AAY,ONHX=RESET,HKFX=LAST,ELSE=RESET]
    X[DBASE,STNB\Port,Dialed_number,Next_digit,Parameter2]
    X[TIMER_COUNTER,DCCT\Port]
    Q[C\CTRZ=NEXT,CTDC=AAB,ELSE=RESET]
    C[J=CONTINUE]                           * RETURN TO CP DUE TO SUCESS *

.Y: X[TIMER_COUNTER,SCTL\Port,O]                          * CLEAR COUNTER *
    X[DTMF_DECODER,DSDP\Port]
    X[TONE_MESSAGE,CNPT\Port,Out_of_service_tone]   * GIVE ERROR TONE *
    C[J=PARK_START,O,Port]

********************** CLEAR DECODERS **********************************
    ENTRY<CLEAR_DECODERS>
    X[DBASE,CKBT\Port,Dtmf_bit]
    Q[P1\YES=NEXT,NO=AAN,ELSE=RESET]
    X[DTMF_DECODER,DSDP\Port]
AAN: C[J=CONTINUE]

********************** MULTI PORT ACCESS *******************************
    ENTRY<MULTI_PORT_ACCESS>                     * CALLED PARTY MODULE *
    X[DBASE,CKBT\Port,Hold_bit]        * IS THE PORT YOUR CALLING HAVE *
    Q[P1\YES=AAE,NO=NEXT,ELSE=RESET]                * ANYONE ON HOLD? *
    X[DBASE,CKBT\Port,Connected_bit]   * ARE THEY PRESENTLY CONNECTED? *
    Q[P1\NO=AAE,YES=NEXT,ELSE=RESET]
    X[DBASE,CKBY\Port,Port_dialed]      * IS THE PORT CONNECTED TO YOU *
    Q[P1\Parent_port=AAE,ELSE=NEXT]     * BUT PUT ON HOLD? IF SO RETURN *
    X[DBASE,CKBT\Port,Call_waiting_bit]  * DID THEY RING SOMEONE AND *
    Q[P1\YES=AAE,ELSE=NEXT]              * GET PUT IN CALL WAITING? *
    X[DBASE,GTBT\Port,Class1_byte,4]   * CHECK THIER CALL WAITING BIT *
    Q[C\SUCC=NEXT,ELSE=AAE]              * DBASE READ SUCCESSFUL ? *
    Q[P2\ON=NEXT,ELSE=AAE] * IF SET,THEY MAY GET CALL WAITING SO CONT *
    X[TONE_MESSAGE,CNPT\Parent_port,Ring_back_tone]
    X[DBASE,STBT\Parent_port,Connected_bit,ON]  *TO ALLOW CONN BY HOLD*
    X[DBASE,STBY\Port,Hold_port,Parent_port] *PUT PARENT PT IN HD PORT*
    X[DBASE,STBT\Port,Hold_bit,ON]                    * SET HOLD BIT *
```

```
        X[DBASE,STBT\Parent_port,On_hold_bit,ON] * put callers on hold bit*
        X[TONE_MESSAGE,CNPT\Port,Call_waiting_tone] * PUT CALL WAITING SIG*
        X[DBASE,STBT\Parent_port,Call_waiting_bit,ON] * SET CALL WAIT BIT *
        X[TIMER_COUNTER,STMP\Hold_port,20]        * SET TIMER FOR CALLING PORT *
        C[J=PARK_START,0,Hold_port] *RETURN TO PARK FOR THE CALLING PARTY *

AAE:    C[J=CONTINUE]                    * CONTINUE WITH BUSY LINE PROCESSING *

*********************** OUT OF SERVICE TONE ***************************
        ENTRY(OUT_OF_SERVICE_TONE)
        X[TONE_MESSAGE,CNPT\Port,Out_of_service_tone]
        C[J=CONTINUE]

********************** DIAL TONE ***************************************
        ENTRY(DIAL_TONE)
        X[TONE_MESSAGE,CNPT\Port,Dial_tone]
        C[J=CONTINUE]

*********************** BUSY TONE **************************************
        ENTRY(BUSY_TONE)
        X[TONE_MESSAGE,CNPT\Port,Busy_tone]
        C[J=CONTINUE]

********************** RING BAK ****************************************
        ENTRY(RING_BAK)
        X[TONE_MESSAGE,CNPT\Port,Ring_back_tone]
        C[J=CONTINUE]

*********************** RING PORT **************************************

ENTRY(RING_PORT)                          * CALLED PARTY MODULE *
        X[DBASE,STBT\Port,Ringing_bit,ON]
        X[ANALOG_BASIC,RPHX\Port,2]               * use ring pattern 2 *
        C[J=CONTINUE]

********************** CONNECT PORTS ***********************************
* IF RING BIT GETS SET YOU MUST CLEAR THE TIMER FOR THE CALLING PARTY *
* EVEN IF YOUR NOT SURE THERE IS A TIMER. THIS MUST BE DONE IN ALL DP'S*
        ENTRY(CONNECT_PORTS)
        X[DBASE,CKBY\Port,Port_dialed]
        Q[P1\255=AAQ;ELSE=NEXT]
        X[DBASE,CKBY\Port_dialed,Port_dialed]
        Q[P1\Port=NEXT,ELSE=AAQ]
        ******************* GO AHEAD AND CONNECT PORTS *******************
        X[TONE_MESSAGE,DSPT\Port_dialed]
        X[TONE_MESSAGE,DSPT\Port]
        X[DBASE,CKBY\Port_dialed,Type_byte]       * CHECK IF THE PORT YOUR *
        Q[P1\2=NEXT,ELSE=ACK]              * CONNECTING TO IS A TRUNK, IF SO *
        X[TRUNK_BASIC,CNTX\Port_dialed]    * SEND A CONNECT TRUNK COMMAND *
ACK:    X[SWITCH,CONP\Port,Port_dialed]           * CONNECT PORTS QUICKLY *
        X[DBASE,STBT\Port,Ringing_bit,OFF]          * CLEAR RINGING BIT *
        X[TIMER_COUNTER,CTMP\Port_dialed]*CLEAR TIMER 4 PORT WHO DIALED ME*
        X[DBASE,STBT\Port,Connected_bit,ON]       * SET CONNECTED BIT *
        X[DBASE,STBT\Port_dialed,Connected_bit,ON]  * SET CONNECTED BIT *

AAQ:    C[J=CONTINUE]

********************** PARK ********************************************
        ENTRY(PARK)
        C[W=NEXT]
        C[J=CONTINUE]

********************** HOLD ********************************************
        ENTRY(HOLD)
        X[DBASE,CKBY\Port,Conference_byte]    * INVOLVED IN A CONFERENCE? *
        Q[P1\255=NEXT,ELSE=AEA]        * IF NOT CONTINUE, ELSE DO OTHER *
        X[DBASE,CKBT\Port,On_hold_bit]   * CHECK IF YOUR ON HOLD IF SO YOU *
        Q[P1\YES=NEXT,ELSE=ABD]          * CANT HOOKFLASH, ELSE CONTINUE *
        C[J=PARK_START,0,Port]
ABD:    X[DBASE,CKBT\Port,Connected_bit] * CHECK IF YOUR CONNECTED, IF SO *
```

```
      Q[P1\NO=NEXT,ELSE=ABJ]
                 * NOT CONNECTED IN HERE *
      X[DBASE,CKBT\Port,Collecting_bit]
      Q[P1\YES=NEXT,ELSE=ABF]
                 * ARE COLLECTING DIGITS BELOW HERE TO ABF *
      X[DBASE,CKBT\Port,Hold_bit]
      Q[P1\NO=NEXT,ELSE=ABE]
      C[J=CONTINUE]   * COLLECTING AND NO ONE ON HOLD SO RETURN TO PLACE *
                      * COLLECTING AND HAVE SOMONE ON HOLD BELOW HERE *
ABE:  X[DBASE,STBT\Port,Collecting_bit,OFF]      * CLEAR COLLECTING BIT *
      X[DBASE,STNB\Port,Dialed_number,All_digits,255]  * CLEAR DIALED # *
      X[DTMF_DECODER,DSDP\Port]                        * CLEAR DECODERS *
      X[TONE_MESSAGE,DSPT\Port]                  * CLEAR TONE OFF OF PORT *
      X[DBASE,CKBY\Port,Hold_port]               * PUT HOLD PORT INTO *
      X[DBASE,STBY\Port,Port_dialed,Parameter1]  * PORT DIALED *
      X[DBASE,STBT\Port,Hold_bit,OFF]            * CLEAR HOLD BIT *
      X[DBASE,STBT\Port_dialed,On_hold_bit,OFF]  * CLEAR OTHERS HOLD BIT *
      X[DBASE,STBY\Port,Hold_port,255]           * CLEAR HOLD PORT *
      C[J=CALLED_PARTY_START,0,Port]  *JP 2 CALLED PARTY START TO CONNECT*
                 * NOT CONNECTED AND NOT COLLECTING BELOW HERE TO ABJ *
ABF:  X[DBASE,CKBY\Port,Port_dialed]
      Q[P1\255=ABH,ELSE=NEXT]                    * VALID PORT DIALED ? *
      X[DBASE,CKBT\Port_dialed,Ringing_bit] * ARE YOU RINGING THE PORT? *
      Q[P1\YES=NEXT,NO=ABH]
                 * RINGING SOMONE BELOW HERE TO ABH *
      X[DBASE,CKBT\Port,Hold_bit]                * HAVE ANYONE ON HOLD ? *
      Q[P1\NO=NEXT,ELSE=ABG]
      C[J=PARK_START,0,Port] *IF RINGING SOMONE AND NO 1 ON HOLD,REPARK *
ABG:  C[J=STOP_RINGING_PORT,3,Port_dialed]       * CONDITION THREE !!!*
      X[TONE_MESSAGE,DSPT\Port]                  * CLEAR TONE OFF OF PORT *
      X[DBASE,STBY\Port,Port_dialed,255]         * CLEAR PORT DIALED *
      X[DBASE,STNB\Port,Dialed_number,All_digits,255]  * CLEAR DIALED # *
      X[DBASE,CKBY\Port,Hold_port]               * PUT HOLD PORT INTO *
      X[DBASE,STBY\Port,Port_dialed,Parameter1]  * PORT DIALED *
      X[DBASE,STBT\Port,Hold_bit,OFF]            * CLEAR HOLD BIT *
      X[DBASE,STBT\Port_dialed,On_hold_bit,OFF]  * CLEAR OTHERS HOLD BIT *
      X[DBASE,STBY\Port,Hold_port,255]           * CLEAR HOLD PORT *
      C[J=CALLED_PARTY_START,0,Port]             * JUMP TO CALLED PARTY START *
            * NOT COLL, NOT CONN NOT RING OR INVALID PORT DIALED AT ABH *
ABH:  X[DBASE,CKBT\Port,Hold_bit]                * HAVE ANYONE ON HOLD ? *
      Q[P1\YES=NEXT,ELSE=ABI]
      X[DBASE,STNB\Port,Dialed_number,All_digits,255]  * CLEAR DIALED # *
      X[DBASE,STBY\Port,Port_dialed,255]         * CLEAR PORT DIALED *
      X[TONE_MESSAGE,DSPT\Port]                  * CLEAR TONE OFF OF PORT *
      X[DBASE,STBT\Port,Hold_bit,OFF]            * CLEAR HOLD BIT *
      X[DBASE,STBT\Hold_port,On_hold_bit,OFF]    * CLEAR OTHERS HOLD BIT *
      X[DBASE,CKBY\Port,Hold_port]               * PUT HOLD PORT INTO *
      X[DBASE,STBY\Port,Port_dialed,Parameter1]  * PORT DIALED *
      X[DBASE,STBY\Port,Hold_port,255]           * CLEAR HOLD PORT *
      X[DBASE,CKBY\Port_dialed,Tone_byte] * CHECK OTHER PARTYS TONE BYTE*
      Q[P1\Call_waiting_tone=NEXT,ELSE=ACC]
      X[TONE_MESSAGE,DSPT\Port_dialed]
      X[SWITCH,CONP\Port,Port_dialed]            * CONNECT THE PORTS *
      X[TONE_MESSAGE,CNPT\Port_dialed,Call_waiting_tone]*RE CON THE TONE*
      C[J=ACD]
ACC:  X[SWITCH,CONP\Port,Port_dialed]            * CONNECT PORTS *
ACD:  X[DBASE,STBT\Port,Connected_bit,ON]  * TURN ON YOUR CONNECTED BIT *
AEI:  C[J=PARK_START,0,Port]  * ABI IS A STRANGE SITUATION SO JUST PARK *
            * BELOW HERE YOUR ARE CONNECTED TO SOMEONE *
ABJ:  X[DBASE,CKBY\Port_dialed,Tone_byte] * CHECK OTHER PARTYS TONE BYTE*
      Q[P1\Call_waiting_tone=NEXT,ELSE=ACA]
      X[TONE_MESSAGE,DSPT\Port_dialed]           * DISCONN THIER CALL WAIT TONE *
      X[SWITCH,DISP\Port,Port_dialed]            * DISCONNECT THE PORTS *
      X[TONE_MESSAGE,CNPT\Port_dialed,Call_waiting_tone]*RE CON THE TONE*
      C[J=ACB]                                   * CONTINUE ON *
ACA:  X[SWITCH,DISP\Port,Port_dialed]            * DISCONNECT PORTS *
ACB:  X[DBASE,CKBT\Port,Hold_bit]                * HAVE ANYONE ON HOLD ? *
      Q[P1\YES=NEXT,ELSE=AEK]
                 * SWITCH PORTS *
      X[DBASE,STBT\Port_dialed,Call_waiting_bit,OFF]  * CLEAR CALL WAIT *
```

```
         X[TONE_MESSAGE,DSPT\Port]
         X[TONE_MESSAGE,DSPT\Hold_port]
         X[DBASE,STBT\Port_dialed,On_hold_bit,ON]      * SET ON HOLD BIT *
         X[DBASE,STBT\Hold_port,On_hold_bit,OFF]       * CLEAR ON HOLD BIT *
         X[DBASE,CKBY\Port,Hold_port]             * THIS LINE AND THE NEXT SIX *
         X[DBASE,STBY\Port,Port_ringing,Parameter1]    * ARE SIMPLY SWITCHING*
         X[DBASE,CKBY\Port,Port_dialed]                * HOLD PORT AND PORT *
         X[DBASE,STBY\Port,Hold_port,Parameter1]       * DIALED. THE USE OF *
         X[DBASE,CKBY\Port,Port_ringing]               * A TEMPORARY VARIABLE *
         X[DBASE,STBY\Port,Port_dialed,Parameter1]     * IS NECESSARY, THIS IS*
         X[DBASE,STBY\Port,Port_ringing,255]           * WHAT PORT RINGING DID *

X[DBASE,CKBY\Port_dialed,Tone_byte]  * CHECK OTHER PARTYS TONE BYTE*
         Q[P1\Call_waiting_tone=NEXT,ELSE=ACE]
         X[TONE_MESSAGE,DSPT\Port_dialed]
         X[SWITCH,CONF\Port,Port_dialed]               * DISCONNECT THE PORTS *
         X[TONE_MESSAGE,CNPT\Port_dialed,Call_waiting_tone] *RE CON THE TONE*
         C[J=PARK_START,0,Port]                        * JUMP TO PARK *
    ACE: X[SWITCH,CONF\Port,Port_dialed]               * RECONNECT PORTS *
         C[J=PARK_START,0,Port]                        * JUMP TO PARK *
         * YOU HAVE NO ONE ON HOLD BELOW *
    ABK: X[DBASE,CKBY\Port,Port_dialed]                * PUT PORT DIALED INTO *
         X[DBASE,STBY\Port,Hold_port,Parameter1]       * HOLD PORT *
         X[DBASE,STBT\Port,Connected_bit,OFF]          * CLEAR CONNECTED BIT *
         X[DBASE,STBT\Hold_port,On_hold_bit,ON]        * SET OTHERS ON HOLD BIT *
         X[DBASE,STBT\Port,Hold_bit,ON]                * SET YOUR OWN HOLD BIT *
         X[DBASE,STNB\Port,Dialed_number,All_digits,255]  * CLEAR DIALED # *
         X[DBASE,STBY\Port,Port_dialed,255]            * CLEAR PORT DIALED *
         C[J=START,0,Port]                             * JUMP TO CALL PROCESSOR START *
*        **** DO CONFERENCING HOLD STUFF ****************************************
    AEA: X[DBASE,CKBT\Port,Conference_bit]
         Q[P1\NO=NEXT,ELSE=AEB]
         C[J=PARK_START,0,Port]                        * IF CONF BIT NOT SET, RE-PARK *
    AEB: X[DBASE,CKBT\Port,Conf_hold_bit]
         Q[P1\NO=NEXT,ELSE=AED]    * ARE YOU OUT OF A CONFERENCE RIGHT NOW? *
         X[DBASE,CKBT\Port,Conf_master_bit]
         Q[P1\NO=NEXT,ELSE=AEC]           * ARE YOU A CONFERENCE MASTER OR NOT ? *
         X[DBASE,CKBY\Port,Conference_byte]
         X[CONFERENCE,TRPC\Port,Parameter1]  *TEMP REMOVE YOURSELF FROM CONF*
         X[DBASE,STBT\Port,Conf_hold_bit]             * SET YOUR CONF HOLD BIT *
         C[J=PARK_START,0,Port]
    AEC: X[DBASE,CKBY\Port,Conference_byte]
         X[CONFERENCE,TRPC\Port,Parameter1]  *TEMP REMOVE YOURSELF FROM CONF*
         X[DBASE,STBT\Port,Conf_hold_bit,1]           * SET YOUR CONF HOLD BIT *
         C[S=MACRO,7,Port]
         C[S=MACRO,8,Port]                            * FRE DIAL 7 AND 8 FOR YOU *
         C[J=START,0,Port]                            * JUMP TO BEGINING OF CP *
    AED: X[DBASE,CKBT\Port,Conf_master_bit]
         Q[P1\NO=NEXT,ELSE=AEE]           * ARE YOU A CONFERENCE MASTER OR NOT ? *
         X[DBASE,CKBY\Port,Conference_byte]
         X[CONFERENCE,RRPC\Port,Parameter1]   * RE-CONNECT YOURSELF TO CONF *
         X[DBASE,STBT\Port,Conf_hold_bit,0]           * CLEAR YOUR CONF HOLD BIT *
         C[J=PARK_START,0,Port]
*        ***** SO YOU ARE A MASTER AND YOU ARE ON HOLD OUT OF A CONFERENCE *
*        * DO YOU HAVE SOMEONE YOUR CONNECTED TO TO BRING IN A CONFERENCE? *
    AEE: X[DBASE,CKBY\Port,Port_dialed]
         Q[P1\255=NEXT,ELSE=AEF]                       * VALID PORT DIALED ? *
    AEG: X[TONE_MESSAGE,DSPT\Port]                     * REMOVE ANY TONES *
         X[DBASE,STBY\Port,Port_dialed,255]   *CLEAR PORT DIALED,(FOR BELOW)*
         X[DBASE,CKBY\Port,Conference_byte]
         X[CONFERENCE,RRPC\Port,Parameter1]   * RE-CONNECT YOURSELF TO CONF *
         X[DBASE,STBT\Port,Conf_hold_bit,0]           * CLEAR YOUR CONF HOLD BIT *
         X[DBASE,STNB\Port,Dialed_number,All_digits,255]  * CLEAR DIALED # *
         C[J=PARK_START,0,Port]
    AEF: X[DBASE,CKBY\Port_dialed,Port_dialed]  * CHECK HIS/HER PORT DIALED *
         Q[P1\Port=AEL,ELSE=NEXT]                  * IS IT YOU?, IF SO CONTINUE *
         X[DBASE,CKBT\Port_dialed,Ringing_bit]     * IF YOUR RINGING A PORT *
         Q[P1\YES=NEXT,ELSE=AEG]                        * STOP IT ! *
         C[J=STOP_RINGING_PORT,3,Port_dialed]
         C[J=AEG]
```

```
AEL: X[TONE_MESSAGE,DSPT\Port]                              * REMOVE ANY TONES *
     X[DBASE,CKBY\Port,Conference_byte]
     X[CONFERENCE,RRPC\Port,Parameter1]    * RE-CONNECT YOURSELF TO CONF *
     X[DBASE,STBT\Port,Conf_hold_bit,0]      * CLEAR YOUR CONF HOLD BIT *
     X[DBASE,STNB\Port,Dialed_number,All_digits,255]  * CLEAR DIALED # *
     X[CONFERENCE,APTC\Port,Port_dialed,0]  * + OTHER PORT TO CONFERENCE*
     X[DBASE,STBT\Port_dialed,Conference_bit,1]   * SET OTHERS CONF BIT *
     X[DBASE,STBY\Port_dialed,Port_dialed,255]  * CLEAR OTHERS PORT DIAL*
     X[DBASE,CKBY\Port,Conference_byte]     * SET OTHERS CONFERENCE BYTE *
     X[DBASE,STBY\Port_dialed,Conference_byte,Parameter1]        * HERE *
     X[DBASE,STBY\Port,Port_dialed,255]  *CLEAR PORT DIALED,(FOR BELOW)*
     C[J=PARK_START,0,Port]

****************************** ON HOOK ******************************************
     ENTRY(ON_HOOK)                       * ASSUMES ACTIVITY BIT IS CLEARED *
     X[DBASE,CKBY\Port,Conference_byte]   * IF INVOLVED IN A CONFERENCE *
     Q[P1\255=NEXT,ELSE=AEW]                              * JUMP TO AEW *
AEH: X[DBASE,STBY\Port,Call_fowards_byte,0]  * CLEAR CALL FOWARDS BYTE *
     X[DBASE,CKBY\Port,Port_dialed]         *MUST CHECK IF PORT DIALED IS *
     Q[P1\255=ABT,ELSE=NEXT]             * VALID HERE, IF IT IS, YOU ARE*
     X[DBASE,CKBY\Port_dialed,Type_byte]   * PROBALLY CONNECTED TO A *
     Q[P1\2=NEXT,ELSE=ABT]               * TRUNK AND MUST MACRO THE TRUNK TO *
     X[DBASE,CKBT\Port_dialed,Connected_bit]           * RESET ITS SELF *
     Q[P1\YES=ABT,ELSE=NEXT]
     C[S=MACRO,20,Port_dialed]
ABT: X[DBASE,CKBT\Port,Collecting_bit]
     Q[P1\YES=NEXT,ELSE=ABL]
         * COLLECTING DIGITS HERE *
     X[DBASE,STBT\Port,Collecting_bit,OFF]
     X[DBASE,STNB\Port,Dialed_number,All_digits,255]  * CLEAR DIALED # *
ABL: X[DBASE,CKBT\Port,Connected_bit]              * NOW CHECK IF CONNECTED *
     Q[P1\YES=NEXT,ELSE=ABP]
         * YOUR CONNECTED BELOW HERE *
     X[DBASE,CKBT\Port,On_hold_bit]
     Q[P1\YES=NEXT,ELSE=ABN]
         * YOUR ON HOLD BELOW HERE *
     X[DBASE,CKBT\Port_dialed,Ringing_bit] *CHECK PORT DIALEDS RING BIT*
     Q[P1\YES=NEXT,ELSE=ABM]
     C[J=STOP_RINGING_PORT,3,Port_dialed]          * CONDITION THREE !!! *
     X[DBASE,STNB\Port,Dialed_number,All_digits,255]  * CLEAR DIALED # *
     C[J=ABZ]   * JUMP TO BLOCK *
ABM: X[DBASE,CKBT\Port_dialed,Connected_bit]  * CHECK OF OTHER PT IS CON*
     Q[P1\YES=NEXT,ELSE=ABU]  * IF SO IT PROB HAS CALL WAIT TONE FROM U*
     X[DBASE,CKBT\Port_dialed,Hobnp_bit]
     Q[P1\YES=NEXT,ELSE=ACH]  * THE PORT THAT PUT YOU ON HOLD HAS HUNG *
     C[S=MACRO,21,Port_dialed]*UP AND IS WAITING FOR TIMER AND U HUNGUP*
ACH: X[TONE_MESSAGE,DSPT\Port_dialed]           * CLEAR CALL WAITING TONE *
     X[DBASE,STBT\Port,Call_waiting_bit,OFF]    * CLEAR CALL WAIT BIT *
ABU: X[DBASE,STBT\Port_dialed,Hold_bit,OFF]       * CLEAR HIS HOLD BIT *
     X[DBASE,STBY\Port_dialed,Hold_port,255]      * CLEAR HIS HOLD PORT *
     X[DBASE,STBT\Port,On_hold_bit,OFF]         * CLEAR YOUR ON HOLD BIT *
     X[DBASE,STNB\Port,Dialed_number,All_digits,255]  * CLEAR DIALED # *
     C[J=ABZ]   * JUMP TO BLOCK *
         * YOUR NOT ON HOLD BUT CONNECTED BELOW HERE *
     *NOW THE QUESTION IS DOES THE CONNECTED PARTY HAVE ANYONE ON HOLD?*
ABN: X[DBASE,CKBT\Port_dialed,Hold_bit]
     Q[P1\NO=NEXT,ELSE=ABO]
     X[SWITCH,DISP\Port,Port_dialed]                  * DISCONNECT PORTS *
     X[DBASE,STNB\Port,Dialed_number,All_digits,255]  * CLEAR DIALED # *
     X[DBASE,CKBT\Port_dialed,Conf_master_bit]    *YOU WERE TO BE PUT IN *
     Q[P1\YES=NEXT,ELSE=ACL]     * BUT HUNG UP BEFORE YOU WERE PULLED IN *
     X[DBASE,STBY\Port_dialed,Port_dialed,255]  * CLEAR HIS PORT DIALED *
     C[J=ABZ]         * BUT DONT HANG HIM UP, IF NOT A MAST, HANG HIM UP *
ACL: X[DBASE,STBT\Port_dialed,Connected_bit,OFF]  * CLEAR HIS CONN BIT *
     X[DBASE,STBY\Port_dialed,Port_dialed,255]  * CLEAR HIS PORT DIALED *
     C[S=MACRO,20,Port_dialed]        * ONHOOK, OFFHOOK FOR PORT DIALED *
     C[J=ABZ]   * JUMP TO BLOCK *
ABO: X[DBASE,STNB\Port,Dialed_number,All_digits,255]  * CLEAR DIALED # *
     X[SWITCH,DISP\Port,Port_dialed]                  * DISCONNECT PORTS *
     X[TONE_MESSAGE,CNPT\Port_dialed,Call_waiting_tone]
```

```
         X[DBASE,STBT\Port_dialed,Connected_bit,OFF] * CLR OTHERS CONN BIT *
         X[DBASE,STBY\Port_dialed,Port_dialed,255] *CLEAR OTHERS PT DIALED *
         C[J=ABZ]  * JUMP TO BLOCK *
                * YOUR NOT CONNECTED BELOW HERE *
   AEP:  X[DBASE,CKBY\Port,Port_dialed]
         Q[P1\255=ABR,ELSE=NEXT]
         X[DBASE,CKBT\Port_dialed,Ringing_bit]
         Q[P1\NO=NEXT,ELSE=ABQ]
               * NOT CONN, NOT RINGING ANYONE BUT VALID PORT DIALED *
         X[DBASE,STNB\Port,Dialed_number,All_digits,255]  * CLEAR DIALED # *
         X[TONE_MESSAGE,DSPT\Port]                * CLEAR TONE OFF OF PORT *
         X[DBASE,STBT\Port,Collecting_bit,OFF]
         X[DTMF_DECODER,DSDP\Port]                        * CLEAR DECODERS *
         C[J=ABZ]  * JUMP TO BLOCK *
               * NOT CONN, VALID PORT DIALED AND ARE RINGING SOMONE ELSE *
   ABQ:  C[J=STOP_RINGING_PORT,3,Port_dialed]         * CONDITION THREE !!! *
         X[TONE_MESSAGE,DSPT\Port]                * CLEAR TONE OFF OF PORT *
         X[DBASE,STNB\Port,Dialed_number,All_digits,255]  * CLEAR DIALED # *
         C[J=ABZ]  * JUMP TO BLOCK *
               * INVALID PORT DIALED, NOT CONN  BELOW HERE *
   ABR:  X[TONE_MESSAGE,DSPT\Port]                * CLEAR TONE OFF OF PORT *
         X[DBASE,STNB\Port,Dialed_number,All_digits,255]  * CLEAR DIALED # *
         X[DBASE,STBT\Port,Collecting_bit,OFF]
         C[J=ABZ]  * JUMP TO BLOCK *
                * NOW DO BLOCK ROUTINE *
   ABZ:  X[DBASE,CKBT\Port,Hold_bit]
         Q[P1\YES=NEXT,ELSE=ABS]
               * YOU DO HAVE SOMONE ON HOLD HERE *
         X[TIMER_COUNTER,STMP\Port,20]  * SET TIMER FOR POnH WHEN OFF HOOK *
         X[DBASE,STBT\Port,Connected_bit,ON]
         X[DBASE,STBT\Port,Activity_bit,ON]
         X[DBASE,STBT\Port,Hobnp_bit,ON]            * SET XTRA DBASE PARAMETER
   *
   ADC:  C[W=NEXT]
         Q[C\OFHX=NEXT,TMOF=ACF,RTDX=ACI,ELSE=ACF]  * RTDX IS MACROED FROM *
         X[TIMER_COUNTER,CTMP\Port]                 * ON HOLD PORT HANGING UP *
         X[DBASE,STBT\Port,Hobnp_bit,OFF]           * PORT ON HOLD HANGING UP *
         C[S=MACRO,21,Port]                 * MACRO YOUR SELF A RING TRIP *
         C[J=ACG]                                   * SKIP RINGING SELF *
   ACI:  X[TIMER_COUNTER,CTMP\Port]
         X[DBASE,STBT\Port,Activity_bit,OFF]
         X[DBASE,STBT\Port,Hobnp_bit,OFF]
         X[DBASE,STBT\Port,Connected_bit,OFF]
         C[J=RESET]
   ACF:  X[TIMER_COUNTER,CTMP\Port]  * CAN USE RPHX HERE CAUSE YOU KNOW ITS*
         X[ANALOG_BASIC,RPHX\Port,2] * YOUR OWN PHONE AND YOUR IN YOUR DP *
         Q[C\EERR=NEXT,ELSE=ADB]    * RPHX RETURNS A GENERIC STATUS COMMAND*
         X[TIMER_COUNTER,STMP\Port,5]
         C[J=ADC]
   ADB:  X[DBASE,STBT\Port,Hobnp_bit,OFF]
         X[DBASE,STBT\Port,Activity_bit,OFF]
   ACG:  X[DBASE,STBT\Port,Connected_bit,OFF]          * CLEAR CONNECTED BIT *
         X[DBASE,STBT\Hold_port,On_hold_bit,OFF] *CLEAR OTHERS ON HOLD BIT *
         X[DBASE,STBT\Hold_port,Connected_bit,OFF]
         X[DBASE,STBT\Port,Hold_bit,OFF]           * CLEAR YOUR OWN HOLD BIT *
         X[DBASE,CKBY\Port,Hold_port]    * PUT HOLD PORT IN PORT RINGING*
         X[DBASE,STEY\Port,Port_ringing,Parameter1]
         X[DBASE,STBY\Port,Hold_port,255]                  * CLEAR HOLD PORT *
         X[DBASE,STBT\Port,Ringing_bit,ON]                 * SET RINGING BIT *

X[DBASE,STBY\Port,Port_dialed,255]               * CLEAR PORT DIALED *
         C[J=BEGIN]                             * JUMP TO BEGINING OF DP *
               * YOU DONT HAVE ANYONE ON HOLD HERE *
   ABS:  X[DBASE,STBT\Port,Connected_bit,OFF]        * CLEAR CONNECTED BIT *
         X[DBASE,STBY\Port,Port_dialed,255]          * CLEAR PORT DIALED *
         C[J=BEGIN]          * JUMP TO BEGINING *
   *    ** START CONFERENCING HANDLING STUFF *********
   AEW:  X[DBASE,CKBT\Port,Conference_bit]
         Q[P1\YES=NEXT,ELSE=AEJ]
         X[DBASE,CKBT\Port,Conf_master_bit]
```

```
        Q[P1\YES=NEXT,ELSE=AEI]
        X[DBASE,CKBY\Port,Conference_byte]   * GET YOUR CONF CHANNEL NUMBER *
        X[CONFERENCE,RCCH\Port,Parameter1]           * AND THEN CLEAR IT *
        X[DBASE,STBY\Port,Conference_byte,255]
        X[DBASE,STBT\Port,Conf_master_bit,0]
        X[DBASE,STBT\Port,Conf_hold_bit,0]
        X[DBASE,CKBY\Port,Port_dialed]
        Q[P1\255=AEH,ELSE=NEXT]                 * IF PORT DIALED IS VALID *
        X[DBASE,CKBY\Port_dialed,Port_ringing]  * ARE YOU RINGING THE PORT *
        Q[P1\Port=AEH,ELSE=NEXT]                * IF SO, DONT RESET CONN BIT*
        X[DBASE,STBT\Port,Connected_bit,1] * THEN SET BIT SO WILL DISCONN *
        C[J=AEH]                           * JUMP TO NORMAL BEGINING OF ON-HOOK *

AEI:    X[DBASE,CKBY\Port,Conference_byte]   * GET YOUR CONF CHANNEL NUMBER *
        X[CONFERENCE,RPFC\Port,Parameter1]           * AND THEN CLEAR IT *
        X[DBASE,STBY\Port,Conference_byte,255]
        X[DBASE,STBT\Port,Conf_hold_bit,0]
        X[DBASE,STBT\Port,Conf_master_bit,0]
        X[DBASE,STBT\Port,Conference_bit,0]
        X[DBASE,STBY\Port,Port_dialed,255]
        C[J=AEH]                           * JUMP TO NORMAL BEGINING OF ON-HOOK *
AEJ:    X[DBASE,CKBY\Port,Port_dialed]
        Q[P1\255=AEK,ELSE=NEXT]
        X[SWITCH,DISP\Port,Port_dialed]              * DISCONNECT PORTS *
        X[DBASE,STNB\Port,Dialed_number,All_digits,255]  * CLEAR DIALED # *
        X[DBASE,STBT\Port,Connected_bit,OFF]         * CLEAR YOUR CONN BIT *
        X[DBASE,STBY\Port_dialed,Port_dialed,255]    * CLEAR HIS PORT DIALED *
        X[DBASE,STBY\Port,Port_dialed,255]           * CLEAR YOUR PORT DIALED *
        X[DBASE,STBY\Port,Conference_byte,255]
        C[J=AEH]                           * JUMP TO NORMAL BEGINING OF ON-HOOK *
AEK:    X[DBASE,STBY\Port,Conference_byte,255]
        X[DBASE,STBT\Port,Conf_hold_bit,0]
        X[DBASE,STBT\Port,Conf_master_bit,0]
        X[DBASE,STBT\Port,Conference_bit,0]
        X[DBASE,STBY\Port,Port_dialed,255]
        X[DBASE,STNB\Port,Dialed_number,All_digits,255] * CLEAR DIALED # *
        X[DBASE,STBT\Port,Connected_bit,OFF]         * CLEAR YOUR CONN BIT *
        C[J=AEH]                           * JUMP TO NORMAL BEGINING OF ON-HOOK *

********************* STOP RINGING PORT ****************************
        ENTRY<STOP_RINGING_PORT>                     * CALLED PORT MODULE *
        X[DBASE,STBT\Port,Ringing_bit,OFF]           * CLEAR RINGING BIT *
        X[DBASE,STBY\Port,Port_ringing,255]          * CLEAR RINGING PORT *
        X[ANALOG_BASIC,RPHX\Port,128]                * 128 IS TURN RING OFF *
        C[J=CONTINUE]

********************** TONE OFF ************************************
        ENTRY<TONE_OFF>
        X[TONE_MESSAGE,DSPT\Port]
        C[J=CONTINUE]

********************** RESET_PORT **********************************

ENTRY<RESET_PORT>
AZZ:    Q[C\ONHX=AAO,ELSE=NEXT]
        X[DBASE,CKBT\Port,Activity_bit]              * IS LINE ACTIVE ? *
        Q[P1\NO=AAO,ELSE=NEXT]                       * IF SO *
        X[TONE_MESSAGE,CNPT\Port,Out_of_service_tone] *GIVE OUT OF SERVICE*
        C[J=PARK_START,0,Port]              * JUMP TO PARK TO WAIT FOR ONHOOK *
AAO:    C[J=CONTINUE]                                * CONTINUE *

********************* END ANALOG DEVICE PROCESSOR ******************
        END<ANALOG_DEVICE_PROCESSOR>
```

APPENDIX C

TRUNK.021

```
        MODULE<TRUNK_DEVICE_PROCESSOR>                          * TRUNK.021 *
                                                           * with conferencing *
        INCLUDE<COMMANDS.DEF>
        INCLUDE<PARAMETE.DEF>
        DEFINE<BEGIN=TAA>
        DEFINE<RESET=TZZ>

******************* BEGIN ***************************************
        ENTRY<BEGIN>
TAA:    C[W=NEXT]
        Q[C\TSDX=NEXT,ONHX=TAB,CERI=RESET,ELSE=RESET]
        Q[P2\2=NEXT,ELSE=TAA]                          * P1 CONTAINS PORT # *
                        * AFTER THIS POINT ASSUME YOU WILL SEIZE THE TRUNK *
        X[DBASE,STBT\Port,Ringing_bit,OFF]
        C[S=TRUNK_INCOMING,0,Port]          * CALL SUBROUTINE TO FIND A PORT *
                           * THIS ROUTIND PUTS PORT IN MY PORT DIALED AUTO*
        Q[P1\YES=NEXT,ELSE=TAA]
        C[J=TRUNK_IN,0,Port]                * JUMP TO CP TO TRUNK IN POINT *
TAB:    C[J=RESET]       * FROM A MACRO #20, THE CALLER INTERNAL HUNG UP. *

******************* MULTI PORT ACCESS ***************************
        ENTRY<MULTI_PORT_ACCESS>
        C[J=CONTINUE]          * CALL ACD_OUT TO find an open trunk
        * then upon returning from it, if
        * successful, restart at trunk entry
        * if fail, take care of error or que

******************* RING PORT ***********************************
        ENTRY<RING_PORT>
        X[DBASE,STET\Port,Activity_bit,ON]
        X[DBASE,STBT\Port,Ringing_bit,ON]   * SET RINGING BIT UNTILL SEIZED *
        X[TRUNK_BASIC,SZTX\Port]                   * ATTEMPT TO SEIZE TRUNK *
        C[W=NEXT]
        Q[C\TLSX=NEXT,TSDX=RESET,ELSE=RESET]
        X[TRUNK_BASIC,CNTX\Port]                   * CONNECT VOICE CHANNEL *
        X[DBASE,STET\Port,Ringing_bit,OFF]
        C[S=ACCOUNT,3,Port_dialed]     * CALL ACCOUNT WITH THE PORT DIALED *
        C[J=CONTINUE]

******************* SET DECODERS ********************************
        ENTRY<SET_DECODERS>
        C[J=CONTINUE]

******************* COLLECT ONE DIGIT ***************************
        ENTRY<COLLECT_1_DIGIT>
        C[J=CONTINUE]          * 18 *

******************* COLLECT N DIGITS ****************************
        ENTRY<COLLECT_N_DIGITS>
        C[J=CONTINUE]

******************* CLEAR DECODERS ******************************
        ENTRY<CLEAR_DECODERS>
        C[J=CONTINUE]          * 20 *

******************* OUT OF SERVICE TONE *************************
        ENTRY<OUT_OF_SERVICE_TONE>
        X[TONE_MESSAGE,CNPT\Port,Out_of_service_tone]
        C[J=CONTINUE]

******************* DIAL TONE ***********************************
        ENTRY<DIAL_TONE>
        X[TONE_MESSAGE,CNPT\Port,Dial_tone]
        C[J=CONTINUE]

******************* BUSY TONE ***********************************
        ENTRY<BUSY_TONE>
```

```
            X[TONE_MESSAGE,CNPT\Port,Busy_tone]
            C[J=CONTINUE]

****************** RING BACK TONE **********************************
            ENTRY<RING_BAK>
            X[DBASE,CKET\Port,Connected_bit]      * ONLY PUT RING BACK TONE ON *
            Q[P1\YES=NEXT,ELSE=TAC]                * TRUNK IF CONNECTED *
            X[TONE_MESSAGE,CNPT\Port,Ring_back_tone]
      TAC:  C[J=CONTINUE]      * 30 *

****************** CONNECT PORTS ************************************
            ENTRY<CONNECT_PORTS>
            C[J=CONTINUE]

****************** PARK *********************************************
            ENTRY<PARK>
            C[W=NEXT]                              * WAIT FOR BOARD RESPONSE *
            Q[C\TLSX=NEXT,ONHX=RESET,ELSE=TAD]           * IS IT A TLS ? *

Q[P2\0=RESET,ELSE=NEXT]       * IF YES AND SEIZURE STOPS THEN RESET*
      TAD:  C[J=CONTINUE]    * 35 *      * OTHERWISE CONTINUE IN CALL PROCESSOR*

****************** HOLD *********************************************
            ENTRY<HOLD>
            C[J=CONTINUE]

****************** ON HOOK ******************************************
            ENTRY<ON_HOOK>
            X[DBASE,CKBY\Port,Port_dialed]         * IS YOUR PORT DIALED VALID?*
            Q[P1\255=TAE,ELSE=NEXT]                * IF SO IS THAT PORTS PORT *
            X[DBASE,CKBY\Port_dialed,Port_ringing]        * RINGING YOU ? *
            Q[P1\Port=NEXT,ELSE=TAE]
            C[J=STOP_RINGING_PORT,3,Port_dialed]   *STOP RINGING PORT, CONDT 3 *
      TAE:  X[DBASE,STBY\Port,Port_dialed,255]          * CLEAR PORT DIALED *
            C[J=BEGIN]

****************** STOP RINGING PORT ********************************
            ENTRY<STOP_RINGING_PORT>
            C[J=CONTINUE]

****************** TONE OFF *****************************************
            ENTRY<TONE_OFF>
            X[TONE_MESSAGE,DSPT\Port]
            C[J=CONTINUE]

****************** RESET PORT ***************************************
            ENTRY<RESET_PORT>
      TZZ:  X[DBASE,STBT\Port,Ringing_bit,OFF]     * CLEAR RINGING BIT ALWAYS *
            C[S=TRUNK_DIAL_CHECK,255,Port]          * CLEAR TRUNKS DIALER *
            X[DBASE,CKBT\Port,Activity_bit]        * CHECK IF TRUNK ACTIVE *
            Q[P1\YES=TZA,ELSE=TZB]
      TZA:  X[TRUNK_BASIC,RLTX\Port]               * RELEASE TRUNK CONNECTION *
            C[S=ACCOUNT,2,Port_dialed]       * PORT_DIALED IS INVALID HERE *
            X[DBASE,STBT\Port,Connected_bit,OFF]        * CLEAR CONNECTED BIT *
      TZB:  C[J=CONTINUE]

END<TRUNK_DEVICE_PROCESSOR>
```

APPENDIX D

COMMANDS.DEF

```
FILE - COMMANDS.DEF

OPERATIVE COMMAND DEFINITIONS AND REFERENCE (FROM CALL AND DEVICE PROCESSORS) TO AND FROM (THE MANAGERS)
DDDDDDDDDDDDDDDDDDDDDDDDDDDDDDDDDDDDDDDDDDDDDDDDDDDDDDDDDDDDDDDDDDD
:
: NOTE: THE "r" IN THE DEFINITION MEANS THIS COMMAND REQUIRES A
:       RESPONSE FROM SOMETHING ELSE. THEREFORE A WAIT COMMAND WILL
:       USUALLY HAVE TO FOLLOW THE MANAGER COMMANDS USE.
:
:************** DBASE  MANAGER COMMANDS ****************************
:***   OUTBOUND  **************
:KBT 001  * r- CHECK BIT
;TBT 002  *  - SET BIT
:KBY 003  * r- CHECK BYTE
;TBY 004  *  - SET BYTE
:KNB 005  * r- CHECK A NUMBER (ONLY ONE DIGIT OF A MULTIPLE DIGIT #)
.TNB 006  *  - SET A NUMBER (AGAIN, ONLY ONE DIGIT OF A MULTIPLE DIG #)
;DNB 007  * r- SEARCH DIALED NUMBER IN A DBASE FOR A MATCH WITH A LDN #
:KNP 008  * r- COMPARE TWO MULTIPLE DIGIT NUMBERS
:TDM 009  *  - INITIALIZE DBASE MANAGER
:CBY 010  * r- INCREMENT BYTE IN DBASE AND RETURN IT'S NEW VALUE
)CBY 011  * r- DECREMENT BYTE IN DBASE AND RETURN IT'S NEW VALUE
;TBT 012  * r- GET A SPECIFIC BIT VALUE FROM A BYTE AND RETURN THE BIT
:***   INBOUND   **************
ITCK 050  *  - BIT CHECKED
)YCK 051  *  - BYTE CHECKED
IBCK 052  *  - NUMBER CHECKED (SINGLE DIGIT)
)DBS 053  *  - RESULTS OF DBASE SEARCH
IPCK 054  *  - TWO MULTIPLE DIGIT NUMBERS CHECKED
:
:*********** TIMER_COUNTER MANAGER COMMANDS ********************
:****   OUTBOUND  **********
;TMP 001  *  - SET TIMER FOR PORT
;CTL 002  *  - SET COUNTER LIMIT
)CCT 003  * r- DECREMENT COUNTER FOR PORT
:TMP 004  * r- CLEAR TIMER FOR PORT
:****   INBOUND   ************
MOF 050  *  - TIMER OVERFLOW
:TRZ 051  *  - COUNTER REACHED ZERO
:TDC 052  *  - COUNTER DECREMENT SUCCESSFUL
MCL 053  *  - TIMER CLEARED BEFORE OVERFLOW SUCCESSFULLY
MNC 054  *  - TIMER NOT CLEARED DUE TO PREVIOUS OVERFLOW

:*********** TONE_GENERATOR MANAGER COMMANDS ******************
:****   OUTBOUND  ***********
TGM 001  *  - INITIALIZE TONE GENERATOR MANAGER
:NPT 002  *  - CONNECT A PORT TO A TONE
)SPT 003  *  - DISCONNECT A PORT FROM A TONE
)SPO 004  *  - PUT SILENCE OUT A PORT
:****   INBOUND   ************
  NONE AS OF YET:
:
:*********** STORAGE MANAGER COMMANDS **********************
  ****   OUTBOUND  ***********
  MLD 1   *  - SET MESSAGE LENGTH BY DIGITS   (NON SEQUENTIAL)
  MLB 2   *  - SET MESSAGE LENGTH BY BYTE     (NON SEQUENTIAL)
  MND 3   *  - SET MESSAGE NUMBER BY DIGITS   (NON SEQUENTIAL)
  MNB 4   *  - SET MESSAGE NUMBER BY BYTE     (NON SEQUENTIAL)
  CMG 5   *r - RECORD SYSTEM MESSAGE          (NON SEQUENTIAL)
  YMG 6   *r - PLAY SYSTEM MESSAGE            (NON SEQUENTIAL)
  MPM 7   *  - GET SYSTEM MESSAGE PARAMETERS  (NON SEQUENTIAL)
  RPM 8   *r - STOP PLAYING OR RECORDING A SYSTEM MESSAGE (NON SEQUENTIAL)
```

```
MGF  9    *  - DELETE A SYSTEM MESSAGE FILE  (NON SEQUENTIAL)
SMN 10    *  - SET SEQUENTIAL SYSTEM MESSAGE NUMBER
SMG 11    *  - PLAY SEQUENTIAL SYSTEM MESSAGES
SMP 12    *  - GET SEQUENTIAL SYSTEM MESSAGE PARAMETERS
OSMP 13   *r - OPEN SYSTEM MESSAGE FOR PLAY
OSMR 14   *r - OPEN SYSTEM MESSAGE FOR RECORD
CSMM 15   *  - CLOSE SYSTEM MESSAGE
CASM 16   *  - CLOSE ALL SYSTEM MESSAGES FOR A PORT
PMB 17    *r - OPEN A PORTS MAILBOX
LMB 18    *r - PLAY MAILBOX FILE
CMB 19    *r - RECORD MAILBOX FILE
LMB 20    *r - DELETE MAILBOX FILE
PMB 21    *r - MOVE MAILBOX POINTER
LMB 22    *r - CLOSE MAILBOX FOR A PORT
MBA 23    *r - TERMINATE MAILBOX ACTION (PLAY OR RECORD)
SMC 24    *  - ACQUIRE SYSTEM MESSAGE CHANNEL
SMC 25    *  - RELEASE SYSTEM MESSAGE CHANNEL
MBC 26    *  - ACQUIRE A MAILBOX CHANNEL
MBC 27    *  - RELEASE MAILBOX CHANNEL
MMB 28    *r - REMOVE A MAILBOX (AND DELETE ITS ENTIRE CONTENTS)
RMB 29    *r - CREATE A MAILBOX (WILL BE EMPTY)
SBB 30    *  - SET SEQUENTIAL MESSAGES TO "SAY" A BYTE
ASF 31    *  - OPEN ALL SEQUENTIAL FILES
***   INBOUND  *************
LST 50    *  - MESSAGE LENGTH SET
LER 51    *  - MESSAGE LENGTH ERROR
NST 52    *  - MESSAGE NUMBER SET
NER 53    *  - MESSAGE NUMBER ERROR
GDN 54    *  - MESSAGE DONE
RMG 55    *  - ERROR IN MESSAGE
GPM 56    *  - MESSAGE PARAMETERS RETURNED
GSS 57    *  - MESSAGE SENT SUCCESSFULLY
MNS 58    *  - SEQUENTIAL MESSAGE NUMBER SET
MER 59    *  - SEQUENTIAL MESSAGE ERROR
MSS 60    *  - SEQUENTIAL MESSAGE SENT SUCCESSFULLY
MDN 61    *  - ***** NOT USED ********
MPM 62    *  - SEQUENTIAL MESSAGE PARAMETERS RETURNED
MOS 63    *  - SYSTEM MESSAGE OPENED SUCCESSFULLY
MFO 64    *  - SYSTEM MESSAGE FAILED TO OPEN
BOS 65    *  - MAILBOX OPENED SUCCESSFULLY
BNO 66    *  - MAILBOX NOT OPENED SUCCESSFULLY
BDP 67    *  - MAILBOX DONE PLAYING
BDR 68    *  - MAILBOX DONE RECORDING
BPM 69    *  - MAILBOX POINTER MOVED
BPE 70    *  - MAILBOX POINTER ERROR
BDE 71    *  - MAILBOX MESSAGE DELETE ERROR
BMD 72    *  - MAILBOX MESSAGE DELETED SUCCESSFULLY

***********  TEXT_MESSAGE MANAGER COMMANDS (NOT IN USE YET) ****
****   OUTBOUND  ********
TMM 001   *  - INITIALIZE TEXT MESSAGE MANAGER
TMP 002   * r- TRANSMIT TEXT MESSAGE THROUGH PCM CHANNEL
TMP 003   * r- RECEIVE TEXT MESSAGE THROUGH PCM CHANNEL
TMH 004   * r- TRANSMIT TEXT MESSAGE THROUGH HDLC CHANNEL
TMH 005   * r- RECEIVE TEXT MESSAGE THROUGH HDLC CHANNEL
****   INBOUND  *********
XTS 050   *  - TEXT TRANSMITTED SUCCESSFULLY
XRS 051   *  - TEXT RECEIVED SUCCESSFULLY

*************  DTMF_DECODER MANAGER COMMANDS *******************
****   OUTBOUND  **********
DDC 001   *  - INITIALIZE DTMF COLLECTOR MANAGER
DCP 002   * r- CONNECT DTMF DIGIT COLLECTOR TO PORT
SDP 003   *  - DISCONNECT DTMF COLLECTOR FROM PORT
****   INBOUND  **********
GCL 050   *  - DIGIT COLLECTED
DCA 051   *  - NO DTMF DIGIT COLLECTOR AVAILABLE
CCP 052   *  - DTMF COLLECTOR CONNECTED TO PORT
```

```
************ TONE_DECODER MANAGER COMMANDS (NOT IN USE YET) ***
****    OUTBOUND    ************
TDM 001  *  - INITIALIZE TONE DECODER MANAGER
TDP 002  * r- CONNECT TONE DECODER TO PORT
TDP 003  * r- DISCONNECT TONE DECODER FROM PORT
****    INBOUND     ************
DAX 050  *  - NO TONE DECODER AVAILABLE
DCP 051  *  - TONE DECODER CONNECTED TO PORT SUCCESSFULLY
DDP 052  *  - TONE DECODER DIS-CONNECTED FROM PORT SUCCESSFULLY

************* DTMF_DIALER MANAGER COMMANDS *********************
****    OUTBOUND    ************
NDM 001  *  - INITIALIZE DTMF DIALING MANAGER
ODD 002  * r- DIAL OUT DTMF DIGITS
****    INBOUND     ************
DDA 050  *  - NO DTMF DIALER AVAILABLE
DDO 051  *  - DTMF DIGITS DIALED OUT SUCCESSFULLY

************* SWITCH MANAGER COMMANDS ***************************
****    OUTBOUND    ************
NSM 001  *  - INITIALIZE SWITCH MANAGER
ONP 002  *  - CONNECT PORTS
ISP 003  *  - DISCONNECT PORTS
BTP 004  *r- WRITE BYTE TO PORT
BFP 005  *r- READ BYTE FROM PORT
SPT 006  *  - RESET THE OUTPUT OF A PORT
ONE 007  *  - CONNECT INPUT OF FIRST TO OUTPUT OF SECOND
****    INBOUND     ************
BRFP 050 *  - BYTE READ FROM PORT
WTP 051  *  - BYTE WRITTEN TO PORT

************* CONFERENCE MANAGER COMMANDS **********************
****    OUTBOUND    ************
APTC 1   *  - ADD PORT TO CONFERENCE CHANNEL
RPFC 2   *  - REMOVE PORT FROM CONFERENCE CHANNEL
RCCH 3   *  - RELEASE CONFERENCE CHANNEL
RLPC 4   *  - REMOVE LAST PORT FROM CONFERENCE CHANNEL
GCCD 5   *r- GET CONFERENCE CHANNEL DATA
TRPC 6   *  - TEMPORARILY REMOVE PORT FROM CONFERENCE
RRPC 7   *  - RE-CONNECT (TEMP) REMOVED PORT FROM CONFERENCE
*
****    INBOUND     ************
*  NONE
*
************* COMMON_BASIC_SERVICE COMMANDS ********************
******** COMMANDS COMMON TO TWO OR MORE PERIPHERAL BOARD MANAGERS ***
****    OUTBOUND    ************
BNOX 003 *  - BEGIN NORMAL OPERATION
TDUX 004 *  - TIME DATE UPDATE
EPDX 005 *  - EMERGENCY POWER DOWN
RMRX 006 *r- READ MICROCONTROLLER REGISTER
WMRX 007 *  - WRITE MICROCONTROLLER REGISTER
SCHX 008 *  - SELECT PCM CHANNEL
RWTX 009 *  - RESET WATCH DOG TIMER
VERO 010 *r- VERSION REQUEST
RCRX 016 *r- READ CODEC REGISTER
WCRX 017 *  - WRITE CODEC REGISTER
****    INBOUND     ************
RTSI 003 *  - READY TO START
MRDI 004 *  - MICROCONTROLLER REGISTER DATA
VERI 005 *  - VERSION NUMBER
CERI 006 *  - COMMAND ERROR
CRDI 016 *  - CODEC REGISTER DATA
HNDS 200 *  - UNIVERSAL HANDSHAKE COMMAND (USED BY MACRO)
*
************* ANALOG_BASIC_SERVICES BOARD MANAGER COMMANDS *******
*
****    OUTBOUND    ************
RPHX 018 *  - RING PHONE
```

```
****    INBOUND       *****************
ONHX 017  * - ON HOOK DETECTED
OFHX 018  * - OFF HOOK DETECTED
HKFX 019  * - HOOK FLASH DETECTED
DGCX 020  * - DIGITS COLLECTED
RTDX 021  * - RING TRIP DETECTED
GKDX 022  * - GROUND KEY DETECTED
DGEX 023  * - DIGIT ERROR
*
*************** TRUNK_BASIC_SERVICES BOARD MANAGER COMMANDS *******
*
****    OUTBOUND      *****************
WTCX 020  * -    ??? NOT USED
DDGX 021  * -    DIAL OUT DIGITS
SZTX 022  * -    SEIZE TRUNK
RLTX 023  * -    RELEASE TRUNK
CNTX 024  * -    CONNECT TRUNK
HKFT 025  * -    HOOK FLASK
****    INBOUND       *****************
TLSX 026  * -    TRUNK LINE STATUS
TSDX 027  * -    TRUNK SEIZURE DETECTED
DBEX 028  * -    DIGIT BUFFER EMPTY
*
********* END PERIPHERAL BOARD MANAGER COMMANDS ********************
*
*************** MISCELLANEOUS COMMANDS ****************************
EERR 252  * - GENERAL ERROR CONDITION
SUCC 253  * - GENERAL SUCCESS CONDITION
ELSE 254  * - ELSE
* GENERAL ERROR CONDITION SPECIFIERS
IVCM 001  * - INVALID COMMAND ENCOUNTERED
IVDA 002  * - INVALID DATA ENCOUNTERED
IVDS 003  * - INVALID DATA SIZE ENCOUNTERED
*
END
```

APPENDIX E

DBASE PARAMETER DESCRIPTION

---

BITS:

--- collecting_bit  - Bit to represent port is presently seeking input from
                  terminal. (ie. Waiting to collect digits)
activity_bit    - Bit to show port is presently active. (ie. Off hook or
                                                              being rang).
ringing_bit     - Bit to show which port is presently being rang. Only the
                  port trying to be accessed will have this bit set.
connected_bit   - Bit to show port is presently connected with another port.
locked_bit      - Bit which tells if port is in user-initated lock-up.
cfac_bit        - Shows if user has set call foward all calls feature.
cfb_bit         - Shows if user has set call foward on busy.
cfna_bit        - Shows if user has set call foward on no answer.
Hobnp_bit       - Shows if port has been programed to a hunt group on busy
                  without the need for a pilot number.
Voice_mail_bit  - Shows if user is using his/her voice mail option.
dtmf_bit        - Shows if port uses dtmf decoders in digit collection.
processor_bit   - Tells if call or device processor is currently being
                  used by this port.
hold_bit        - Tells if you (port) have someone on hold.
on_hold_bit     - Tells if you are on hold.
call_waiting_bit - Tells if your accessing someone through call waiting.
conference_bit  - Tells if you are or just were in a conference call.
conf_hold_bit   - Tells if you are in a conference call but temporarily
                  removed your self to mute yourself out but as to not
                  remove yourself.
conf_master_bit - Tells if you initiated a conference call and you are the
                  one who can add and remove people.

BYTES:

```
Type_byte      -  Contains info as to what type of peripheral you are.
Slot_byte      -  Holds the slot number your peripheral board is in.
Rack_byte      -  Not in use yet.
Jobnp_byte     -  Not in use yet.
Counter_byte   -  Byte used for counting in timer_counter manager.
Digits_to_collect - Byte used to tell collect_n_digits module how many to
                   expect.
Port_dialed    -  Holds the number of the port you have dialed.
Port_ringing   -  Holds the number of the port which is ringing you.
Digit_pointer  -  Holds a value pertaining to the digit in your digit buffer
                   which you are reading or writing.
Call_fowards_byte - Tells how many times your call has been forward
                    automatically.  This is used to limit this activity.
Conference_byte - Tells which conference channel your involved in.
Hold_port      -  Holds the number of the port you have on hold.
Parent_port    -  When a module is called by port A to act on port B, this
                   holds the number of port A so the interpreter knows who to
                   return to.
Tone_byte      -  Holds the type of tone which is being played on your port.
Class1_byte    -  Holds configuration data for your port.  (features allowed)
Class2_byte    -  Holds configuration data for your port.
Class3_byte    -  Holds configuration data for your port.  (trunk access)
Xtra_byte      -  A byte for use by the TELECOM language to do bookkeeping.
```

ARRAYS:

```
Dialed_number  -  Number you have dialed or been fowarded to.
Cfac_number    -  Number you programed to foward all your calls to.
Cfb_number     -  Number you programed to foward your calls to when busy.
Cfna_number    -  Number you programed to foward your calls to when you do
                   not answer within a specified time.
Password_number - Your programed password number.
Ldn_number     -  Your listed directory number.
Speed1_number  -  Your speed dialing number 1 you have programed.
Speed2_number  -  Your speed dialing number 2 you have programed.
Speed3_number  -  Your speed dialing number 3 you have programed.
```

APPENDIX F

DEFINITIONS USED BY STORAGE MODULE BOARD

```
HDLC COMMANDS
define OMB  0xa0     open mailbox
define CMB  0xa1     close mailbox using logical num
define CMBX 0xb3      close mailbox using port addr and type
define MMP  0xa2     move message pointer using logicalnum
define MMPX 0xb4      move message pointer using port addr and type
define DCM  0xa3     delete message being pointed at using lnum
define DCMX 0xb5      delete message being pointed at using PA and type
define DSFX 0xb6      delete closed system file
define GFS  0xa4     get free disk space in bytes
define OSF  0xa5     open system file
define CRM  0xa6     create mailbox
define RMB  0xa7     remove mailbox
define GMS  0xa8     get mailbox stat
define GLN  0xa9     get logicalnum
define SHC  0xaa     select PCM and CH for SM data transfer
define ERR  0xab     error followed by error code and data
define SND  0xac     set number of DSPs in system
define FEX  0xad     get MB or sysfile existance and size
define IDL  0xb0     sm between buffer transfer process
define BSY  0xb1     sm inside buffer transfer process
define GSS  0xb2     get sm status
define TDU  0x04     set system time or request system time
``` error codes
```
define UOP 0x01    unable to open file for DSP file transfer
define DTO 0x02    DSP timed out during file transfer
``` system commands
```
define PAK 0x01
define NAK 0x02
define SAI 0x01    slave activity inquiry
define BNO 0x03    begin normal operation
define RTS 0x03    ready to start define QUITSIM 0xbf    signals v40 to quit system simulation
``` transfer commands
```
define NUL          0x00
define RDYRX        0x01    ready to receive
define DONETX       0x02    transmission complete
define RDYTX        0x03    ready to transmit
define UNABLE       0x04    unable to TX or RX to that logical num
define TER          0x05    terminate or reset
define PTX          0x06    tell SM to prepare to TX a buff
define PRX          0x07    tell SM to prepare to RX a buff
define RESET_LFILE  0x08    /* tell SM to reset file pointer define FIRST        0x00    set msg index to first in list
define LAST         0x01    set msg index to last in list
define PRIOR        0x02    set msg index to previous in list
define NEXT         0x03    set msg index to next in list
define MBTYPE       0x04    a mailbox
define SYSTYPE      0x05    a systemfile
define RECORD       0x06    for SM to TX or to "play message"
define PLAY         0x07    for SM to RX or to "record message"
define SUCCESSFULL  0x00
define MSGDELRET    0x01    msg deleted and current
                            retreated to prior msg
define FILEWONTDEL  0x02    file refuses to delete
define MBCLSD       0x03    message deleted and mailbox closed
define MSGDEL       0x04    message deleted and
                            current advanced to next msg
define ALREADYCLOSED 0x05   MB was already closed
define UNABLEMALLOC 0x06    unable to allocate memory
define UNABLEOPEN   0x07    unable to open file
define MAILBOXEMPTY 0x08    mailbox has no messages
define NOFREE       0x09    no free logical entries available
define INUSETX      0x0a    logical MB entry in use for SM tx
define INUSERX      0x0b    logical MB entry in use for SM rx
define UNUSED       0x0c    logical MB entry not in use
define SYSFLOL      0x0d    sysfil opn undr anothr logicnum
define LNSYSFL      0x0e    logicnum was for sysfil no mvmt poss
define DSNTEXIST    0x0f    MB file doesnt exist
define ALRDYEXISTS  0x10    MB file already exists
define PREVATFIRST  0x11    msg index was at first before cmd
define PREVATLAST   0x12    msg index was at last before cmd
define MBOPRX       0x13    MB was opened as RX so no
                            index chg poss.
define FAILURE      0x14    operation failed
define OPENED       0x15    msg file is open
define CLOSED       0x16    msg file is closed
define EXISTS       0x17    message exists for this mailinfo entry
define NOENTRIES    0x18    no entries in MB opened to RECORD
define BADCMD       0x19    unidentified cmd or operand
``` file status definitions

```
8920 buff status definitions bits are valid
define FIRSTBUFF  0x01    00000001 first buffer in file
define MIDBUFF    0x00    00000000 mid buffer in file
define LASTBUFF   0x02    00000010 last buffer in file
```

What is claimed is:

1. A telecommunications system for providing a plurality of ports with switching and telecommunications services, said system comprising:
- a digital communications link comprising a first line for control signals and a second line comprising a serial pulse code modulated highway for voice and data;
- a subscriber interface circuit coupled to said digital communications link and too at least one subscriber telecommunications unit and having a first processor for processing output signals generated by said subscriber telecommunications unit; and
- a central processing unit coupled to said digital telecommunications link and to said subscriber interface circuit via said digital telecommunications link and having a second processor, a first memory circuit, and program code stored in said memory circuit, said central processing circuit being operable to generate master control signals in accordance with said program code and to transmit said master control signals to said subscriber interface means along said first line; wherein
- said master control signals are operable in accordance with said program code to command when said subscriber interface circuit can provide signals on said first line and said second line; and
- said subscriber interface circuit is operable to generate command signals in response to said master control signals, to transmit said command signals to said central processing circuit along said first line and to transmit at least one of said voice and data along said second line when commanded by said master control signals.

2. The telecommunications system of claim 1, wherein said first line is configured as a pulse code modulated highway.

3. A telecommunications system comprising:
- a digital communications link comprising a first line for control signals and a second line for voice and data;
- a subscriber interface circuit coupled to said digital communications link and to at least one subscriber telecommunications unit and having a first processor for processing output signals generated by said subscriber telecommunications unit; and
- a central processing circuit coupled to said digital telecommunications link and to said subscriber interface circuit and having a second processor, a first memory circuit, and program code stored in said memory circuit, said central processing circuit being operable to generate master control signals to control said subscriber interface circuit in accordance with said program code and to transmit said master control signals along said first line;
- wherein said subscriber interface circuit is operable to generate command signals in response to said master control signals and to transmit said command signals to said central processing circuit along said first line; and
- wherein said first line is configured to transmit said master control signals and said command signals in accordance with a high level data link control protocol.

4. The telecommunications system of claim 1, wherein said second line is configured as a pulse code modulated highway.

5. The telecommunications system of claim 4, wherein said second line comprises a plurality of 64 kilobits per second channels.

6. The telecommunications system of claim 1, wherein said subscriber interface circuit has ports associated therewith and said second line comprises a number of channels corresponding to the number of said ports, said second processor being operable to provide each of said ports with access to a corresponding channel for data and voice transmission.

7. The telecommunications system of claim 1, wherein said subscriber interface circuit is configured to couple said central processing circuit to at least one analog telephone line.

8. The telecommunications system of claim 1, wherein said subscriber interface circuit is configured to couple said central processing circuit to at least one digital communications line.

9. The telecommunications system of claim 1, wherein said subscriber interface circuit is configured to couple said central processing circuit to at least one trunk line.

10. The telecommunications system of claim 1, wherein said subscriber interface circuit is configured as a data storage circuit comprising a second memory circuit and a third processor to perform data storage and retrieval operations with said second memory circuit in accordance with said master control signals.

11. The telecommunications system of claim 10, further comprising a second subscriber interface citcuit coupled to said digital communications link, said second subscriber interface circuit being configured for digital signal processing and comprising a fourth processor for accessing software instructions stored in said second memory circuit and executing said software instructions to provide a plurality of telecommunications services in accordance with said master control signals.

12. The telecommunications system of claim 10, further comprising a second subscriber interface circuit coupled to said digital communications link, said second subscriber interface circuit being operable to store and retrieve voice and data to and from said second memory circuit.

13. The telecommunications system of claim 1, wherein said central processing circuit further comprises a digital signal processor for performing a plurality of telecommunications functions, a switching circuit for transferring voice and data to and from said second line, and a control interface circuit for transmitting said master control signals and receiving said command signals along said first line.

14. The telecommunications system of claim 13, wherein said program code comprises a first program control module for controlling said second processor to operate said switching circuit, said digital signal processor and said control interface circuit.

15. The telecommunications system of claim 14, wherein said program code comprises a second program control module for cooperating with said first program control module to create, within said first memory circuit, a first-in-first-out memory buffer for storing said master control signals and a first-in-first-out memory buffer for storing said command signals.

16. The telecommunications system of claim 1, wherein said subscriber interface circuit has ports associated therewith and said first memory circuit comprises a database for storing port data corresponding to each of said ports.

17. The telecommunications system of claim 16, wherein said port data for each port comprises data relating to telecommunications services provided to the subscriber using said port, the listed directory number assigned to said port, and status conditions of the line coupling said subscriber telecommunications unit corresponding to said port with said subscriber interface circuit.

18. The telecommunications system of claim 15, wherein said subscriber interface circuit is configured to be coupled to at least one of a plurality of different types of subscriber telecommunications units, and said second program control module comprises a manager subroutine for controlling the generation of master control signals to operate said subscriber interface circuit in accordance with the type of subscriber telecommunications unit connected thereto.

19. The telecommunications system of claim 15, wherein said second program control module comprises a manager subroutine for controlling the generation of master control signals to perform at least one of a plurality of system telecommunications functions comprising generation of audio messages, generation of tone messages, and decoding of dual tone multiple frequency signals.

20. The telecommunications system of claim 1, further comprising a telecommunication programming language and a compiler for said telecommunications programming language to allow a system user to create software modules for configuring said central processing circuit to cooperate with selected subscriber telecommunications units and to perform selected telecommunications services.

21. The telecommunications system of claim 20, wherein said program code comprises at least one program code module for implementing said compiler using said second processor.

22. The telecommunications system of claim 21, wherein said program code comprises at least one manager subroutine for controlling the generation of master control signals to operate said subscriber interface circuit in accordance with the type of subscriber telecommunications unit connected thereto.

23. The telecommunications system of claim 22, wherein said second processor is operable to control said subscriber interface citcuit in accordance with software instructions created using said telecommunications programming language, said software instructions comprising at least one instruction for executing said manager subroutine.

24. The telecommunications system of claim 23, wherein said manager subroutine comprises software instructions for controlling said second processor to operate said subscriber interface circuit in accordance with the data communications characteristics of said subscriber telecommunications unit coupled thereto, said software instructions created with said telecommunications programming language being operable to control said second processor substantially independently of said data communications characteristics.

25. A telecommunications system for connecting a plurality of dissimilar types of subscriber telecommunications units, comprising:
a digital communications link;
a switching circuit coupled to said digital communications link;
a peripheral processing circuit coupled to said digital communications link having an interface circuit for coupling with at least one of said subscriber telecommunications units; and
a central processing circuit coupled to said digital communications link for controlling said peripheral processing circuit, said digital communications link and said switching circuit and for performing at least one of a plurality of system functions; wherein
said peripheral processing circuit is provided with program code for operating said interface circuit to transmit and receive signals to and from, respectively, said subscriber telecommunications units; and
said central processing circuit is programmed in accordance with a first plurality of program code modules for controlling the operation of said peripheral processing circuit and the execution of said plurality of system functions, and a second plurality of program code modules which are operable to invoke selected ones of said first plurality of program code modules to service said subscriber telecommunications units.

26. The telecommunications system of claim 25, further comprising a telecommunications programming language and a compiler for said telecommunications programming language, wherein said central processing circuit is provided with said compiler for compiling program code written by a system user using said telecommunication programming language to generate at least one of said second plurality of program code modules.

27. The telecommunications system as claimed in claim 26, wherein said telecommunications programming language comprises a command for instructing said central processing circuit to perform at least one of a plurality of processing functions comprising switching from operation in accordance with one of said second plurality of program code modules to a different one of said program code modules, waiting to receive data from another one of said subscriber telecommunications units, and executing a selected subroutine created for use with said central processing circuit.

28. The telecommunications system as claimed in claim 26, wherein said telecommunications programming language comprises a command for instructing said central processing circuit to operate in accordance with a specified one of said first plurality of program code modules.

29. The telecommunications system as claimed in claim 26, wherein said telecommunication programming language comprises a command for instructing said central processing circuit to perform a comparison of specified data and to switch to operation under control of commands at a specified point within said program code in accordance with the results of said comparison.

30. A telecommunications system for providing a plurality of ports with switching and telecommunications services, said system comprising:
a central processing circuit operable to generate master control signals;
at least one subscriber telecommunications unit;
a peripheral processing circuit coupled to said central processing circuit and to said subscriber telecommunications unit, said peripheral processing circuit being operable to receive said master control signals, to process voice and data signals transmitted to and received from said subscriber telecommunications unit in accordance with said master control signals, and to generate command signals in response to said master control signals for transmission to said central processing circuit; and a backplane for coupling said central processing circuit and said peripheral processing circuit which comprises a serial pulse coded modulated highway for transmitting voice and data and a control line for transmitting said master control signals and said command signals, wherein said master control signals control when said peripheral processing circuit provides said command signals and said voice and data on said serial pulse code modulated highway and said control line, respectively.

31. The telecommunications system as claimed in claim 30, wherein said control lines are provided with a command protocol, said central processing circuit and said peripheral processing circuit being programmable to generate, respectively, said master signals and said command signals in accordance with said command protocol.

32. The telecommunications system as claimed in claim 30, wherein said backplane further comprises address lines which are configurable to provide each of said central processing circuit and said peripheral processing circuit with a unique identification code.

33. The telecommunications system as claimed in claim 1, further comprising an administrative processing circuit coupled to said central processing circuit and operable to perform at least one of a plurality of administrative services comprising billing, traffic analysis, modification of said program code, and call routing analysis.

34. The telecommunications system as claimed in claim 33, wherein said administrative processing circuit comprises a multitasking operating system.

35. The telecommunications system as claimed in claim 33, wherein said administrative processing circuit is user programmable to provide selected subscriber services using said central processing circuit.

36. The telecommunications system as claimed in claim 1, further comprising a digital telephone which comprises a digital interface for coupling said digital telephone to said central processing circuit via said digital communications link, and a terminal adapter for selectively coupling said digital telephone to at least one data terminal.

37. The telecommunications system as claimed in claim 1, further comprising a digital telephone which comprises:

an interface for coupling said digital telephone with said central processing circuit;

a telephone processing circuit for processing telephone calls using said digital telephone;

a key pad having a plurality of keys and coupled to said telephone processing circuit, said telephone processing circuit having a plurality of lines coupled to said keys and being programmable to scan said lines for input signals from said keys and to provide output signals to said keys;

a display coupled to said telephone processing circuit, said telephone processing circuit being programmable to provide said display with data relating to call information and line status; and a coding and decoding circuit coupled to said telephone processing circuit for performing at least one of a plurality of telephone functions comprising tone generation and control.

38. The telecommunications system of claim 37, wherein said interface comprises at least one channel for transmitting voice, at least one channel for transmitting data, and a control channel for coupling said digital telephone with said subscriber interface circuit.

39. The telecommunications system as claimed in claim 37, further comprising a terminal adapter for coupling at least one terminal to said digital telephone.

40. The telecommunications system of claim 39, wherein said terminal adapter comprises a data converter for converting data received from said terminal to a predetermined data rate and format for transmission over said data channel.

41. The telecommunications system of claim 40, wherein said terminal adapter is operable to perform at least one of a plurality of terminal functions comprising call set-up, call tear-down, operating parameter set-up, data flow monitoring, and call control.

42. A method for processing voice and digital signals from various types of subscriber telecommunications units, comprising the steps of:

coupling a plurality of peripheral processing circuits to said subscriber telecommunications units, said plurality of peripheral processing circuits comprising various types of peripheral processing circuits which are configured to interface with analog lines, digital lines and trunks, respectively;

coupling said plurality of peripheral processing circuits to each other and to a central processing circuit;

providing said central processing circuit with program code comprising a plurality of manager subroutines for performing a plurality of functions comprising accommodating various data types, data rates, transmission standards and transmission parameters utilized by said various types of peripheral processing circuits;

operating said plurality of peripheral processing circuits to receive said voice and digital signals from said subscriber telecommunications units;

generating master control signals using said central processing circuit to control said peripheral processing circuits;

generating and transmitting first signals from each of said plurality of peripheral processing circuits to said central processing circuit in response to said master control signals, said first signals comprising data indicating one of said various types of said peripheral processing circuits;

processing said first signals using said central processing circuit to select at least one of said manager subroutines for execution in accordance with said peripheral processing circuit type; and generating master control signals using said central processing circuit and transmitting said master control signals to said plurality of peripheral processing circuits, said master control signals comprising commands for processing said voice and digital signals in accordance with said selected one of said manager subroutines.

43. The method as claimed in claim 42, further comprising the step of translating program code created using a telecommunication programming language into programmed code that is readable by said central processing circuit.

44. The method as claimed in claim 43, further comprising the step of creating processing subroutines using said telecommunication programming language which correspond to respective ones of said various types of subscriber telecommunications units and which control said central processing circuit in selecting manager subroutines for processing voice and digital signals in accordance with said subscriber telecommunication unit type.

45. The method as claimed in claim 43, further comprising the step of creating at least one device processor subroutine using said telecommunication programming language for processing voice and digital signals using said central processing circuit in accordance with one of said various types of peripheral processing circuits, said manager subroutines being operable to conceal from said device processor subroutine dissimilarities between said various types of peripheral processing circuits.

46. The method as claimed in claim 43, further comprising the step of creating at least one call processor subroutine using said telecommunication programming language for performing with said central processing circuit a plurality of telecommunication functions comprising voice mail, conferencing, speed dialing, call forwarding and basic call processing.

* * * * *